(12) United States Patent
Amin

(10) Patent No.: US 7,418,283 B2
(45) Date of Patent: Aug. 26, 2008

(54) ADIABATIC QUANTUM COMPUTATION WITH SUPERCONDUCTING QUBITS

(75) Inventor: Mohammad H. S. Amin, Vancouver (CA)

(73) Assignee: D-Wave Systems Inc., Burnaby (CA)

( * ) Notice: Subject to any disclaimer, the term of this patent is extended or adjusted under 35 U.S.C. 154(b) by 488 days.

(21) Appl. No.: 11/092,953

(22) Filed: Mar. 28, 2005

(65) Prior Publication Data

US 2005/0256007 A1    Nov. 17, 2005

Related U.S. Application Data

(60) Provisional application No. 60/588,002, filed on Jul. 13, 2004, provisional application No. 60/557,748, filed on Mar. 29, 2004.

(51) Int. Cl.
*G02L 39/00* (2006.01)

(52) U.S. Cl. ............... 505/170; 257/48; 700/90

(58) Field of Classification Search ............ 257/31, 257/48; 505/170; 700/90
See application file for complete search history.

(56) References Cited

U.S. PATENT DOCUMENTS

| | | | |
|---|---|---|---|
| 6,885,325 | B2 | 4/2005 | Omelyanchouk et al. |
| 2002/0177529 | A1 | 11/2002 | Ustinov |
| 2003/0055513 | A1 | 3/2003 | Raussendorf et al. |
| 2003/0169041 | A1 | 9/2003 | Coury et al. |
| 2003/0224944 | A1 | 12/2003 | Il'ichev et al. |
| 2004/0173792 | A1 | 9/2004 | Blais et al. |
| 2004/0238813 | A1 | 12/2004 | Lidar et al. |
| 2005/0062072 | A1 | 3/2005 | Yamamoto et al. |

FOREIGN PATENT DOCUMENTS

| | | |
|---|---|---|
| JP | 2002-150778 | 5/2002 |
| WO | WO-02/073229 A1 | 9/2002 |
| WO | WO-03/021527 A3 | 3/2003 |

OTHER PUBLICATIONS

U.S. Appl. No. 60/588,002, Amin et al.
U.S. Appl. No. 60/557,748, Amin et al.

(Continued)

*Primary Examiner*—Lynne Gurley
(74) *Attorney, Agent, or Firm*—Seed IP Law Group PLLC

(57) ABSTRACT

A method for quantum computing using a quantum system comprising a plurality of qubits is provided. The system can be in any one of at least two configurations at any given time including one characterized by an initialization Hamiltonian $H_O$ and one characterized by a problem Hamiltonian $H_P$. The problem Hamiltonian $H_P$ has a ground state. Each respective first qubit in the qubits is arranged with respect to a respective second qubit in the qubits such that they define a predetermined coupling strength. The predetermined coupling strengths between the qubits in the plurality of qubits collectively define a computational problem to be solved. In the method, the system is initialized to $H_O$ and is then adiabatically changed until the system is described by the ground state of the problem Hamiltonian $H_P$. Then the state of the system is read out by probing an observable of the $\sigma_X$ Pauli matrix operator.

4 Claims, 21 Drawing Sheets

OTHER PUBLICATIONS

Aassime, A., D. Gunnarsson, K. Bladh, and P. Delsing, 2001, "Radio-frequency single-electron transistor: Toward the shot-noise limit," Appl. Phys. Lett. 79, pp. 4031-4033.

Astafiev, O., Yu.A. Pashkin, T. Yamamoto, Y. Nakamura, and J.S. Tsai, 2004, "Quantum Noise in the Josephson Charge Qubit," Phys. Rev. Lett. 93, 267007.

Astafiev, O., Yu.A. Pashkin, T. Yamamoto, Y. Nakamura, and J.S. Tsai, 2004, "Single-shot measurement of the Josephson charge qubit," Phys. Rev. B 69, 180507(R).

Averin, D.V., and C. Bruder, 2003, "Variable Electrostatic Transformer: Controllable Coupling of Two Charge Qubits," Phys. Rev. Lett. 91, 057003.

Barahona, F., 1982, "On the Computational Complexity of Ising Spin Models," J. Phys. A: Math. Gen. 15, pp. 3241-3253.

Bieche, I., R. Maynard, R. Rammal, and J.P. Uhry, 1980, "On the Ground States of the Frustration Model of a Spin Glass by a Matching Method of Graph Theory," J. Phys. A: Math. Gen. 13, pp. 2553-2576.

Blais, A., R.-S. Huang, A. Wallraff, S.M. Girvin, and R.J. Schoeldof, 2004, "Cavity quantum electrodynamics for superconducting electrical circuits: An architecture for quantum computation," Phys. Rev. A 69, 062320.

Bocko, M.F., A.M. Herr, and M.J. Feldman, 1997, "Prospects for Quantum Coherent Computation Using Superconducting Effects," IEEE Trans. Appl. Supercond. 7, pp. 3638-3641.

Brody, T.A., J. Flores, J.B. French, P.A. Mello, A. Pandey, S.S.M. Wong, 1981, "Random-matrix physics: spectrum and strength fluctuations," Rev. Mod. Phys. 53, pp. 385-479.

Cormen, T.H., C.E. Leiserson, and R.L. Rivest, 1990, *Introduction to Algorithms*, (MIT Press, Cambridge), pp. 964-985.

Devoret, M.H., and R.J. Schoelkopf, 2000, "Amplifying quantum signals with the single-electron transistor," Nature 406, pp. 1039-1046.

Devoret, M.H., A. Wallraff, and J.M. Martinis, 2004, "Superconducting Qubits: A Short Review," arXiv.org: cond-mat/0411174.

DiVincenzo, D., 2000, "The Physical Implementation of Quantum Computation," arXiv.org: quant-ph/0002077. Also published in Braunstein, S. L., and H.-K. Lo (eds.), 2000, Scalable Quantum Computers, Wiley-VCH, Berlin, ISBN 3-527-40321-3.

Duty, T., D. Gunnarsson, K. Bladh, and P. Delsing, 2004, "Coherent dynamics of a Josephson charge qubit," Phys. Rev. B 69, 140503(R).

Farhi, E., J. Goldstone, and S. Gutmann, 2002, "Quantum Adiabatic Evolution Algorithms versus Simulated Annealing," arXiv.org: quant-ph/0201031.

Farhi, E., J. Goldstone, and S. Gutmann, 2002, "Quantum Adiabatic Evolution with Different Paths," arXiv.org: quant-ph/0208135.

Farhi, E., J. Goldstone, S. Gutmann, J. Lapan, A. Lundgren, and D. Preda, 2001, "A Quantum Adiabatic Evolution Algorithm Applied to Random Instances of an NP-Complete Problem," Science 292, pp. 472-475.

Farhi, E., J. Goldstone, S. Gutmann, and M. Sipser, 2000, "Quantum Computation by Adiabatic Evolution," arXiv.org: quant-ph/0001106.

Friedman, J.R., V. Patel, W. Chen, S.K. Tolpygo, J.E. Lukens, 2000, "Quantum superposition of distinct macroscopic states," Nature 406, pp. 43-46.

Garanin, D.A., and R. Schilling, 2002, "Effects of nonlinear sweep in the Landau-Zener-Stueckelberg effect," Phys. Rev. B 66, 174438.

Goemans, M.X., and D.P. Williamson, 1995, "Improved Approximation Algorithms for Maximum Cut and Satisfiability Problems Using Semidefinite Programming," Journal of the Association for Computing Machinery 42, pp. 1115-1145.

Hogg, T., 2002, "Adiabatic Quantum Computing for Random Satisfiability Problems," Phys. Rev. A 67, 022314.

E. Il'ichev, A.Yu. Smirnov, M. Grajcar, A. Izmalkov, D. Born, N. Oukhanski, Th. Wagner, W. Krech, H.-G. Meyer, and A. Zagoskin, 2004, "Radio-Frequency Method for Investigation of Quantum Properties of Superconducting Structures," arXiv.org: cond-mat/0402559.

Izmalkov, A., M. Grajcar, E. Il'ichev, A. Oukhanski, Th. Wagner, H.-G. Meyer, W. Krech, M.H.S. Amin, A. Maassen van den Brink, and A.M. Zagoskin, 2004, "Observation of macroscopic Landau-Zener transitions in a superconducting device," Europhys. Lett. 65, pp. 844-849.

Kadowaki, T., and H. Nishimori, 1998, "Quantum annealing in the transverse Ising model," Phys. Rev. E 58, pp. 5355-5363.

Kaminsky, W.M., and S. Lloyd, 2002, "Scalable Architecture for Adiabatic Quantum Computing of NP-Hard Problems," in Quantum Computing & Quantum Bits in Mesoscopic Systems, Kluwer Academic, Dordrecht, Netherlands, also published as arXiv.org: quant-ph/0211152.

Kaminsky, W.M., S. Lloyd, and T.P. Orlando, 2004, "Scalable Superconducting Architecture for Adiabatic Quantum Computation," arXiv.org: quant-ph/0403090.

Kamon, M., M.J. Ttsuk, and J.K. White, 1994, "FASTHENRY: A Multipole-Accelerated 3-D Inductance Extraction Program," IEEE Trans. on Microwave Theory and Techniques 42, pp. 1750-1758.

Makhlin Y., G. Schön, and A. Shnirman, 2001, "Quantum-State Engineering with Josephson-Junction Devices," Rev. Mod. Phys. 73, pp. 357-400.

Mitchell, D.R., C. Adami, and C.P. Williams, 2004, "A Random Matrix Model of Adiabatic Quantum Computing," arXiv.org: quant-ph/0409088.

Mizel, A.M., M.W. Mitchell, and M.L. Cohen, 2001, "Energy barrier to decoherence," Phys. Rev. A 63, 040302.

Mizel, A.M., M.W. Mitchell, and M.L. Cohen, 2002, "Scaling Considerations in Ground State Quantum Computation," Phys. Rev. A 65, pp. 022315.

Mooij, J.E., T.P. Orlando, L. Levitov, L. Tian, C.H. van de Wal, S. Lloyd, 1999, "Josephson Persistent-Current Qubit," Science 285, pp. 1036-1039.

Nielsen, M.A., and I.L. Chuang, 2000, *Quantum Computation and Quantum Information*, Cambridge University Press, Cambridge, UK, pp. 40-42, 141-153, 171-173, and 263-265.

Nabors, K.S. Kim and J. White, 1992, "Fast capacitance extraction of general three-dimensional structures," IEEE Trans. Microwave Theory and Techniques 40, pp. 1496-1507.

Nakamura, Y., Yu. A. Pashkin, J.S. Tsai, 1999, "Coherent control of macroscopic quantum states in a single-Cooper-pair box," Nature 398, pp. 786-788.

Orlando, T.P., J.E. Mooji, L. Tian, C.H. van der Wal, L.S. Levitov, S. Lloyd, J.J. Mazo, 1999, "Superconducting persistent-current qubit," Phys. Rev. B 60, 15398.

Pashkin Yu. A., T. Yamamoto, O. Astafiev, Y. Nakamura, D.V. Averin, J.S. Tsai, 2003, "Quantum oscillations in two coupled charge qubits," Nature 421, pp. 823-826.

Sarandy, M.S., and D.A. Lidar, 2005, "Adiabatic quantum computation in open systems," arXiv.org: quant-ph/0502014.

Schoelkopf, R.J., P. Wahlgren, A.A. Kozhevnikov, P. Delsing, and D.E. Prober, 1998, "The radio-frequency single-electron transistor (rf-SET): a fast and ultrasensitive electrometer," Science 280, pp. 1238-1241.

Steffen, M., Wim van Dam, T. Hogg, G. Breyta, and I. Chuang, 2003, "Experimental Implementation of an Adiabatic Quantum Optimization Algorithm," Phys. Rev. Lett. 90, 067903.

Tokud, E., N. Asahi, T. Yamada, M. Akazawa, and Y. Amemiya, 2000, "Analog Computation Using Single-Electron Circuits," Analog Integrated Circuits and Signal Processing 24, pp. 41-49.

Wallraff, A., D.I. Schuster, A. Blais, L. Frunzio, R.-S. Huang, J. Majer, S. Kumar, S. M. Girvin and R.J. Schoelkopf, 2004, "Strong coupling of a single photon to a superconducting qubit using circuit quantum electrodynamics," Nature 431, pp. 162-166.

Whiteley, S., 1991, "Josephson junctions in SPICE3," IEEE Trans. On Magnetics 27, pp. 2902-2905.

Wocjan, P., and T. Beth, 2004, "The 2-local Hamiltonian problem encompasses NP," arXiv.org: quant-ph/0301087.

Wocjan, P., D. Janzing, and T. Beth, 2003, "Treating the Independent Set Problem by 2D Ising Interactions with Adiabatic Quantum Computing," arXiv.org: quant-ph/0302027.

$$H(t) = (1-\gamma(t))H_0(t) + \gamma(t)H_P(t) + \delta(t)H_E(t)$$

$$\gamma(t) \in \mathbb{C}\,[0,T]\,;\,\gamma(0) = 0\,;\,\gamma(T) = 1$$

$$\delta(t) \in \mathbb{C}\,[0,T]\,;\,\delta(0) = 0\,;\,\delta(T) = 0$$

PRIOR ART

FIG. 3

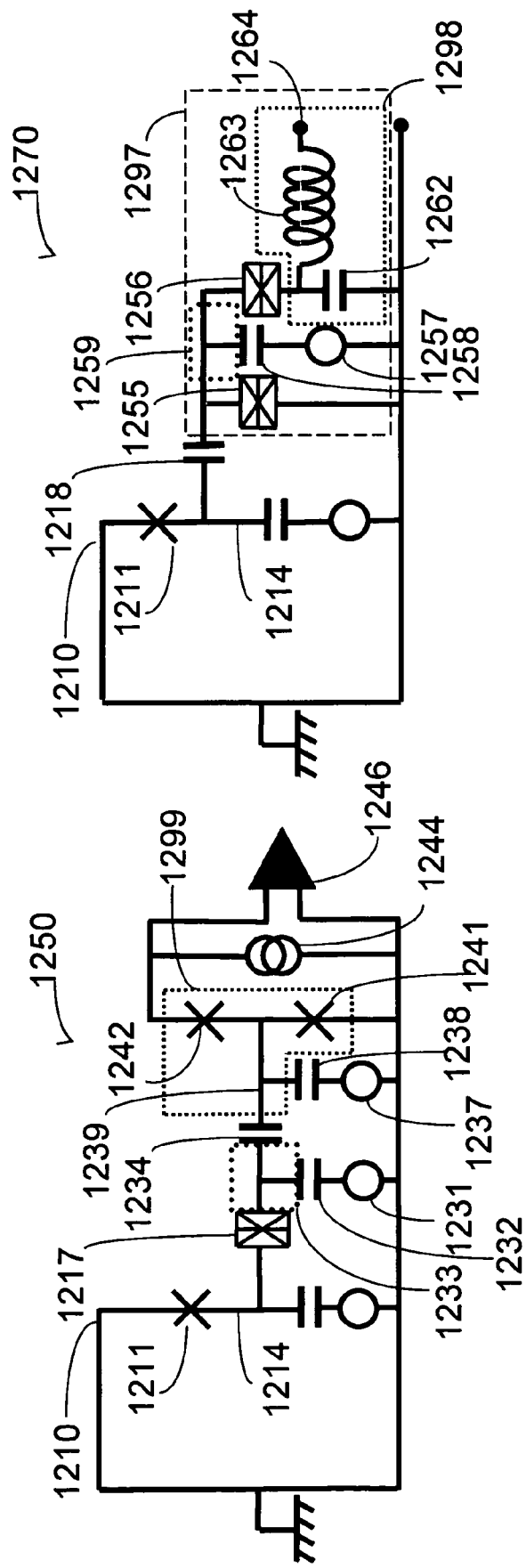

ADIABATIC QUANTUM COMPUTATION WITH SUPERCONDUCTING QUBITS

CROSS REFERENCE TO RELATED APPLICATIONS

This application claims benefit, under 35 U.S.C. § 119(e), of U.S. Provisional Patent Application No. 60/557,748, filed on Mar. 29, 2004, which is hereby incorporated by reference in its entirety. This application also claims benefit, under 35 U.S.C. § 119(e), of U.S. Provisional Patent Application No. 60/588,002, filed on Jul. 13, 2004, which is hereby incorporated by reference in its entirety. This application is further related to concurrently filed application Ser. No. 11/093,205, entitled "Adiabatic Quantum Computation with Superconducting Qubits," and application Ser. No. 11/093,201, entitled "Adiabatic Quantum Computation with Superconducting Qubits," each of which is hereby incorporated by reference in its entirety.

1. FIELD OF THE INVENTION

This invention relates to superconducting circuitry. More specifically, this invention relates to devices for quantum computation.

2. BACKGROUND

Research on what is now called quantum computing may have begun with a paper published by Richard Feynman. See Feynman, 1982, *International Journal of Theoretical Physics* 21, pp. 467-488, which is hereby incorporated by reference in its entirety. Feynman noted that a quantum system is inherently difficult to simulate with conventional computers but that observation of the evolution of an analogous quantum system could provide an exponentially faster way to solve the mathematical model of the quantum system of interest. In particular, solving a mathematical model for the behavior of a quantum system commonly involves solving a differential equation related to the Hamiltonian of the quantum system. David Deutsch noted that a quantum system could be used to yield a time savings, later shown to include exponential time savings, in certain computations. If one had a problem modeled in the form of an equation that represented the Hamiltonian of a quantum system, the behavior of the system could provide information regarding the solutions to the equation. See Deutsch, 1985, *Proceedings of the Royal Society of London* A 400, pp. 97-117, which is hereby incorporated by reference in its entirety.

A major activity in the quantum computing art is the identification of physical systems that can support quantum computation. This activity includes finding suitable qubits as well as developing systems and methods for controlling such qubits. As detailed in the following sections, a qubit serves as the basis for performing quantum computation.

2.1 Qubits

The physical systems that are used in quantum computing are quantum computers. A quantum bit or "qubit" is the building block of a quantum computer in the same way that a conventional binary bit is a building block of a classical computer. A qubit is a quantum bit, the counterpart in quantum computing to the binary digit or bit of classical computing. Just as a bit is the basic unit of information in a classical computer, a qubit is the basic unit of information in a quantum computer. A qubit is conventionally a system having two or more discrete energy states. The energy states of a qubit are generally referred to as the basis states of the qubit. The basis states of a qubit are termed the |0> and |1> basis states. In the mathematical modeling of these basis states, each state is associated with an eigenstate of the sigma-z ($\sigma^z$) Pauli matrix. See Nielsen and Chuang, 2000, *Quantum Computation and Quantum Information*, Cambridge University Press, which is hereby incorporated by reference in its entirety.

The state of a qubit can be in any superposition of two basis states, making it fundamentally different from a bit in an ordinary digital computer. A superposition of basis states arises in a qubit when there is a non-zero probability that the system occupies more than one of the basis states at a given time. Qualitatively, a superposition of basis states means that the qubit can be in both basis states |0> and |1> at the same time. Mathematically, a superposition of basis states means that the wave function that characterizes the overall state of the qubit, denoted |Ψ>, has the form $$|\Psi\rangle = a|0\rangle + b|1\rangle$$

where a and b are amplitudes respectively corresponding to probabilities $|a|^2$ and $|b|^2$. The amplitudes a and b each have real and imaginary components, which allows the phase of qubit to be modeled. The quantum nature of a qubit is largely derived from its ability to exist in a superposition of basis states, and for the state of the qubit to have a phase.

To complete a quantum computation using a qubit, the state of the qubit is typically measured (e.g., read out). When the state of the qubit is measured the quantum nature of the qubit is temporarily lost and the superposition of basis states collapses to either the |0> basis state or the |1> basis state, thus regaining its similarity to a conventional bit. The actual state of the qubit after it has collapsed depends on the amplitudes a and b immediately prior to the readout operation.

A survey of exemplary physical systems from which qubits can be formed is found in Braunstein and Lo (eds.), *Scalable Quantum Computers*, Wiley-VCH Verlag GmbH, Berlin (2001), which is hereby incorporated by reference in its entirety. Of the various physical systems surveyed, the systems that appear to be most suited for scaling (e.g., combined in such a manner such that they entangle with each other) are those physical systems that include superconducting structures such as superconducting qubits.

2.2 Superconducting Qubits in General

Superconducting qubits generally fall into two categories; phase qubits and charge qubits. Phase qubits store and manipulate information in the phase states of the device. Charge qubits store and manipulate information in the elementary charge states of the device. In superconducting materials, phase is a property of the material whereas elementary charges are represented by pairs of electrons called Cooper pairs. The division of such devices into two classes is outlined in Makhlin et al., 2001, "Quantum-State Engineering with Josephson-Junction Devices," *Reviews of Modern Physics* 73, pp. 357-401 which is hereby incorporated by reference in its entirety.

Phase and charge are related values in superconductors and, at energy scales where quantum effects dominate, the Heisenberg uncertainty principle causes certainty in phase to lead to uncertainty in charge and, conversely, causes certainty in charge to lead to uncertainty in the phase of the system. Superconducting phase qubits are devices formed out of superconducting materials having a small number of distinct phase states and many charge states, such that when the charge of the device is certain, information stored in the phase states becomes delocalized and evolves quantum mechanically. Therefore, fixing the charge of a phase qubit leads to delocalization of the phase states of the qubit and subsequent useful quantum behavior in accordance with well-known principles of quantum mechanics.

Experimental realization of superconducting devices as qubits was made by Nakamura et al., 1999, *Nature* 398, p. 786, which is hereby incorporated by reference in its entirety. Nakamura et al. developed a charge qubit that demonstrates the basic operational requirements for a qubit. However, the Nakamura et al. charge qubits have unsatisfactorily short decoherence times and stringent control parameters. Decoherence time is the duration of time that it takes for a qubit to lose some of its quantum mechanical properties, e.g., the state of the qubit no longer has a definite phase. When the qubit loses it quantum mechanical properties, the phase of the qubit is no longer characterized by a superposition of basis states and the qubit is no longer capable of supporting all types of quantum computation.

Superconducting qubits have two modes of operation related to localization of the states in which information is stored. When the qubit is initialized or measured, the information is classical, 0 or 1, and the states representing that classical information are also classical in order to provide reliable state preparation. Thus, a first mode of operation of a qubit is to permit state preparation and measurement of classical information. A second mode of operation occurs during quantum computation, where the information states of the device become dominated by quantum effects such that the qubit can evolve controllably as a coherent superposition of those states and, in some instances, even become entangled with other qubits in the quantum computer. Thus, qubit devices provide a mechanism to localize the information states for initialization and readout operations, and de-localize the information states during computation. Efficient functionality of both of these modes and, in particular, the transition between them in superconducting qubits is a challenge that has not been satisfactorily resolved in the prior art.

2.2.1 Phase Qubits

A proposal to build a quantum computer from superconducting qubits was published in 1997. See Bocko et al., 1997, *IEEE Trans. Appl. Supercon.* 7, p. 3638, which is hereby incorporated by reference in its entirety. See also Makhlin et al., 2001, *Rev. Mod. Phys.* 73, p. 357 which is hereby incorporated by reference in its entirety. Since then, designs based on many other types of qubits have been introduced. One such design is based on the use of superconducting phase qubits. See Mooij et al., 1999, *Science* 285, 1036; and Orlando et al., 1999, *Phys. Rev.* B 60, 15398, which are hereby incorporated by reference in their entireties. In particular, quantum computers based on persistent current qubits, which are one type of superconducting phase qubit, have been proposed.

The superconducting phase qubit is well known and has demonstrated long coherence times. See, for example, Orlando et al., 1999, *Phys. Rev. B* 60, 15398, and Il'ichev et al., 2003, *Phys. Rev. Lett.* 91, 097906, which are hereby incorporated by reference in their entireties. Some other types of superconducting phase qubits comprise superconducting loops interrupted by more or less than three Josephson junctions. See, e.g., Blatter et al., 2001, Phys. Rev. B 63, 174511, and Friedman et al., 2000, Nature, 406, 43, which are hereby incorporated by reference in their entireties.

FIG. 1A illustrates a persistent current qubit 101. Persistent current qubit 101 comprises a loop 103 of superconducting material interrupted by Josephson junctions 101-1, 101-2, and 101-3. Josephson junctions are typically formed using standard fabrication processes, generally involving material deposition and lithography stages. See, e.g., Madou, *Fundamentals of Microfabrication, Second Edition*, CRC Press, 2002, which is hereby incorporated by reference in its entirety. Methods for fabricating Josephson junctions are well known and described in Ramos et al., 2001, *IEEE Trans. App. Supercond.* 11, 998, for example, which is hereby incorporated by reference in its entirety. Details specific to persistent current qubits can be found in C. H. van der Wal, 2001; J. B. Majer, 2002; and J. R. Butcher, 2002, all Theses in Faculty of Applied Sciences, Delft University of Technology, Delft, The Netherlands; http://qt.tn.tudelft.nl; Kavli Institute of Nanoscience Delft, Delft University of Technology, P.O. Box 5046, 2600 GA Delft, The Netherlands, which is hereby incorporated by reference in its entirety. Common substrates include silicon, silicon oxide, or sapphire, for example. Josephson junctions can also include insulating materials such as aluminum oxide, for example. Exemplary superconducting materials useful for forming superconducting loop 103 are aluminum and niobium. The Josephson junctions have cross-sectional sizes ranging from about 10 nanometers (nm) to about 10 micrometers (μm). One or more of the Josephson junctions 101 has parameters, such as the size of the junction, the junction surface area, the Josephson energy or the charging energy that differ from the other Josephson junctions in the qubit.

The difference between any two Josephson junctions in the persistent current qubit is characterized by a coefficient, termed α, which typically ranges from about 0.5 to about 1.3. In some instances, the term a for a pair of Josephson junctions in the persistent current qubit is the ratio of the critical current between the two Josephson junctions in the pair. The critical current of a Josephson junction is the minimum current through the junction at which the junction is no longer superconducting. That is, below the critical current, the junction is superconducting whereas above the critical current, the junction is not superconducting. Thus, for example, the term a for junctions 101-1 and 101-2 is defined as the ratio between the critical current of junction 101-1 and the critical current of junction 101-2.

Referring to FIG. 1A, a bias source 110 is inductively coupled to persistent current qubit 101. Bias source 110 is used to thread a magnetic flux $\Phi_x$ through phase qubit 101 to provide control of the state of the phase qubit. In some instances, the persistent current qubit operates with a magnetic flux bias $\Phi_x$ ranging from about $0.2 \cdot \Phi_0$ to about $0.8 \cdot \Phi_0$, where $\Phi_0$ is the flux quantum. In some instances, the magnetic flux bias ranges from about $0.47 \cdot \Phi_0$ to about $0.5 \cdot \Phi_0$.

Persistent current qubit 101 has a two-dimensional potential with respect to the phase across Josephson junctions 101-1, 101-2, and 101-3. In some instances, persistent current qubit 101 is biased with a magnetic flux $\Phi_x$, such that the two-dimensional potential profile includes regions of local energy minima, where the local energy minima are separated from each other by small energy barriers and are separated from other regions by large energy barriers. In some instances, this potential has the shape of double well potential 100B (FIG. 1B), which includes a left well 160-0 and a right well 160-1. In such instances, left well 160-0 can represent clockwise (102-0) circulating supercurrent in the phase qubit 101 and right well 160-1 can represent counter-clockwise (102-1) circulating supercurrent in persistent current qubit 101 of FIG. 1A.

When wells 160-0 and 160-1 are at or near degeneracy, meaning that they are at the same or nearly the same energy potential as illustrated in FIG. 1B, the quantum state of persistent current qubit 101 becomes a coherent superposition of the phase or basis states and device can be operated as a phase qubit. The point at or near degeneracy is herein referred to as the point of computational operation of the persistent current. During computational operation of the persistent current qubit, the charge of the qubit is fixed leading to uncertainty in the phase basis and delocalization of the phase states of the qubit. Controllable quantum effects can then be used to process the information stored in those phase states according to the rules of quantum mechanics. This makes the persistent current qubit robust against charge noise and thereby prolongs the time under which the qubit can be maintained in a coherent superposition of basis states.

2.2.2 Charge Qubits

There are broad classes of condensed matter systems that have states defined by the presence and absence of extra charge, or the excess charge exists in either a ground or an excited state. Such systems are diverse and have long held theoretical and experimental interest, e.g. Millikan, 1911, *Phys. Rev.* 32, pp. 349-397, which is hereby incorporated by reference in its entirety. There has been attention directed to semiconductor systems such as quantum dots. Research has been conducted using single particle electronics because they hold promise for conventional computers. Subsequently, proposals were made for these systems as quantum computers. While these systems collectively could be called charge qubits, this term is reserved herein for superconducting qubits. Specifically, a superconducting charge qubit has as basis states the presence (charge=2e, or some multiple thereof of 2e) or absence (charge=0) of charge on a small superconducting island. For charge qubits, the Coulomb energy $E_C=e^2/2C$ exceeds the Josephson energy $E_J$ of the qubit.

A charge qubit is a small (mesoscopic) island of superconductor separated by a Josephson junction from a large superconductor (reservoir), see FIG. 12, for example. This system can be tuned to behave like an ideal two-level quantum system. Classical basis states |0> and |1> (corresponding to the presence or absence of a Cooper pair) are the working states of the charge qubit. The Hamiltonian of the superconducting charge qubit is, $$H = -\frac{1}{2}[4E_C(1-2n_g)\sigma^Z + E_J\sigma^X]$$

where the dimensionless gate charge $n_g \approx C_g V_g/2e$ is determined in operation by the gate voltage $V_g$, and in fabrication by the capacitance $C_g$. Here it is assumed that $n_g \approx \frac{1}{2}$. The bias term for the charge qubit is proportional to $\sigma^Z$. A finite Josephson energy allows transition between the states with tunnel splitting $\Delta$ proportional to $E_J$. The Josephson energy of the Josephson junction connecting the island to the reservoir can be made tunable. Tuning the dimensionless gate and the Josephson energy allows one to independently bias the charge and vary the tunneling rate of the charge qubit. See Nakamura et al., 1999, Nature 398, pp. 786-788; and Makhlin et al., 2001, Rev. Mod. Phys. 73, pp. 357-401, each of which is hereby incorporated by reference in its entirety.

2.3 NP Complexity Classes

Computer scientists concerned with complexity routinely use the definitions of different complexity classes. The number of complexity classes is ever changing, as new ones are defined and existing ones merge through advancements made in computer science. The complexity classes known as non-deterministic polynomial-time (NP), NP-complete (NPC), and NP-hard (NPH) are all classes of decision problems. Decision problems have binary outcomes.

Problems in NP are computational problems for which there exists polynomial time verification. That is, it takes no more than polynomial time (class P) in the size of the problem to verify a potential solution. It may take more than polynomial time to create a potential solution. NP-hard problems take longer to verify a potential solution. For each NP-hard problem, there is an NP-complete problem that can be reduced to the NP-hard problem. However, NP-complete problems that can be reduced to a NP-hard problem do not enjoy polynomial time verification.

Problems in NPC can be defined as problems in NP that have been shown to be equivalent to, or harder to solve, than a known problem in NPC. Equivalently, the problems in NPC are problems in NP that are also in NPH. This can be expressed as NPC=NP∩NPH.

A problem is equivalent, or harder to solve, than a known problem in NPC if there exists a polynomial time reduction to the instant problem from the known problem in NPC. Reduction can be regarded as a generalization of mapping. The mappings can be one to one functions, many to one functions, or make use of oracles, etc. The concepts of complexity classes and how they define the intractability of certain computational problems is found in, for example, Garey and Johnson, 1979, *Computers and Intractability: A Guide to the Theory of NP-Completeness*, Freeman, San Francisco, ISBN: 0716710455, which is hereby incorporated by reference in its entirety. Also see, Cormen, Leiserson, and Rivest, 1990, *Introduction to Algorithms*, MIT Press, Cambridge, ISBN: 0262530910.

2.4 Circuit Model of Quantum Computing

Analogous to the way a classical computer is built using wires and logic gates, a quantum computer can be built using quantum circuits comprised of "wires" and "unitary gates." Here, the wire is not a physical entity. Rather, it represents the state of the qubit in time. The "unitary gates" are applied at precise times to specific qubits to effect evolution of the qubit in accordance with the circuit model for quantum computing. The circuit model of quantum computing is a standard and universal model used by many practitioners in the art. The circuit model is universal in the sense that it is able to convert any input state into any output state. The elements of the circuit model are that a small set of one- and two-qubit unitary gates are applied to the qubits with precise timing. The circuit model of quantum computing can implement algorithms such as Shor's algorithm for factoring numbers or Grover's algorithm for searching databases. Shor's algorithm provides an exponential speedup relative to classical (non-quantum) computers for factoring numbers. Grover's application provides a polynomial speed up relative to classical computers for searching databases. See, for example, Nielsen and Chuang, 2000, *Quantum Computation and Quantum Information*, Cambridge University Press, which is hereby incorporated by reference in its entirety.

An example of the circuit model is shown in FIG. 2. Circuit 200 is an implementation of the quantum Fourier transform. The quantum Fourier transform is a useful procedure found in many quantum computing applications based on the circuit model. See, for example, United States Patent Publication 2003/0164490 A1, entitled "Optimization process for quantum computing process," which is hereby incorporated by reference in its entirety. Time progresses from left to right, i.e., time step 201 precedes time step 202, and so forth. The four qubits in the quantum system described by FIG. 2 are indexed 0-3 from bottom to top. The state of qubit 0 at any given time step is represented by wire S0-S0', the state of qubit 1 at any give time step is represented by S1-S1', etc. In time step 201, a single-qubit unitary gate, $A_3$, is applied to qubit 3. The next gate on wire S3-S3' for qubit 3 is a two-qubit gate, $B_{23}$, which is applied to qubits 2 and 3 at time step 202. In general the $A_i$ gate (e.g., $A_3$ as applied to qubit 3 at time step 201) is a HADAMARD gate applied on the $i^{th}$ qubit while the $B_{ij}$ gate (e.g., $B_{23}$ which is applied to qubits 2 and 3 at time step 202) is a CPHASE gate coupling the $i^{th}$ and $j^{th}$ qubit. The application of unitary gates continues until states S0-S3 have been converted to S0'-S3'. After time step 210, more unitary gates can be applied to the qubits or the states of the qubits can be determined (e.g., by measurement).

2.5 Adiabatic Model of Quantum Computation

The following subsections discuss the adiabatic theorem of quantum mechanics and introduce adiabatic quantum computing.

2.5.1 Adiabatic Theorem of Quantum Mechanics

One definition of an adiabatic process is a process that occurs in a system without heat entering or leaving the system. There exists a theorem in quantum mechanics that provides a suitable framework for such processes. The adiabatic theorem of quantum mechanics has several versions but a notable element of many such versions is as follows. A quantum system prepared in its ground state will remain in the ground state of the various instantaneous Hamiltonians through which it passes, provided the changes are made sufficiently slowly. This form of change is termed adiabatic change. Such a system is adiabatic because the population of the various states of the quantum system has not been altered as a result of the change. Hence, if the populations have not changed, the temperature of the system has not changed, and therefore no heat has entered or left the system.

2.5.2 Adiabatic Quantum Computing

In 2000, a form of quantum computing, termed adiabatic quantum computing, was proposed. See, for example, Farhi et al., 2001, Science 292, pp. 472-475, which is hereby incorporated by reference in its entirety. In adiabatic quantum computing (AQC), the problem to be solved is encoded into a physical system such that departures from the solution to the problem incur a net energy cost to the system. AQC is universal in that it is able to convert any input state into any output state. However, unlike the circuit model of quantum computing, there is no application of a predetermined set of one- and two-qubit unitary gates at precise times. It is believed that AQC can be used to find solutions to some problems with greater efficiency than the circuit model. Such problems include problems contained in, and related to, the NP, NP-hard, and NP-complete classes.

As shown in FIG. 3, AQC involves initializing a system, which encodes a problem to be solved, to an initial state. This initial state is described by an initial Hamiltonian $H_0$. Then the system is migrated adiabatically to a final state described by Hamiltonian $H_P$. The final state encodes a solution to the problem. The migration from $H_0$ to $H_P$ follows an interpolation path described by function $\gamma(t)$ that is continuous over the time interval zero to T, inclusive, and has a condition that the magnitude of initial Hamiltonian $H_0$ is reduced to zero after time T. Here, T, refers to the time point at which the system reaches the state represented by the Hamiltonian $H_P$. Optionally, the interpolation can traverse an extra Hamiltonian $H_E$ that can contain tunneling terms for some or all of the qubits represented by $H_0$. The magnitude of extra Hamiltonian $H_E$ is described by a function $\delta(t)$ that is continuous over the time interval zero to T, inclusive, and is zero at the start (t=0) and end (t=T) of the interpolation while being non-zero at all or a portion of the times between t=0 and t=T.

One computational problem that can be solved with adiabatic quantum computing is the MAXCUT problem. Consider an undirected edge-weighted graph having a set of vertices and a set of edges. All the edges in the graph have weights given by a positive integer. The MAXCUT problem, expressed as a decision problem, asks whether there is a partition of the graph such that the sum of the weights of the edges crossing the partition is equal or greater than some given predefined positive integer K. Many other permutations of the problem exist and include optimization problems based on this decision problem. An example of an optimization problem is the identification of the partition of the graph that yields the maximum K. In other words, for graph G=(V, E) that is a (not necessarily simple) undirected edge-weighted graph with nonnegative weights, where a cut C of G is any nontrivial subset of V, the weight of cut C is the sum of weights of edges crossing the cut. The MAXCUT problem, expressed as an optimization problem, is the identification of a cut G having the maximum possible weight.

The MAXCUT problem, expressed as a decision problem, is defined in Garey and Johnson, 1979, *Computers and Intractability: A Guide to the Theory of NP-Completeness*, Freeman, San Francisco, ISBN: 0716710455, which is hereby incorporated by reference in its entirety, as:

INSTANCE: Graph G=(V, E), weight $w(e) \epsilon Z^+$ for each $e \epsilon E$, for positive integer K.

QUESTION: Is there a partition of V into disjoint sets $V_1$ and $V_2$ such that the sum of the weights of the edges form E that have one endpoint in $V_1$ and one endpoint in $V_2$ is at least K?

Consider an instance of a positive number K and a graph G=(V, E), having a set of vertices $V=\{v_1, \ldots, v_{|V|}\}$, and a set of edges $E=\{e_1, \ldots, e_i, \ldots, e_{|E|}\}$, where $e_i=(v_j, v_k)$ for all $1 < j, k < |V|$. The graph's edges have weights $w(e_i)$, $w(v_j, v_k)$, or $w_{jk}$ that are positive. The explicit decision problem is whether there is a partition of V, i.e., $V_1 \subseteq V$, $V_2 \subseteq V$, and $V_1 \cup V_2 = V$, such that the sum of the weights of the edges crossing the partition is equal or greater than some given predefined positive integer K, e.g., $$\sum_{\forall v_j \epsilon V_1} \sum_{\forall v_k \epsilon V_2} w(v_j, v_k) \geq K.$$

An optional addition to the definitions above is the graph may have vertex weights that are also positive $w(v_i)$ or $w_i$. Using this alternative, MAXCUT can be formulated as a search for a partition of G such that the sum of the weights of the edges crossing the partition, and the sum of the weight of vertices on one side of the partition is equal or greater than K. MAXCUT is a problem that has been solved using a nuclear magnetic resonance (NMR) quantum computer. See, for example, M. Steffen, Wim van Dam, T. Hogg, G. Breyta, and I. Chuang, 2003, "Experimental Implementation of an Adiabatic Quantum Optimization Algorithm," *Phys. Rev. Lett.* 90, 067903, which is hereby incorporated by reference in its entirety.

Mathematically, solving MAXCUT permits optimizations based on MAXCUT to be solved efficiently. In other words, efficiency in solving a decision-based MAXCUT problem (e.g., is there a cut having a value greater than some predetermined given value K) will lead to efficiency in solving the corresponding optimization-based MAXCUT problem (finding the cut having the greatest value). This is generally true of any problem in NP. However, for problems in NPH, their related optimization problems represent a class for which adiabatic quantum computing can be particularly well suited.

One computational problem that can be solved with adiabatic quantum computing is the INDEPENDENT SET problem. Garey and Johnston, 1979, *Computers and Intractability: A Guide to the Theory of NP-Completeness*, define the INDEPENDENT SET problem as:

INSTANCE: Graph G=(V, E), positive integer $K \leq |V|$.

QUESTION: Does G contain an independent set of size K or more, i.e., as subset of $V' \subseteq V$ with $|V'| \geq K$ such that no two vertices in V' are joined by an edge in E?

where emphasis is added to show differences between the INDEPENDENT SET problem and another problem, known as CLIQUE, that is described below. Expanding upon this definition, consider an undirected edge-weighted graph having a set of vertices and a set of edges, and a positive integer K that is less than or equal to the number of vertices of the graph. The INDEPENDENT SET problem, expressed as a decision problem, asks whether there is a subset of vertices of size K, such that no two vertices in the subset are connected by an edge of the graph. Many other permutations of the problem exist and include optimization problems based on this decision problem. An example of an optimization problem is the identification of the independent set of the graph that yields the maximum K. This is called MAX INDEPENDENT SET.

Mathematically, solving INDEPENDENT SET permits optimizations based on INDEPENDENT SET, such as MAX INDEPENDENT SET to be solved efficiently. In other words, efficiency in solving a decision-based INDEPENDENT SET problem (e.g., is there an independent set having a value greater that some predetermined given value K) will lead to efficiency in solving the corresponding optimization-based INDEPENDENT SET problem (finding the independent set having the greatest value). This is generally true of any problem in NP.

Mathematically, solving INDEPENDENT SET permits the solving of yet another problem known as CLIQUE. This problem seeks the clique in a graph. A clique is a set of vertices that are all connected to each other. Given a graph, and a positive integer K, the question that is asked in CLIQUE is whether there are K vertices all of which are neighbors of each other. Like the INDEPENDENT SET problem, the CLIQUE problem can be converted to an optimization problem. The computation of cliques has roles in economics and cryptography. Solving an independent set on graph $G_1$=(V, E) is equivalent to solving clique on $G_1$'s complement $G_2$=(V,(V×V)/E), e.g., for all vertices connected by edges in E remove the edges, insert into $G_2$ edges connecting vertices not connected in $G_1$. Garey and Johnston define CLIQUE as:

INSTANCE: Graph G=(V, E), positive integer $K \leq |V|$.

QUESTION: Does G contain a clique of size K or more, i.e., as subset of $V' \subseteq V$ with $|V'| \geq K$ such that every two vertices in V' are joined by an edge in E?

Here, emphasis has been added to show differences between CLIQUE and INDEPENDENT SET. It can also be shown how CLIQUE is related to the problem VERTEX COVER. Again, all problems in NP-complete are reducible to each other within polynomial time, making devices that solve one NP-complete problem efficiently, useful for other NP-complete problems.

2.6 Adiabatic Quantum Computing Using Superconducting Qubits

The question of whether superconducting qubits can be used to implement adiabatic quantum computing (AQC) has been posed in the art. However, such proposals are unsatisfactory because they either lack enabling details on the physical systems on which AQC would be implemented or they rely on qubits that have not been shown to successfully perform an n-qubit quantum computation, where n is greater than 1 and the quantum computation requires entanglement of qubits. For example, Kaminsky and Lloyd, 2002, "Scalable Architecture for Adiabatic Quantum Computing of NP-Hard Problems," in *Quantum Computing & Quantum Bits in Mesoscopic Systems*, Kluwer Academic, Dordrecht, Netherlands, also published as arXiv.org: quant-ph/0211152, which is hereby incorporated by reference in its entirety, suggests that AQC can be performed with persistent current qubits, without explicitly stating how. As another example, W. M. Kaminsky, S. Lloyd, T. P. Orlando, 2004, "Scalable Superconducting Architecture for Adiabatic Quantum Computation," arXiv.org: quant-ph/0403090, hereby incorporated by reference, describes a method and structure for AQC for a type of persistent current qubit that has not been shown to support multi-qubit quantum computation. This reference shows a system of logical qubits without giving explicit construction of the logical qubits from physical qubits or an explicit coupling between more than two qubits.

Accordingly, given the above background, there is a need in the art for improved systems and methods for adiabatic quantum computing. Discussion or citation of a reference herein shall not be construed as an admission that such reference is prior art to the present invention.

3. SUMMARY OF THE INVENTION

The present invention addresses the need in the art for improved systems and methods for adiabatic quantum computing. In some embodiments of the present invention, a graph based computing problem, such as MAXCUT, is represented by an undirected edge-weighted graph. Each node in the edge-weighted graph corresponds to a qubit in a plurality of qubits. The edge weights of the graph are represented in the plurality of qubits by the values of the coupling energies between the qubits. For example, the edge weight between a first and second node in the graph is represented by the coupling energy between a corresponding first and second qubit in the plurality of qubits.

In one aspect of the present invention, the plurality of qubits that represents the graph is initialized to a first state that does not permit the qubits to quantum tunnel. Then, the plurality of qubits is set to an intermediate state in which quantum tunneling between individual basis states within each qubit in the plurality of qubits can occur. In preferred embodiments, the change to the intermediate state occurs adiabatically. In other words, for any given instant t that occurs during the change to the intermediate state or while the qubits are in the intermediate state, the plurality of qubits are in the ground state of an instantaneous Hamiltonian that describes the plurality of qubits at the instant t. The qubits remain in the intermediate state that permits quantum tunneling between basis states for a period of time that is sufficiently long enough to allow the plurality of qubits to reach a solution for the computation problem represented by the plurality of qubits.

Once the qubits have been permitted to quantum tunnel for a sufficient period of time, the state of the qubits is adjusted such that they reach some final state that either does not permit quantum tunneling or, at least, does not permit rapid quantum tunneling. In preferred embodiments, the change to the final state occurs adiabatically. In other words, for any given instant t that occurs during the change to the final state, the plurality of qubits are in the ground state of an instantaneous Hamiltonian that describes the plurality of qubits at the instant t.

In other examples of the systems and methods of the present invention, the plurality of qubits that represents the graph is initialized to a first state that does permit the qubits to quantum tunnel. The state of the quantum system is changed once the qubits have been permitted to quantum tunnel for a sufficient period of time. The state of the qubits is adjusted such that they reach some final state that either does not permit quantum tunneling or, at least, does not permit rapid quantum tunneling. In preferred embodiments, the change to the final state occurs adiabatically.

Some embodiments of the present invention are universal quantum computers in the adiabatic quantum computing model. Some embodiments of the present invention include qubits with single-qubit Hamiltonian terms and at least one two-qubit Hamiltonian term.

A first aspect of the invention provides a method for quantum computing using a quantum system comprising a plurality of superconducting qubits. The quantum system is characterized by an impedance. Also, the quantum system is capable of being in any one of at least two configurations at any given time. These at least two configurations include a first configuration characterized by an initialization Hamiltonian $H_O$ as well as a second configuration characterized by a problem Hamiltonian $H_P$. The problem Hamiltonian has a ground state. Each respective first superconducting qubit in the plurality of superconducting qubits is arranged with respect to a respective second superconducting qubit in the plurality of superconducting qubits such that the first respective superconducting qubit and the corresponding second respective superconducting qubit define a predetermined coupling strength. The predetermined coupling strengths between each of the first respective superconducting qubit and corresponding second respective superconducting qubit collectively define a computational problem to be solved. In this first aspect of the invention, the method comprises initializing the quantum system to the initialization Hamiltonian $H_O$. The quantum system is then adiabatically changed until it is described by the ground state of the problem Hamiltonian $H_P$. The state of the quantum system is then read out by probing an observable of the $\sigma_X$ Pauli matrix operator.

In some embodiments in accordance with the first aspect of the invention, the reading step comprises measuring an impedance of the quantum system. In some embodiments the reading step comprises determining a state of a superconducting qubit in the plurality of superconducting qubits. In some embodiments, the reading step differentiates a ground state of the superconducting qubit from an excited state of the superconducting qubit. In some embodiments, a superconducting qubit in the plurality of superconducting qubits is a persistent current qubit. In some embodiments, the reading step measures a quantum state of the superconducting qubit as a presence or an absence of a voltage. In some embodiments, a superconducting qubit in the plurality of superconducting qubits is capable of tunneling between a first stable state and a second stable state when the quantum system is in the first configuration.

In some embodiments, a superconducting qubit in the plurality of superconducting qubits is capable of tunneling between a first stable state and a second stable state during the adiabatic changing step. In some embodiments, the adiabatic changing step occurs during a time period that is between 1 nanosecond and 100 microseconds. In some embodiments, the initializing step includes applying a magnetic field to the plurality of superconducting qubits in the direction of a vector that is perpendicular to a plane defined by the plurality of superconducting qubits. In some embodiments, a superconducting qubit in the plurality of superconducting qubits is a persistent current qubit.

A second aspect of the invention provides a method for quantum computing using a quantum system that comprises a plurality of superconducting qubits. The quantum system is coupled to an impedance readout device. The quantum system is capable of being in any one of at least two configurations at any given time. The at least two configurations include a first configuration characterized by an initialization Hamiltonian $H_O$, and a second Hamiltonian characterized by a problem Hamiltonian $H_P$. The problem Hamiltonian $H_P$ has a ground state. Each respective first superconducting qubit in the plurality of superconducting qubits is arranged with respect to a respective second superconducting qubit in the plurality of superconducting qubits such that the first respective superconducting qubit and the second respective superconducting qubit define a predetermined coupling strength. The predetermined coupling strength between each said first respective superconducting qubit and corresponding second respective superconducting qubit collectively define a computational problem to be solved. In this second aspect of the invention, method comprises initializing the quantum system to the initialization Hamiltonian $H_O$. Then the quantum system is adiabatically changed until it is described by the ground state of the problem Hamiltonian $H_P$. The state of the quantum system is then read out through the impedance readout device thereby solving the computational problem.

In some embodiments in accordance with this second aspect of the invention, the reading step measures a quantum state of a superconducting qubit in the plurality of superconducting qubits as a presence or an absence of a voltage. In some embodiments, the reading step differentiates a ground state of the superconducting qubit from an excited state of the superconducting qubit. In some embodiments, a superconducting qubit in the plurality of superconducting qubits is (i) a phase qubit in the charge regime or (ii) a persistent current qubit. In some embodiments, a superconducting qubit in the plurality of superconducting qubits is capable of tunneling between a first stable state and a second stable state when the quantum system is in the first configuration. In some embodiments, a superconducting qubit in the plurality of superconducting qubits is capable of tunneling between a first stable state and a second stable state during the adiabatic changing step. In some embodiments, the adiabatic changing step occurs during a time period that is greater than 1 nanosecond and less than 100 microseconds. In some embodiments, the initializing step includes applying a magnetic field to the plurality of superconducting qubits in the direction of a vector that is perpendicular to a plane defined by the plurality of superconducting qubits. In some embodiments, a superconducting qubit in the plurality of superconducting qubits is a persistent current qubit.

A third aspect of the invention provides a method of determining a quantum state of a first target superconducting qubit. The method comprises presenting a plurality of superconducting qubits including a first target superconducting qubit in the plurality of superconducting qubits. A problem Hamiltonian describes (i) the quantum state of the plurality of superconducting qubits and (ii) each coupling energy between qubits in the plurality of qubits. The problem Hamiltonian is at or near a ground state. An rf-flux is added to the first target superconducting qubit. The rf-flux has an amplitude that is less than one flux quantum. An amount of an additional flux in the first target superconducting qubit is adiabatically varied. A presence or an absence of a dip in a voltage response of a tank circuit that is inductively coupled with the first target superconducting qubit during the adiabatically varying step is observed thereby determining the quantum state of the first target superconducting qubit.

In some embodiments in accordance with this third aspect of the invention, each superconducting qubit in the plurality of superconducting qubits is in a quantum ground state during all or a portion of the adding step, the adiabatically varying step, and the observing step. In some embodiments, the problem Hamiltonian corresponds to a terminus of an adiabatic evolution of the plurality of superconducting qubits. In some embodiments, the method further comprises biasing all or a portion of the superconducting qubits in the plurality of superconducting qubits. The problem Hamiltonian further describes a biasing on the first target superconducting qubit. In some embodiments, an energy of the biasing step exceeds the tunneling energy of a tunneling element of the Hamiltonian of the first target superconducting qubit, thereby causing tunneling to be suppressed in the first target superconducting qubit during an instance of the biasing step, adding step and the adiabatically varying step.

In some embodiments in accordance with this third aspect of the invention, the method further comprises adiabatically removing additional flux that was added to the first target superconducting qubit during the adiabatically varying step. In some embodiments, the adiabatically varying step comprises adiabatically varying the additional flux in accordance with a waveform selected from the group consisting of periodic, sinusoidal, triangular, and trapezoidal. In some embodiments, the adiabatically varying step comprises adiabatically varying the additional flux in accordance with a low harmonic Fourier approximation of a waveform selected from the group consisting of periodic, sinusoidal, triangular, and trapezoidal. In some embodiments, the additional flux has a direction that is deemed positive or negative. In some embodiments, the adiabatically varying step is characterized by a waveform that has an amplitude that grows with time. The amplitude of the waveform corresponds to an amount of additional flux that is added to the first target superconducting qubit during the adiabatically varying step. In some embodiments, the additional flux has an equilibrium point that varies with time. In some embodiments, the additional flux is either unidirectional or bidirectional. In some embodiments, the additional flux has a frequency of oscillation between about 1 cycle per second and about 100 kilocycles per second.

In some embodiments in accordance with the third aspect of the invention, the adding step comprises adding the rf-flux using (i) an excitation device that is inductively coupled to the first target superconducting qubit or (ii) a the tank circuit. In some embodiments, the method further comprises repeating the adding step and the adiabatically varying step between 1 time and 100 times. In such embodiments, the presence or absence of the dip in the voltage response of the tank circuit is observed as an average of the voltage response of the tank circuit across each instance of the adiabatically varying step.

In some embodiments in accordance with the third aspect of the invention, the first target superconducting qubit is flipped from an original basis state to an alternate basis state during the adiabatically varying step. The method further comprises returning the first target superconducting qubit to its original basis state by adiabatically removing additional flux in the qubit after the adiabatically varying step. In some embodiments, the adiabatically varying step does not alter the quantum state of each of superconducting qubits in the plurality of superconducting qubits other than the first target superconducting qubit. In some embodiments, the method further comprises recording a presence or an absence of the dip in the voltage response of the tank circuit.

In some embodiments in accordance with the third aspect of the invention, the method further comprises adding a second rf-flux to a second target superconducting qubit in the plurality of superconducting qubits. The second rf-flux has an amplitude that is less than one flux quantum. Then an amount of a second additional flux in the second target superconducting qubit is adiabatically varied. A presence or an absence of a second dip in a voltage response of a tank circuit that is inductively coupled with the second target superconducting qubit during said adiabatically varying is observed, thereby determining the quantum state of the second target superconducting qubit.

In some embodiments in accordance with the third aspect of the invention, the method further comprises designating a different superconducting qubit in the plurality of superconducting qubits as the first target superconducting qubit. The adding step and the adiabatically varying step are then reperformed with the different superconducting qubit as the first target superconducting qubit. The designating and reperforming are repeated until all or a portion (e.g., most, almost all, at least eighty percent) of the superconducting qubits in the plurality of superconducting qubits have been designated as the first target superconducting qubit.

In some embodiments in accordance with the third aspect of the invention, a tank circuit is inductively coupled with the first target superconducting qubit. The method further comprises performing an adiabatic quantum computation step for an amount of time with the plurality of superconducting qubits prior to the adding step. The amount of time is determined by a factor the magnitude of which is a function of a number of qubits in the plurality of superconducting qubits. An amount of an additional flux in the first target superconducting qubit is adiabatically varied. Then, a presence or an absence of a dip in the voltage response of a tank circuit during the adiabatically varying step is observed, thereby determining the quantum state of the first target superconducting qubit. In some embodiments, the presence of a dip in the voltage response of the tank circuit corresponds to the first target superconducting qubit being in a first basis state. The absence of a dip in the voltage response of the tank circuit corresponds to the target superconducting qubit being in a second basis state.

In some embodiments in accordance with the third aspect of the invention, the adiabatically varying step further comprises identifying an equilibrium point for the additional flux using an approximate evaluation method. In some embodiments, the method further comprises classifying the state of the first target qubit as being in the first basis state when the dip in the voltage across the tank circuit occurs to the left of the equilibrium point and classifying the state of the first target qubit as being in the second basis state when the dip in the voltage across the tank circuit occurs to the right of the equilibrium point.

A fourth aspect of the present invention comprises a method for adiabatic quantum computing using a quantum system comprising a plurality of superconducting qubits. The quantum system is capable of being in any one of at least two quantum configurations at any give time. The at least two quantum configurations include a first configuration described by an initialization Hamiltonian $H_O$ and a second configuration described by a problem Hamiltonian $H_P$. The Hamiltonian $H_P$ has a ground state. The method comprises initializing the quantum system to the first configuration. Then the quantum system is adiabatically changed until it is described by the ground state of the problem Hamiltonian $H_P$. Then the state of the quantum system is read out.

In some embodiments in accordance with the fourth aspect of the invention, each respective first superconducting qubit in the plurality of superconducting qubits is arranged with respect to a respective second superconducting qubit in the plurality of superconducting qubits such that the first respective superconducting qubit and the corresponding second respective superconducting qubit define a predetermined coupling strength. The predetermined coupling strength between each of the first respective superconducting qubits and corresponding second respective superconducting qubits in the plurality of superconducting qubits collectively define a computational problem to be solved. In some instances, the problem Hamiltonian $H_P$ comprises a tunneling term for each of the respective superconducting qubits in the plurality of superconducting qubits. The energy of the tunneling term for each respective superconducting qubit in the plurality of superconducting qubits is less than the average of the predetermined coupling strengths between each of the first respective superconducting qubits and second respective superconducting qubits in the plurality of superconducting qubits.

In some embodiments in accordance with the fourth aspect of the invention, the reading out step comprises probing an observable of the $\sigma_X$-Pauli matrix operator or $\sigma_Z$-Pauli matrix operator. In some embodiments, a tank circuit is in inductive communication with all or a portion of the superconducting qubits in the plurality of superconducting qubits. In such embodiments, the reading out step comprises measuring a voltage across the tank circuit. In some embodiments, the superconducting qubit in the plurality of superconducting qubits is a persistent current qubit.

A fifth aspect of the present invention provides a structure for adiabatic quantum computing comprising a plurality of superconducting qubits. The plurality of superconducting qubits is capable of being in any one of at least two configurations at any give time. The at least two configurations include a first configuration characterized by an initialization Hamiltonian $H_0$ and a second Hamiltonian characterized by a problem Hamiltonian $H_P$. The problem Hamiltonian has a ground state. Each respective first superconducting qubit in the plurality of superconducting qubits is coupled with a respective second superconducting qubit in the plurality of superconducting qubits such that the first respective superconducting qubit and the corresponding second respective superconducting qubit define a predetermined coupling strength. The predetermined coupling strength between each of the first respective superconducting qubits and the corresponding second respective superconducting qubits collectively define a computational problem to be solved. A tank circuit is inductively coupled to all or a portion of the plurality of superconducting qubits.

In some embodiments in accordance with the fifth aspect of the invention, a superconducting qubit in the plurality of superconducting qubits is a persistent current qubit. In some embodiments, the tank circuit has a quality factor that is greater than 1000. In some embodiments, the tank circuit comprises an inductive element. The inductive element comprises a pancake coil of superconducting material. In some embodiments, the pancake coil of a superconducting material comprising a first turn and a second turn. The superconducting material of the pancake coil is niobium. Furthermore, there is a spacing of 1 about micrometer between the first turn and the second turn of the pancake coil.

In some embodiments in accordance with the fifth aspect of the invention, the tank circuit comprises an inductive element and a capacitive element that are arranged in parallel or in series with respect to each other. In some embodiments, the tank circuit comprises an inductive element and a capacitive element that are arranged in parallel with respect to each other and the tank circuit has an inductance between about 50 nanohenries and about 250 nanohenries. In some embodiments, the tank circuit comprises an inductive element and a capacitive element that are arranged in parallel with respect to each other and the tank circuit has a capacitance between about 50 picofarads and about 2000 picofarads. In some embodiments, the tank circuit comprises an inductive element and a capacitive element that are arranged in parallel with respect to each other and the tank circuit has a resonance frequency between about 10 megahertz and about 20 megahertz. In some embodiments, the tank circuit has a resonance frequency $f_T$ that is determined by the equality:

$$f_T = \omega_T/2\pi = 1/\sqrt{L_T C_T}$$

such that $L_T$ is an inductance of the tank circuit; and $C_T$ is a capacitance of the tank circuit.

In some embodiments in accordance with the fifth aspect of the invention, the tank circuit comprises one or more Josephson junctions. In some embodiments, the structure further comprises means for biasing the one or more Josephson junctions of the tank circuit. In some embodiments, the structure further comprises an amplifier connected across the tank circuit in such a manner that the amplifier can detect a change in voltage across the tank circuit. In some embodiments, the amplifier comprises a high electron mobility field-effect transistor (HEMT) or a pseudomorphic high electron mobility field-effect transistor (PHEMT). In some embodiments, the amplifier comprises a multi-stage amplifier. In some embodiments, the multi-stage amplifier comprises two, three, or four transistors. In some embodiments, structure further comprises a helium-3 pot of a dilution refrigerator that is thermally coupled to all or a portion of the plurality of superconducting qubits. to.

In some embodiments in accordance with the fifth aspect of the invention, the structure further comprising means for driving the tank circuit by a direct bias current $I_{DC}$. In some embodiments, the structure further comprises means for driving the tank circuit by an alternating current $I_{RF}$ of a frequency $\omega$ close to the resonance frequency $\omega_0$ of the tank circuit. In some embodiments, the total externally applied magnetic flux to a superconducting qubit in the plurality of superconducting qubits, $\Phi_E$, is $$\Phi_E = \Phi_{DC} + \Phi_{RF}$$

where, $\Phi_{RF}$ is an amount of applied magnetic flux contributed to the superconducting qubit by the alternating current $I_{RF}$; and $\Phi_{DC}$ is an amount of applied magnetic flux that is determined by the direct bias current $I_{DC}$. In some embodiments, the structure further comprises means for applying a magnetic field on the superconducting qubit, and wherein $$\Phi_{DC} = \Phi_A + f(t)\Phi_0,$$

where, $\Phi_0$ is one flux quantum;

$f(t)\Phi_0$ is constant or is slowly varying and is generated by the direct bias current $I_{DC}$; and $\Phi_A = B_A \times L_Q$, such that $B_A$ is a magnitude of the magnetic field applied on the superconducting qubit by the means for applying the magnetic field; and $L_Q$ is an inductance of the superconducting qubit.

In some embodiments f(t) has a value between 0 and. In some embodiments, the means for applying a magnetic field on the superconducting qubit comprises a bias line that is magnetically coupled to the superconducting qubit. In some embodiments, the means for applying a magnetic field on the superconducting qubit is an excitation device. In some embodiments, $\Phi_{RF}$ has a magnitude between about $10^{-5}\Phi_0$ and about $10^{-1}\Phi_0$. In some embodiments, the structure further comprises means for varying f(t), $\Phi_A$, and/or $\Phi_{RF}$. In some embodiments, the structure further comprises means for varying $\Phi_{RF}$ in accordance with a small amplitude fast function. In some embodiments, the means for varying $\Phi_{RF}$ in accordance with a small amplitude fast function is a microwave generator that is in electrical communication with the tank circuit.

In some embodiments in accordance with the fifth aspect of the invention, the structure further comprises an amplifier connected across the tank circuit and means for measuring a total impedance of the tank circuit, expressed through the phase angle $\chi$ between driving current $I_{RF}$ and the tank voltage. In some embodiments, the means for measuring a total impedance of the tank circuit is an oscilloscope.

A sixth aspect of the invention provides a computer program product for use in conjunction with a computer system. The computer program product comprises a computer readable storage medium and a computer program mechanism embedded therein. The computer program mechanism comprises instructions for initializing a quantum system comprising a plurality of superconducting qubits to an initialization Hamiltonian $H_O$. The quantum system is capable of being in one of at least two configurations at any give time. The at least two configurations include a first configuration characterized by the initialization Hamiltonian $H_O$ and a second configuration characterized by a problem Hamiltonian $H_P$. Each respective first superconducting qubit in the plurality of superconducting qubits is arranged with respect to a respective second superconducting qubit in the plurality of superconducting qubits such that the first respective superconducting qubit and the second respective superconducting qubit define a predetermined coupling strength. The predetermined coupling strengths between each of the first respective superconducting qubits and the second respective superconducting qubits collectively define a computational problem to be solved. The computer program mechanism further comprises instructions for adiabatically changing the quantum system until it is described by the ground state of the problem Hamiltonian $H_P$ and instructions for reading out the state of the quantum system.

In some embodiments in accordance with this sixth aspect of the invention, the computer program mechanism further comprises instructions for repeating the instructions for biasing, instructions for adding, and instructions for adiabatically varying between 1 time and 100 times inclusive. The presence or absence of the voltage response of the tank circuit is observed as an average of the voltage response of the tank circuit to each instance of the instructions for adiabatically changing that are executed by the instructions for repeating.

A seventh aspect of the invention comprises a computer program product for use in conjunction with a computer system. The computer program product comprises a computer readable storage medium and a computer program mechanism embedded therein. The computer program mechanism determines a quantum state of a first target superconducting qubit in a plurality of superconducting qubits. The computer program mechanism comprises instructions for initializing a plurality of superconducting qubits so that they are described by a problem Hamiltonian. The problem Hamiltonian describes (i) the quantum state of the plurality of superconducting qubits and (ii) each coupling energy between qubits in the plurality of qubits. The problem Hamiltonian is at or near a ground state. The computer program mechanism further comprises instructions for adding an rf-flux to the first target superconducting qubit. The rf-flux has an amplitude that is less than one flux quantum. The computer program mechanism further comprises instructions for adiabatically varying an amount of an additional flux in the first target superconducting qubit and observing a presence or an absence of a dip in a voltage response of a tank circuit that is inductively coupled with the first target superconducting qubit during the adiabatically varying step.

In some embodiments in accordance with this seventh aspect of the invention, each superconducting qubit in the plurality of superconducting qubits is in a quantum ground state during all or a portion of the instructions for initializing, instructions for adding, and the instructions for adiabatically varying. In some embodiments, the problem Hamiltonian corresponds to a terminus of an adiabatic evolution of the plurality of superconducting qubits. In some embodiments, the computer program product further comprises instructions for biasing all or a portion of the superconducting qubits in the plurality of superconducting qubits. In such embodiments, the problem Hamiltonian additionally describes the biasing on the qubits in the plurality of superconducting qubits. In some embodiments, an energy of the biasing exceeds the tunneling energy of a tunneling element of the Hamiltonian of a superconducting qubit in the plurality of superconducting qubits thereby causing tunneling to be suppressed in the superconducting qubit during an instance of the instructions for biasing, instructions for adding and the instructions for adiabatically varying.

In some embodiments in accordance with the seventh aspect of the invention, the computer program mechanism further comprises instructions for adiabatically removing additional flux that was added to the first target superconducting qubit during the instructions for adiabatically varying. In some embodiments, the instructions for adiabatically varying comprise instructions for adiabatically varying the additional flux in accordance with a waveform selected from the group consisting of periodic, sinusoidal, triangular, and trapezoidal. In some embodiments, the instructions for adiabatically varying comprise instructions for adiabatically varying the additional flux in accordance with a low harmonic Fourier approximation of a waveform selected from the group consisting of periodic, sinusoidal, triangular, and trapezoidal. In some embodiments, the additional flux has a direction that is deemed positive or negative. In some embodiments, the instructions for adiabatically varying are characterized by a waveform that has an amplitude that grows with time and such that the amplitude of the waveform corresponds to an amount of additional flux that is added to the first target superconducting qubit during an instance of the instructions for adiabatically varying.

In some embodiments in accordance with the seventh aspect of the invention, the additional flux has an equilibrium point that varies with time. In some embodiments, the additional flux is either unidirectional or bidirectional. In some embodiments, the additional flux has a frequency of oscillation between about 1 cycle per second and about 100 kilocycles per second. In some embodiments, the instructions for adding comprise instructions for adding the rf-flux using (i) an excitation device that is inductively coupled to the first target superconducting qubit or (ii) the tank circuit. In some embodiments, the computer program mechanism further comprises instructions for repeating the instructions for adding and the instructions for adiabatically varying between 1 time and 100 times. In such embodiments, the presence or absence of the voltage response of the tank circuit is observed as an average of the voltage response of the tank circuit across each instance of the instructions for adiabatically varying that is executed by the instructions for repeating.

An eight aspect of the invention comprises a computer system for determining a quantum state of a first target superconducting qubit in a plurality of superconducting qubits. The computer system comprises a central processing unit and a memory, coupled to the central processing unit. The memory stores instructions for biasing all or a portion of the qubits in the plurality of superconducting qubits other than the first target superconducting qubit. A problem Hamiltonian describes (i) the biasing on the qubits in the plurality of superconducting qubits and (ii) each coupling energy between respective superconducting qubit pairs in the plurality of superconducting qubits. The problem Hamiltonian is at or near a ground state. The memory further stores instructions for adding an rf-flux to the first target superconducting qubit. The rf-flux has an amplitude that is less than one flux quantum. The memory further stores instructions for adiabatically varying an amount of an additional flux in the first target superconducting qubit and observing a presence or an absence of a dip in a voltage response of a tank circuit that is inductively coupled with the first target superconducting qubit during a time when the instructions for adiabatically varying are executed.

A ninth aspect of the present invention provides a computation device for adiabatic quantum computing comprising a plurality of superconducting qubits. Each superconducting qubit in the plurality of superconducting qubits comprises two basis states associated with the eigenstates of a $\sigma^z$ Pauli matrix that can be biased. The quantum computation device further comprises a plurality of couplings. Each coupling in the plurality of couplings is disposed between a superconducting qubit pair in the plurality of superconducting qubits. Each term Hamiltonian for a coupling in the plurality of couplings has a principal component proportional to $\sigma^z \otimes \sigma^z$. The sign for at least one principal component proportional to $\sigma^z \otimes \sigma^z$ for a coupling in the plurality of couplings is antiferromagnetic. The superconducting qubits and the plurality of couplings are collectively capable of being in any one of at least two configurations. The at least two configurations include a first configuration characterized by an initialization Hamiltonian $H_0$ and a second Hamiltonian characterized by a problem Hamiltonian $H_P$. The problem Hamiltonian has a ground state. Each respective first superconducting qubit in the plurality of superconducting qubits is coupled with a respective second superconducting qubit in the plurality of superconducting qubits such that the first respective superconducting qubit and the corresponding second respective superconducting qubit define a predetermined coupling strength. The predetermined coupling strength between each of the first respective superconducting qubits and the corresponding second respective superconducting qubits collectively define a computational problem to be solved. The computation device further comprises a read out circuit coupled to at least one superconducting qubit in the plurality of superconducting qubits.

A tenth aspect of the invention comprises an apparatus comprising a plurality of superconducting charge qubits. Each respective first superconducting charge qubit in the plurality of superconducting charge qubits is coupled with a respective second superconducting charge qubit in the plurality of superconducting charge qubits such that the first respective superconducting charge qubit and the second respective superconducting charge qubit define a predetermined coupling strength. The predetermined coupling strength between each of the first respective superconducting charge qubits and each of the second respective superconducting charge qubits in the plurality of superconducting charge qubits collectively define a computational problem to be solved. Each superconducting charge qubit in the plurality of superconducting charge qubits is capable of being in one of at least two configurations. These at least two configurations include a first configuration in accordance with an initialization Hamiltonian $H_0$ and a second configuration in accordance with a problem Hamiltonian $H_P$. The apparatus further comprises an electrometer coupled to a superconducting charge qubit in the plurality of superconducting charge qubits.

In some embodiments in accordance with this tenth aspect of the invention, a superconducting charge qubit in the plurality of superconducting charge qubits comprises (i) a mesoscopic island made of superconducting material, (ii) superconducting reservoir, and (iii) a Josephson junction connecting the mesoscopic island to the superconducting reservoir. In some embodiments, the Josephson junction is a split Josephson junction. In some embodiments, the superconducting charge qubit further comprises a flux source configured to apply flux to the split Josephson junction.

In some embodiments in accordance with the tenth aspect of the invention, the apparatus further comprises a generator capacitively coupled to a superconducting charge qubit in the plurality of superconducting charge qubits by a capacitor. In some embodiments, the generator is configured to apply a plurality of electrostatic pulses to the superconducting charge qubit. The plurality of electrostatic pulses additionally define the computational problem.

In some embodiments in accordance with the tenth aspect of the invention, the apparatus further comprises a variable electrostatic transformer disposed between a first superconducting charge qubit and a second superconducting charge qubit in the plurality of superconducting charge qubits such that the predetermined coupling strength between the first superconducting charge qubit and the second superconducting charge qubit is tunable. In some embodiments, each respective first superconducting charge qubit in the plurality of superconducting charge qubits is arranged with respect to a respective second superconducting charge qubit in the plurality of superconducting charge qubits such that the plurality of superconducting charge qubits collectively form a nonplanar graph.

An eleventh aspect of the invention provides a method for computing using a quantum system comprising a plurality of superconducting charge qubits. The quantum system is coupled to an electrometer and the quantum system is capable of being in any one of at least two configurations. The at least two configurations includes a first configuration characterized by an initialization Hamiltonian $H_0$ and a second configuration characterized by a problem Hamiltonian $H_P$. The problem Hamiltonian has a ground state. The plurality of superconducting charge qubits are arranged with respect to one another, with a predetermined number of couplings between respective pairs of superconducting charge qubits in the plurality of charge qubits, such that the plurality of superconducting charge qubits, coupled by the predetermined number of couplings, collectively define a computational problem to be solved. The method comprises initializing the quantum system to the initialization Hamiltonian $H_O$. Then the quantum system is adiabatically changed until it is described by the ground state of the problem Hamiltonian $H_P$. Next the quantum state of each superconducting charge qubit in the quantum system is read out through the electrometer, thereby solving the computational problem to be solved.

In some embodiments in accordance with the eleventh aspect of the invention, a first superconducting charge qubit in the plurality of superconducting charge qubits is coupled to a second superconducting charge qubit in the plurality of superconducting charge qubits by a capacitor such that the predetermined coupling strength between the first superconducting charge qubit and the second superconducting charge qubit is predetermined and is a function of the physical properties of the capacitor.

In some embodiments in accordance with the eleventh aspect of the invention, a first superconducting charge qubit in the plurality of superconducting charge qubits is coupled to a generator by a device configured to provide a tunable effective charging energy. The device comprises a capacitor and the method further comprises: tuning the value of the effective charging energy of the first superconducting charge qubit by varying the gate voltage on the capacitor of said device. In some embodiments, a superconducting charge qubit in the plurality of superconducting charge qubits comprises a split Josephson junction having a variable effective Josephson energy. In such embodiments, the method further comprises tuning the value of the effective Josephson energy of the superconducting charge qubit by varying a flux applied to the split Josephson junction. In some embodiments, the first configuration is reached by setting the effective Josephson energy of the superconducting charge qubit to a maximum value.

In some embodiments in accordance with the eleventh aspect of the invention, the adiabatically changing step comprises changing the configuration of the system from the first configuration characterized by the initialization Hamiltonian $H_0$, to the second Hamiltonian characterized by a problem Hamiltonian $H_P$ in the presence of tunneling on a superconducting charge qubit in the plurality of superconducting charge qubits.

In some embodiments in accordance with a eleventh aspect of the invention, a first superconducting charge qubit in the plurality of superconducting charge qubits is characterized by (i) an effective Josephson energy that is tunable and (ii) an effective charging energy that is tunable. A minimum value of the effective Josephson energy is less than the effective charging energy of the first superconducting charge qubit A minimum value of the effective Josephson energy is less than a strength of a coupling between the first superconducting charge qubit and a second superconducting charge qubit in the plurality of superconducting charge qubits. The effective charging energy is, at most, equal to a maximum value of the effective Josephson energy of the first superconducting charge qubit. Furthermore, a strength of a coupling between the first superconducting charge qubit and a second superconducting charge qubit in the plurality of superconducting charge qubits is, at most, equal to a maximum value of the effective Josephson energy of the first superconducting charge qubit.

In still another embodiment in accordance with the eleventh aspect of the invention, a first superconducting charge qubit in the plurality of superconducting charge qubits is characterized by (i) an effective Josephson energy that is tunable and (ii) an effective charging energy that is tunable. In such embodiments, the adiabatically changing step comprises adiabatically tuning the effective Josephson energy of the first superconducting charge qubit such that the effective Josephson energy of the first superconducting charge qubit reaches a minimum value when the quantum system is described by the ground state of the problem Hamiltonian $H_P$.

In some embodiments in accordance with the eleventh aspect of the invention, a first superconducting charge qubit in the plurality of superconducting charge qubits has a first basis state and a second basis state and, when the quantum system is described by the ground state of the problem Hamiltonian $H_P$, tunneling between the first basis state and the second basis state of the first superconducting charge qubit does not occur.

In some embodiments in accordance with the eleventh aspect of the invention, a first superconducting charge qubit in the plurality of superconducting charge qubits has a first basis state and a second basis state and, when the quantum system is described by the ground state of the problem Hamiltonian $H_P$, the tunneling between the first basis state and the second basis state of the first superconducting charge qubit does occur. Furthermore, the reading out step comprises probing an observable of the sigma-x Pauli matrix $\sigma^x$.

In some embodiments in accordance with the eleventh aspect of the invention, a first superconducting charge qubit in the plurality of superconducting charge qubits is characterized by (i) an effective Josephson energy that is tunable and (ii) an effective charging energy that is tunable. In such embodiments, a minimum value of the effective Josephson energy is less than the effective charging energy of the first superconducting charge qubit; a minimum value of effective Josephson energy is less than a strength of a coupling between the first superconducting charge qubit and a second superconducting charge qubit in the plurality of superconducting charge qubits; the effective charging energy is greater than a maximum value of the effective Josephson energy of the first superconducting charge qubit; and a strength of a coupling between the first superconducting charge qubit and a second superconducting charge qubit in the plurality of superconducting charge qubits is, at most, equal to the maximum effective Josephson energy of the first superconducting charge qubit. In some such embodiments, the initializing step comprises setting the effective charging energy of the first superconducting charge qubit to a minimum value. In some such embodiments, the adiabatically changing step comprises adiabatically tuning the effective Josephson energy of the first superconducting charge qubit such that the effective Josephson energy is at a minimum value when the quantum system is described by the ground state of the problem Hamiltonian $H_P$, and adiabatically increasing the effective charging energy of the first superconducting charge qubit.

In some embodiments in accordance with the eleventh aspect of the invention, a first superconducting charge qubit in the plurality of superconducting charge qubits is characterized by an effective Josephson energy that is tunable. The initializing step comprises setting the effective Josephson energy of the first superconducting charge qubit to a minimum value, and the adiabatically changing step comprises (i) adiabatically tuning the effective Josephson energy of the first superconducting charge qubit such that the effective Josephson energy is greater than a minimum value for a period of time before the quantum system is described by the ground state of the problem Hamiltonian $H_P$, and adiabatically tuning the effective Josephson energy of the first superconducting charge qubit such that the effective Josephson energy is at a minimum value when the quantum system is described by the ground state of the problem Hamiltonian $H_P$.

4. BRIEF DESCRIPTION OF THE DRAWINGS

FIG. 3 illustrates a known general equation that describes the theory of adiabatic quantum computing.

FIGS. 12A-12D illustrate superconducting charge qubits and read out devices in accordance with some embodiments of the present invention.

Like reference numerals refer to corresponding parts throughout the several views of the drawings.

5. DETAILED DESCRIPTION OF THE INVENTION

The present invention comprises systems and methods for adiabatic quantum computing using superconducting qubits. In various embodiments of the present invention, adiabatic quantum computing is performed on registers of superconducting qubits that have demonstrated quantum computing functionality. Adiabatic quantum computing is a model of quantum computing that can be used to attempt to find solutions for computationally difficult problems.

General Embodiments

When choosing a candidate system for adiabatic quantum computing there are a few criteria that can be observed. These criteria can be drawn from those described herein below. However, some embodiments of the present invention may not adhere to all of these criteria. One criterion is that the readout device should a Stern-Gerlach $\sigma^Z$ type observation. A second criterion is that the tunneling term in the problem Hamiltonian should be about zero. For $H_P=\Delta\sigma^X+\epsilon\sigma^Z$ then $\Delta\approx 0$. A third criterion is that the magnitude of the tunneling term in the problem, initial, or extra Hamiltonian ($H_P$, $H_0$, $H_E$) should be tunable. A fourth criterion is that the qubit-qubit coupling should be diagonal in the basis of final qubit states, i.e., $\sigma^Z \otimes \sigma^Z$. Because an Ising model with ferromagnetic couplings has a trivial ground state, all spins aligned, a fifth criterion is that the system have some antiferromagnetic coupling between qubits. Some AFM couplings include the case where all are antiferromagnetic. Also, ferromagnetic couplings have a negative sign $-J\sigma^Z \otimes \sigma^Z$, and antiferromagnetic couplings have a positive sign $J\sigma^Z \otimes \sigma^Z$.

Some embodiments of the present invention adhere to the above criteria. Other embodiments of the present invention do not. For instance, in the case of the phase qubit, it is possible to have the tunneling term in the problem Hamiltonian be, not zero, but weak, e.g., for $H_P=\Delta\sigma^X+\epsilon\sigma^Z$ then $\Delta<<\epsilon$. In such a case it is possible for the readout device to probe a Stern-Gerlach $\sigma^X$ type observable. Other embodiments of superconducting adiabatic quantum computers of the present invention do not adhere to the third criterion described above. For example, the magnitude of the tunneling term in the problem, initial, or extra Hamiltonian ($H_P$, $H_0$, $H_E$) is fixed but the contribution of the problem, initial, or extra Hamiltonian to the instant Hamiltonian is tunable in such embodiments. Specific embodiments of the present invention are described below.

5.1 Exemplary General Procedure

Figure 4:
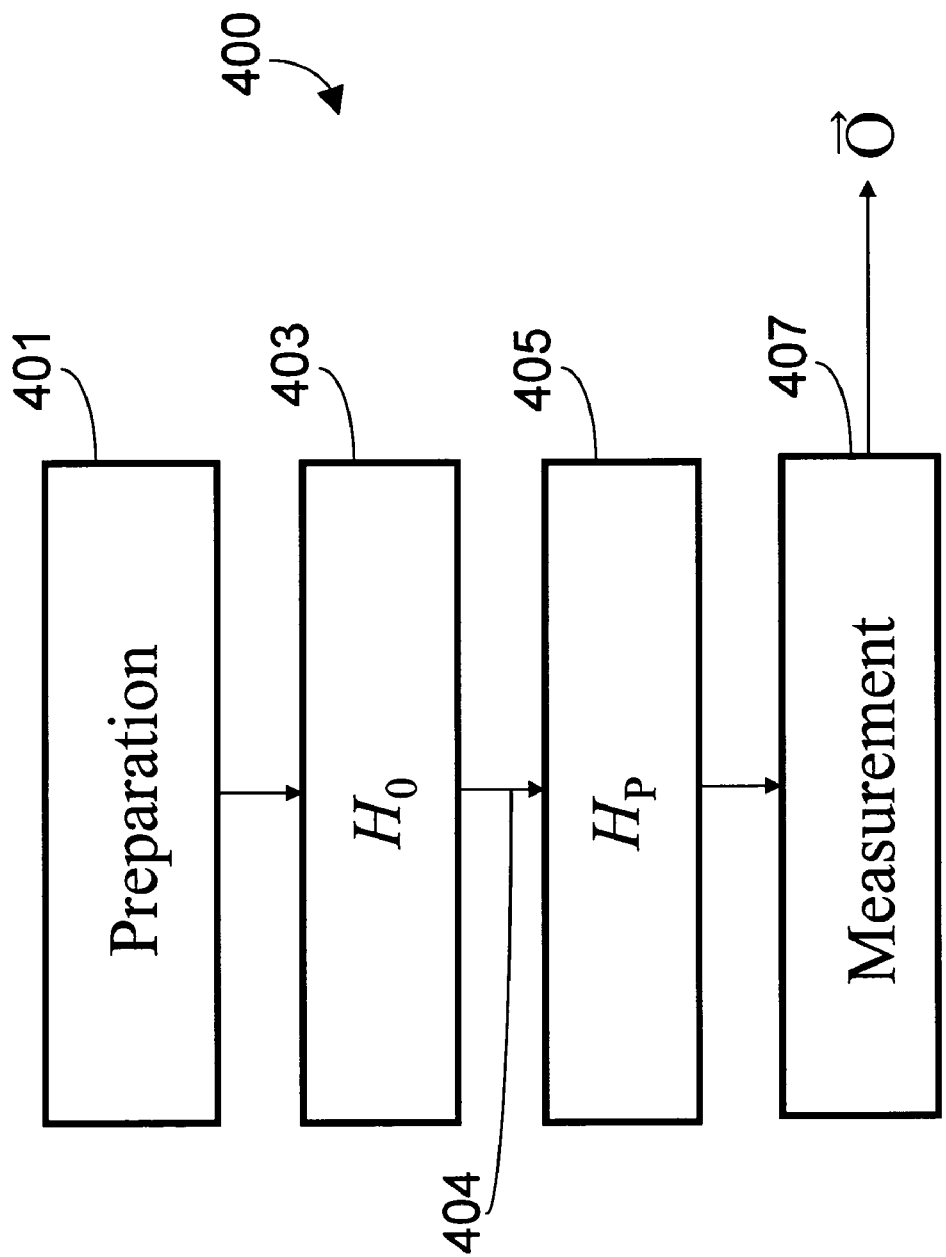
FIG. 4 illustrates a work flow diagram for a process of adiabatic quantum computing.

In accordance with embodiments of the present invention, the general procedure of adiabatic quantum computing is shown in FIG. 4. In step 401, a quantum system that will be used to solve a computation is selected and/or constructed. In some embodiments, each problem or class of problems to be solved requires a custom quantum system designed specifically to solve the problem. Once a quantum system has been chosen, an initial state and a final state of the quantum system need to be defined. The initial state is characterized by the initial Hamiltonian $H_0$ and the final state is characterized by the final Hamiltonian $H_P$ that encodes the computational problem to be solved. In preferred embodiments, the quantum system is initiated to the ground state of the initial Hamiltonian $H_0$ and, when the system reaches the final state, it is in the ground state of the final Hamiltonian $H_P$. More details on how systems are selected and designed to solve a computational problem are described below.

In step 403, the quantum system is initialized to the ground state of the time-independent Hamiltonian, $H_0$, which initially describes the quantum system. It is assumed that the ground state of $H_0$ is a state to which the system can be reliably and reproducibly set. As will be disclosed in further detail below, this assumption is reasonable for quantum systems comprising, at a minimum, specific types of qubits and specific types of arrangements of such qubits.

In transition 404 between steps 403 and 405, the quantum system is acted upon in an adiabatic manner in order to alter the system. The system changes from being described by Hamiltonian $H_0$ to a description under $H_P$. This change is adiabatic, as defined above, and occurs in a period of time T. In other words, the operator of an adiabatic quantum computer causes the system, and Hamiltonian H describing the system, to change from $H_0$ to a final form $H_P$ in time T. The change is an interpolation between $H_0$ and $H_P$. The change can be a linear interpolation:

$$H(t) = (1-\gamma(t))H_0 + \gamma(t)H_P$$

where the adiabatic evolution parameter, $\gamma(t)$, is a continuous function with $\gamma(t=0)=0$, and $\gamma(t=T)=1$. The change can be a linear interpolation, $\gamma(t)=t/T$ such that $$H\left(\frac{t}{T}\right) = \left(1 - \frac{t}{T}\right)H_0 + \frac{t}{T}H_P.$$

In accordance with the adiabatic theorem of quantum mechanics, a system will remain in the ground state of H at every instance the system is changed and after the change is complete, provided the change is adiabatic. In some embodiments of the present invention, the quantum system starts in an initial state $H_0$ that does not permit quantum tunneling, is perturbed in an adiabatic manner to an intermediate state that permits quantum tunneling, and then is perturbed in an adiabatic manner to the final state described above.

In step 405, the quantum system has been altered to one that is described by the final Hamiltonian. The final Hamiltonian $H_P$ can encode the constraints of a computational problem such that the ground state of $H_P$ corresponds to a solution to this problem. Hence, the final Hamiltonian is also called the problem Hamiltonian $H_P$. If the system is not in the ground state of $H_P$, the state is an approximate solution to the computational problem. Approximate solutions to many computational problems are useful and such embodiments are fully within the scope of the present invention.

In step 407, the system described by the final Hamiltonian $H_P$ is read out. The read out can be in the $\sigma^z$ basis of the qubits. If the read out basis commutes with the terms of the problem Hamiltonian $H_p$, then performing a read out operation does not disturb the ground state of the system. The read out method can take many forms. The object of the read out step is to determine exactly or approximately the ground state of the system. The states of all qubits are represented by the vector $\vec{O}$, which gives a concise image of the ground state or approximate ground state of the system. The read out method can compare the energies of various states of the system. More examples are given below, making use of specific qubits for better description.

5.2 Changing a Quantum System Adiabatically

In one embodiment of the present invention, the natural quantum mechanical evolution of the quantum system under the slowly changing Hamiltonian H(t) carries the initial state $H_0$ of the quantum system into a final state, the ground state of $H_P$, corresponding to the solution of the problem defined by the quantum system. A measurement of the final state of the quantum system reveals the solution to the computational problem encoded in the problem Hamiltonian. In such embodiments, an aspect that can define the success of the process is how quickly (or slowly) the change between the initial Hamiltonian and problem Hamiltonian occurs. How quickly one can drive the interpolation between $H_0$ and $H_P$, while keeping the system in the ground state of the instantaneous Hamiltonians that the quantum system traverses through in route to $H_P$, is a determination that can be made using the adiabatic theorem of quantum mechanics. This section provides a detailed explanation of the adiabatic theorem of quantum mechanics. More particularly, this section describes how quantum mechanics imposes constraints on which quantum systems can be used in accordance with the present invention and how such quantum systems can be used to solve computational problems using the methods of the present invention.

A quantum system evolves under the Schrödinger equation:

$$i\frac{\partial}{\partial t}|\psi(t)\rangle = \Theta(t)H(t)|\psi(t)\rangle,$$

where $\Theta(t)$ and $H(t)$ are respectively the time ordering operator and Hamiltonian of the system. Adiabatic evolution is a special case where $H(t)$ is a slowly varying function. The time dependent basis states and energy levels of the Hamiltonian are:

$$H(t)|l;t\rangle = E_l(t)|l;t\rangle$$

where $l \in [0, N-1]$, and N is the dimension of the Hilbert space for the quantum system described by the Schrödinger equation. The energy levels, energies, or energy spectra of the quantum system $E_l(t)$ are a set of energies that the system can occupy. The energies of the states are a strictly increasing set.

A general example of the adiabatic evolution of a quantum system is as follows. The states $|0;t\rangle$ and $|1;t\rangle$ are respectively the ground and first excited states of Hamiltonian H(t), with energies $E_0(t)$ and $E_1(t)$. Gap g(t) is the difference between energies of the ground and first excited states as follows:

$$g(t) = E_1(t) - E_0(t).$$

If the quantum system is initialized in the ground state and evolved under H(t), where H(t) is slowly varying, and if the gap is greater than zero, then for $0 \leq t \leq T$ the quantum system will remain in the ground state. In other words:

$$|\langle E_0; T|\Psi(T)\rangle|^2 \geq 1-\epsilon^2.$$

Without intending to be limited to any particular theory, it is believed that the existence of the gap means that the quantum system under the Schrödinger equation remains in the ground state with high fidelity, e.g., $1-\epsilon^2 (\epsilon<<1)$. The fidelity of the operation can be found quantitatively.

The minimum energy gap between the ground state $E_0$ and first excited state $E_1$ of the instantaneous Hamiltonian is given by $g_{min}$ where:

$$g_{\min} = \min_{0 \leq t \leq T} [E_1(t) - E_0(t)].$$

Also relevant is the matrix element:

$$\left\langle \frac{dH}{dt} \right\rangle_{1,0} = \left\langle E_1; t \left| \frac{dH}{dt} \right| E_0; t \right\rangle.$$

The adiabatic theorem asserts fidelity of the quantum system will be close to unity provided that:

$$\frac{\left| \left\langle \frac{dH}{dt} \right\rangle_{1,0} \right|}{g_{\min}^2} \leq \epsilon$$

If this criterion is met, the quantum system will remain in the ground state.

In an embodiment of the present invention, T is the time taken to vary a control parameter of a charge qubit, for example induced gate charge or flux for a charge qubit with a split Josephson junction. See Section 5.4. In an embodiment of the present invention, time T is a value between about 0.1 nanosecond and about 500 microseconds. In other words, the amount of time between when the quantum system is allowed to begin adiabatically changing from the initial state $H_0$ to when the quantum system first reaches the final state $H_P$ is between about 0.1 nanoseconds and about 500 microseconds. In another embodiment of the present invention, time T is a value between about 10 nanoseconds and about 100 microseconds. In an embodiment of the present invention, time T is a value less than the inverse of the characteristic frequency of the physical system comprising superconducting qubits. The characteristic frequency of a qubit is the energy difference between a ground state and an excited state of a qubit, converted to energy units. Thus, the characteristic frequency of a physical system comprising qubits is the characteristic frequency of one or more qubits within the physical system.

In an embodiment of the present invention, T is the time taken to vary a control parameter of a phase qubit, for example flux in a persistent current qubit. See Section 5.3. In an embodiment of the present invention, time T is a value between about 1 nanosecond and about 100 microseconds. In other words, the amount of time between when the quantum system is allowed to begin adiabatically changing from the initial state $H_0$ to when the quantum system first reaches the final state $H_P$ is between about 1 nanosecond and about 100 microseconds. In an embodiment of the present invention, time T is a value between about 4 nanoseconds and about 10 microseconds. In some embodiments, the time T is calculated as the time at which a Landau-Zener transition is likely not to occur. For more information on Landau-Zener transitions see, for example, Garanin et al., 2002, *Phys. Rev. B* 66, 174438, which is hereby incorporated by reference in its entirety.

5.2.1 Application of Landau-Zener Theory

Most analyses of adiabatic algorithms emphasize how the gap, g(t), and the ratio of the matrix element <dH/dt>$_{1,0}$ to the square of the minimum of the gap, scale with increasing problem size. It is believed that, by examining these metrics, the validity of adiabatic algorithms, and other adiabatic processes, can be determined. Some embodiments of the present invention make use of an alternative analysis that looks at the probability of transition 404, or some other process, being diabatic (i.e. a process that involves heat transfer as opposed to an adiabatic process that involves no heat transfer). Rather than calculating the minimum gap, which is the difference between the energy of the ground and the first excited state of the quantum system 850 that models the problem to be solved, this additional analysis calculates the probability of a transition out of the ground state by the quantum system. In examples of the present invention, this probability calculation can be a more relevant metric for assessing the failure rate of the adiabatic algorithm or process. To perform the computation, it is assumed that any diabatic transition (any transition characterized by the transfer of heat) is a Landau-Zener transition, e.g., a transition confined to adjacent levels at anticrossings. A description of anticrossing levels is provided below in conjunction with FIGS. 9A and 9B. When the state of a plurality of qubits approaches an anticrossing, the probability for a transition out of the ground state can be parameterized by (i) the minimum of the gap, $g_{min}$, (ii) the difference in the slopes, $\Delta_m$, of the asymptotes for the energy levels of the qubit or plurality of qubits undergoing adiabatic change (e.g., quantum system 850 of FIG. 8), and (iii) the rate of change of the adiabatic evolution parameter, $d\gamma/dt = \dot\gamma$. For more information on the asymptotes for the energy levels of quantum system 850, see Section 5.3.2, below. The first estimate of the Landau-Zener transition probability is:

$$P_{LZ} = e^{-2\pi\eta}; \eta = \frac{1}{4\hbar} \frac{g_{\min}}{|\Delta m| \dot\gamma}.$$

The values for the parameters $g_{min}$, and $\Delta_m$ will vary with the specific instance of the algorithm being run on the adiabatic quantum computer.

Other embodiments of the present invention can be constructed and operated with a different estimate for the probability of a diabatic transition at step 404. For instance, in some embodiments the second estimate of the Landau-Zener transition probability is computed. This probability has the form:

$$P'_{LZ} = e^{-2\pi k \partial}; \partial = \frac{1}{\hbar} \frac{g_{\min}^2}{E_J f_P},$$

where k is a constant that is about 1, $E_J$ is the Josephson energy of the qubit (or maximum Josephson energy of the Josephson energies of a plurality of qubits), and $f_P$ is frequency of oscillation of an additional flux that is added to the superconducting qubit. The values for the parameters $g_{min}$, and $E_J$ will vary with the specific instance of the algorithm being run on the adiabatic quantum computer.

In many embodiments of the present invention, quantum systems for adiabatic quantum computation are designed such that the minimum of the energy gap, the difference in the asymptotic slopes, and the rate of change of the adiabatic evolution parameter ensure that the probability of diabatic transition at step 404 is small, e.g. $P_{LZ}$ is much smaller than 1. In an embodiment of the present invention, $P_{LZ}$ is $1 \times 10^{-4}$ or less. In another embodiment of the present invention, $P_{LZ}$ is $1 \times 10^{-3}$ or less. The probability of transition from the ground state of the quantum system to the first excited state of the quantum system is exponentially sensitive to the rate of change of the adiabatic evolution and provides a lower bound to that rate. The probability of transition from the ground state of the quantum system to the first excited state of the quantum system also provides an upper limit on rate of change of the adiabatic evolution parameter. The duration of an adiabatic algorithm, or process, should be less than the time it takes for a Landau-Zener transition to occur. If $P_{LZ}$ is the probability per anticrossing, then the quantum system (e.g., quantum system 850 of FIG. 8, which can be an individual qubit or a plurality of qubits) should be designed and operated such that the following inequality is satisfied: $P_{LZ} \times n_A << 1$, where $n_A$ is the number of anticrossings traversed in time T, or $T << (P_{LZ} \times \gamma \times \rho_A)^{-1}$, where $\rho_A$ is the density of anticrossings along the ground state of the energy spectra. The density of the anticrossings and crossings along the ground state can be calculated by an approximate evaluation method. See, for example Section 5.3.3, which describes approximate evaluation methods, below.

In some embodiments of the present invention, the amount of time required to perform the readout process should be engineered so that the probability that quantum system 850 will transition from the ground state to the first excited state is small (e.g., a probability less than one percent). For a readout process, the following should hold: $P_{LZ} \times m \times r << 1$, or $\tau << f_A \times (P_{LZ} \times m)^{-1}$, where m is the number of qubits, and r is the average number of cycles used to readout the qubits, $f_A$ is the frequency of the cycles used to readout the qubits, and $\tau$ is the time for the readout of one qubit in a plurality of m qubits.

In an embodiment of the present invention this requisite small probability for transition $P_{LZ}$ is dependent on the process performed. In the case of a readout process that applies additional flux to a superconducting qubit and measures the state through a tank circuit, such as the embodiment described in detail below in conjunction with FIG. 8, the value of "small" is dependent on the number of cycles (r) of the waveform of the additional flux used. For example, in an embodiment of the present invention that reads out one qubit in one cycle, a small $P_{LZ}$ value is $1 \times 10^{-2}$ or less. In an embodiment of the present invention that reads out n qubits in r cycles, a small $P_{LZ}$ value is $(r \times n)^{-1} \times 10^{-2}$ or less. In an embodiment of the present invention that reads out n qubits in r cycles, a small $P_{LZ}$ value is $(r \times n)^{-1} \times 10^4$ or less. The cumulative probability of transition over the adiabatic process and subsequent readout cycles should be small and the system designed and operated accordingly. In an embodiment of the present invention, a small cumulative probability of transition is about $1 \times 10^{-3}$ to about $1 \times 10^{-6}$. In an embodiment of the present invention, a small cumulative probability of transition is within ±0.05 or ±0.10 of the values given for $P_{LZ}$ hereinabove.

5.3 Phase Qubit Embodiments

Section 5.3 describes quantum computing systems of the present invention that make use of phase qubits. Section 5.4, below, describes quantum computing systems of the present invention that make use of charge qubits.

Figure 5A:
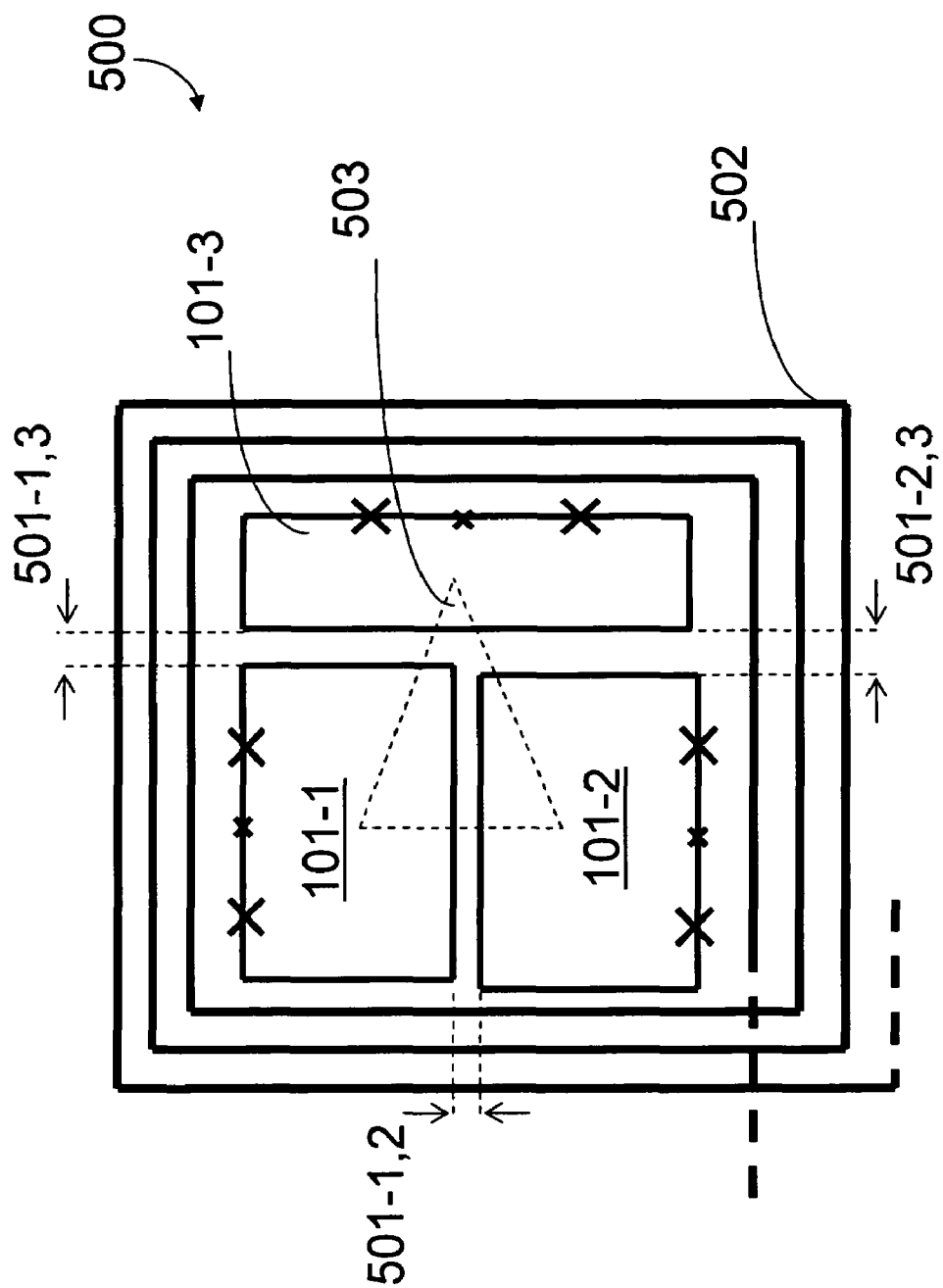
FIGS. 5A-5G illustrates arrangements of superconducting qubits for adiabatic quantum computing in accordance with some embodiments of the present invention.

5.3.1 Finding the Ground State of a Frustrated Ring Adiabatically Using a Persistent Current Qubit Quantum System FIG. 5A illustrates a first example of a quantum system 500 in accordance with an embodiment of the present invention. As will be discussed in detail in this section, in system 500, three coupled flux qubits are dimensioned and configured in accordance with the present invention such that system 500 is capable of finding the ground state of a frustrated quantum system using adiabatic computing methods.

5.3.1.1 General Description of the Persistent Current Qubit Quantum System Used in Exemplary Embodiments Referring to FIG. 5A, each qubit 101 in quantum system 500 includes a superconducting loop with three small-capacitance Josephson junctions in series that enclose an applied magnetic flux $f\Phi_0$ ($\Phi_0$ is the superconducting flux quantum h/2e, where h is Planck's constant) and f is a number that can range from 0 (no applied flux) to 0.5 or greater. Each Josephson junction is denoted by an "x" within the corresponding superconducting loop. In each qubit 101, two of the Josephson junctions have equal Josephson energy $E_J$, whereas the coupling in the third junction is $\alpha E_J$, with $0.5 < \alpha < 1$. Each qubit 101 has two stable classical states with persistent circulating currents of opposite sign. For f=0.5, the energies of the two states are the same. The barrier for quantum tunneling between the states depends strongly on the value of α. Qubits 101 having the design illustrated in FIG. 5A has been proposed by Mooij et al., 1999, *Science* 285, 1036, which is hereby incorporated by reference. The design and manufacture of such qubits is further discussed in Section 2.2.1, above.

The two stable states of a qubit 101 will have equal energy, meaning that they will be degenerate, and will therefore support quantum tunneling between the two equal energy states (basis states) when the amount of flux trapped in the qubit is $0.5\Phi_0$. The amount of flux required to trap $0.5\Phi_0$ in a qubit 101 is directly proportional to the area of the qubit. Here, the area of a qubit is defined as the area enclosed by the superconducting loop of the qubit. If the amount of flux needed to achieve a trapped flux of $0.5\Phi_0$ in a first qubit 101 having area $A_1$ is $B_1$, then the amount of flux that is needed to trap $0.5\Phi_0$ of flux in a second qubit having area $A_2$ is $(A_2/A_1)B_1$. Advantageously, in system 500, each qubit 101 has the same total surface area so that an external mechanism (e.g., a tank circuit) can cause each respective qubit 101 in system 500 to trap $0.5\Phi_0$ of flux at approximately or exactly the same time.

In preferred embodiments, the three persistent current qubits, 101-1, 101-2, and 101-3 in structure 500 are inductively coupled to a tank circuit (not fully shown in FIG. 5A). This tank circuit is comprised of both inductive and capacitive circuit elements. The tank circuit is used to bias qubits 101 such that they each trap $0.5\Phi_0$ of flux. In some embodiments of the present invention, the tank circuit has a high quality factor (e.g., Q>1000) and a low resonance frequency (e.g., a frequency less between 6 to 30 megahertz). The role of a tank circuit as a qubit control system is detailed in United States Patent Publication 2003/0224944 A1, entitled "Characterization and measurement of superconducting structures," as well as Il'ichev et al., 2004, "Radio-Frequency Method for Investigation of Quantum Properties of Superconducting Structures," arXiv.org: cond-mat/0402559; and Il'ichev et al., 2003, "Continuous Monitoring of Rabi Oscillations in a Josephson Flux Qubit," *Phys. Rev. Lett.* 91, 097906, each of which is hereby incorporated by reference in its entirety. An inductive element of a tank circuit is shown in FIG. 5A as element 502. In some embodiments, inductive element 502 is a pancake coil of superconducting material, such as niobium, with a nominal spacing of 1 micrometer between each turn of the coil. The inductive and capacitive elements of the tank circuit can be arranged in parallel or in series. For a parallel circuit, a useful set of values for a small number of qubits is an inductance of about 50 nanohenries to about 250 nanohenries, a capacitance of about 50 picofarads to about 2000 picofarads, and a resonance frequency of about 10 megahertz to about 20 megahertz. In some embodiments, the resonance frequency $f_T$ is determined by the formula $f_T = \omega_T/2\pi = 1/\sqrt{L_T C_T}$ where $L_T$ is the inductance and $C_T$ is the capacitance of the tank circuit.

5.3.1.2 Selection of Persistent Current Qubit Device Parameters

In some embodiments of the present invention, qubit parameters are chosen to satisfy the requirements of the problem to be solved by adiabatic quantum computation and the restrictions of the qubits. For instance, in the case of MAXCUT, the couplings between qubits can be chosen so that they are greater than the energy of the tunneling term of the individual qubit Hamiltonians. Unfortunately, for a persistent current qubit, the tunneling term is always non-zero and often non-variable. This presents a problem because, as was stated in Section 5.1, in preferred embodiments, a problem Hamiltonian $H_P$ is chosen for step 403 of FIG. 4 that does not permit quantum tunneling to occur. Yet, in the case of persistent current qubits, a state that does not permit quantum tunneling cannot be found because in such qubits the tunneling term is always non-zero. However, in contrast to what was stated in the general description of the adiabatic quantum processes of the present invention, it is not absolutely necessary to have the tunneling term absent from the problem Hamiltonian $H_P$ or the initial Hamiltonian $H_0$. In fact, some embodiments of the present inventions permit a non-zero tunneling term in $H_P$ and or/or $H_0$ for any combination of the following reasons: (i) the tunneling term leads to anticrossing useful for read out processes and (ii) the requirement of non-tunneling term is deemed to be too strict in such embodiments. As to the latter point, it is sufficient to have a coupling term that is much stronger than the tunneling term in some embodiments of the present invention.

In one particular embodiment of a qubit 101 in quantum system 500 (FIG. 5A), the critical current density of the Josephson junctions is 1000 amperes per centimeter squared. The largest and strongest junction of each qubit 101 in system 500 has an area of about 450 nanometers by 200 nanometers. The capacitance of the largest junction is 4.5 femtofarads and the ratio between the Josephson energy and the charging energy is about 100. The charging energy in such embodiments is $e^2/2C$. The ratio between the weakest and strongest Josephson junction is 0.707:1. The tunneling energies of qubits 101 in this embodiment are each about 0.064 Kelvin. The persistent current is 570 nanoamperes. For this value of the persistent current and for inter-qubit mutual inductances taken from the design of FIG. 5A, the coupling energies between the qubits are $J_{1,2}$=0.246 Kelvin, $J_{2,3}$=0.122 Kelvin, and $J_{1,3}$=0.059 Kelvin. All these parameters are within reach of current fabrication technology. The specific values for this exemplary embodiment are provided by way of example only and do not impose any limitation on other embodiments of system 500.

Various embodiments of the present invention provide different values for the persistent current that circulates in persistent current qubits 101. These persistent currents range from about 100 nanoamperes to about 2 milliamperes. The persistent current values change the slope of the asymptotes at anticrossing 915 (FIG. 9A). Specifically, the qubit bias is equal to $\pi I_P(2\Phi_E/\Phi_0-1)$, where $I_P$ is the persistent current value and the slope of the asymptote (e.g., asymptote 914 and/or 916) is proportional to the qubit bias, for large bias, when such bias is about 10 times the tunneling energy. In some embodiments of the present invention, qubits 101 have a critical current density of about 100 A/cm² to about 2000 A/cm². In some embodiments of the present invention, qubits 101 have a critical current that is less than about 200 nanoamperes, less than about 400 nanoamperes, less than about 500 nanoamperes or less than about 600 nanoamperes. In some embodiments of the present invention, the term "about" in relation to critical current means a variance of ±5%, ±10%, ±20%, and ±50% of the stated value.

5.3.1.3 Algorithm Used to Solve the Computational Problem

Step 401 (Preparation). An overview of an apparatus 500 used to solve a computational problem in accordance of the present invention has been detailed in Section 5.3.1.1. In this section, the general adiabatic quantum computing process set forth in FIG. 4 is described. In the first step, preparation, the problem to be solved and the system that will be used to solve the problem is described. Here, the problem to be solved is finding or confirming the ground state of a three node frustrated ring. System 500 is used to solve this problem. Entanglement of one or more qubits 101 is achieved by the inductive coupling of flux trapped in each qubit 101. The strength of this type of coupling between two abutting qubits is, in part, a function of the common surface area between the two qubits. Increased common surface area between abutting qubits leads to increased inductive coupling between the two abutting qubits.

In accordance with the present invention, the problem of determining the ground state of the three node frustrated ring is encoded into system 500 by customizing the coupling constants between neighboring qubits 101 using two variables: (i) the distance between the qubits and (ii) the amount of surface area common to such qubits. The lengths and widths of qubits 101, as well as the spatial separation between such qubits, is adjusted to customize inter-qubit inductive coupling strengths in such a way that these coupling strengths correspond to a computational problem to be solved (e.g., the ground state of a three member frustrated ring). In preferred embodiments, qubit 101 length and width choices are subject to the constraint that each qubit 101 have the same or approximately the same total surface area so that the qubits can be adjusted to a state where they each trap half a flux quantum at the same time.

As shown in FIG. 5A, the configuration of qubits 101 represents a ring with inherent frustration. The frustrated 530 ring is denoted by the dashed triangle in FIG. 5A through qubits 101. Each two qubits of the set {101-1, 101-2, 101-3} has a coupling that favors antiferromagnetic alignment, i.e. with flux aligned down and up, in the same way that bar magnets align NS with SN. Because of the presence of the odd third qubit and the asymmetry that results from the odd third qubit, system 500 does not permit such an alignment of coupling. This causes system 500 to be frustrated. In general, a ring-like configuration of an odd number of qubits will result in a frustrated system. Referring to FIG. 5A, in an embodiment of the invention, the area of each qubit 101 is approximately equal but the heights (y dimension) and widths (x dimension) are unequal. In one specific example, persistent current qubits, such as qubits 101, with an area of about 80 micrometers squared (e.g. height of about 9 micrometers and width of about 9 micrometers, height of 4 micrometers and width of 40 micrometers, etc.) are arranged with two congruent qubits paired lengthwise (e.g., 101-1 and 101-2) and a third non-congruent qubit (e.g., 101-3) laid transverse and abutting the end of the pair, as shown in FIG. 5A.

All three qubits 101-1, 101-2, and 101-3, have the same area subject to manufacturing tolerances. In some embodiments of the present invention, such tolerance allows for a ±25% deviation from the mean qubit surface area, in other embodiments such tolerance is ±15%, ±5%, ±2%, or less than ±1% deviation from the mean qubit surface area. Qubits 101-1, 101-2, and 101-3 are coupled to each other asymmetrically. In other words, the total surface area common to qubit 101-3 and 101-1 (or 101-2) is less than the total surface area common to qubit 101-1 and 101-2. Embodiments of the present invention, such as those that include a system like 500, have a Hamiltonian given by:

$$H = \sum_{i=1}^{N} [\varepsilon_i \sigma_i^Z + \Delta_i \sigma_i^X] + \sum_{i=1}^{N} \sum_{j>i}^{N} J_{ij} \sigma_i^Z \otimes \sigma_j^Z$$

where N is the number of qubits. The quantity $\Delta_i$ is the tunneling rate, or energy, of the $i^{th}$ qubit expressed in units of frequency, or energy. These unit scales differ by a factor of h or Plank's constant. The quantity $\varepsilon_i$ is the amount of bias applied to the qubit, or equivalently, the amount of flux in the loops of the qubits. The quantity $J_{ij}$ is the strength of the coupling between the $i^{th}$ and the $j^{th}$ qubit. The coupling energy is a function of the mutual inductance between qubits $J_{ij}=M_{ij}I_iI_j$. In order to encode the three node frustrated ring problem, the three coupling energies are arranged such that $J_{12} \gg J_{13} \approx J_{23}$.

In some embodiments of the present invention, the coupling strength between any two abutting qubits is a product of the mutual inductance and the currents in the coupled qubits. The mutual inductance is a function of common surface area and distance. The greater the common surface area the stronger the mutual inductance. The greater the distance the less the mutual inductance. The current in each qubit is a function of the Josephson energy of the qubit, $E_J$. $E_J$ depends on the type of Josephson junctions interrupting the superconducting loop within the qubit. Inductance calculations can be performed using programs such as FASTHENRY, a numeric three-dimensional inductance calculation program, is freely distributed by the Research Laboratory of Electronics of the Massachusetts Institute of Technology, Cambridge, Mass. See, Kamon, et al., 1994, "FASTHENRY: A Multipole-Accelerated 3-D Inductance Extraction Program," *IEEE Trans. on Microwave Theory and Techniques*, 42, pp. 1750-1758, which is hereby incorporated by reference in its entirety. Alternatively, mutual inductance can be calculated analytically using techniques known in the art. See Grover, *Inductance Calculations: Working Formulas and Tables*, Dover Publications, Inc., New York, 1946, which is hereby incorporated by reference in its entirety.

Step 403 (Initialization of system 500 to $H_0$). Qubits 101 of system 500 of FIG. 5A interact with their environment through a magnetic field that is applied perpendicular to the plane of FIG. 5A by causing a current to flow through coil 502 of the tank circuit. In step 403, system 500 is set to an initial state characterized by the Hamiltonian $H_o$ by applying such an external magnetic field. This externally applied magnetic field creates an interaction defined by the following Hamiltonian:

$$H_0 = Q \sum_{i=1}^{N} \sigma_i^Z$$

where Q represents the strength of the external magnetic field. In some embodiments, this external magnetic field has a strength such that $\epsilon \gg \Delta$ or $\epsilon \gg J$. That is, the magnetic field is on an energy scale that is large relative to other terms in the Hamiltonian. As an example, for a qubit having the dimensions of 50 to 100 micrometers squared, the magnetic field is between about $10^{-8}$ teslas and about $10^{-6}$ teslas. The energy of a magnetic field B in a persistent current qubit of area S, in terms of MKS units is $$\frac{1}{2\mu_0} S \cdot B^2$$

where $\mu_0$ is $4\pi \times 10^{-7}$ Wb/(A·m) (webers per ampere meter). The magnetic field also controls the bias $\epsilon$ applied to each qubit. In step 403, the large external magnetic field is used to initialize system 500 to the starting state characterized by the Hamiltonian $H_0$. System 500 is in the ground state |000> of $H_o$ when the flux that is trapped in each qubit 101 is aligned with the external magnetic field.

Once system 500 is in the ground state |000> of the starting state $H_0$, it can be used to solve the computational problem hard-coded into the system through the engineered inter-qubit coupling constants. To accomplish this, the applied magnetic field is removed at a rate that is sufficiently slow to cause the system to change adiabatically. At any given instant during the removal of the externally applied initialization magnetic field, the state of system 500 is described by the instantaneous Hamiltonian:

$$H = \sum_{i=1}^{N} [\varepsilon_i \sigma_i^Z + \Delta_i \sigma_i^X] + \sum_{i=1}^{N} \sum_{j>i}^{N} J_{ij} \sigma_i^Z \otimes \sigma_j^Z.$$

where $\Delta$ is a tunneling term that is a function of the bias $\epsilon$ applied by coil 502. As described above, it is preferred that the bias $\epsilon$ applied by coil 502 be such that a half flux quantum $(0.5\Phi_0)$ be trapped in each qubit 101 so that the two stable states of each qubit have the same energy (are degenerate) to achieve optimal quantum tunneling. Furthermore, it is preferred that each qubit have the same total surface area so that quantum tunneling in each qubit starts and stops at the same time. In less preferred embodiments, qubits 101 are biased by coil 502 such that the flux trapped in each qubit is an odd multiple of $0.5\Phi_0$ (e.g., 1.5, 2.5, 3.5, etc., or in other words, $N \cdot 0.5\Phi_0$, where N is 1, 2, 3, . . . ) since the bistable states of the qubits 101 will have equal energy (will be degenerate) in these situations as well. However, such higher amounts of trapped flux can have undesirable side effects on the properties of the superconducting current in the qubits. For instance, large amounts of trapped flux in qubits 101 may quench the superconducting current altogether that flows through the superconducting loop of each said loop. In some embodiments, the qubits are biased by coil 502 such that the amount of flux trapped in each qubit is $\zeta \cdot N \cdot 0.5\Phi_0$ where $\zeta$ is between 0.7 and 1.3, between 0.8 and 1.2, or between 0.9 and 1.1 and where N is a positive integer. However, qubits 101 tunnel best when the bias in each corresponds to half-flux quantum of flux.

Step 405 (reaching the problem state $H_P$). As the external perpendicularly applied field is adiabatically turned off, the problem Hamiltonian $H_P$ is arrived at:

$$H_p = \sum_{i=1}^{N} \sum_{j>i}^{N} J_{ij} \sigma_i^Z \otimes \sigma_j^Z$$

Note that, unlike the instantaneous Hamiltonian, the problem Hamiltonian does not include the tunneling term $\Delta$. Thus, when system 500 reaches the final problem state, the quantum states of each respective qubit 101 can no longer tunnel. Typically, the final state is one in which no external magnetic field is applied to qubits 101 and, consequently, qubits no longer trap flux.

Step 407 (Measurement). In step 407, the quantum system is measured. In the problem addressed in the present system, there eight possible solutions {000, 001, 010, 100, 011, 110, 101, and 111}. Measurement involves determining which of the eight solutions was adopted by system 500. An advantage of the present invention is that this solution will represent the actual solution of the quantum system.

In an embodiment of the present invention, the result of the adiabatic quantum computation is determined using individual qubit magnetometers. Referring to FIG. 5E, a device 517 for detecting the state of a persistent current qubit is placed proximate to each qubit 101. The state of each qubit 101 can then be read out to determine the ground state of $H_P$. In an embodiment of the present invention, the device 517 for detecting the state of the qubit is a DC-SQUID magnetometer, a magnetic force microscope, or a tank circuit dedicated to a single qubit 101. The read out of each qubit 101 creates an image of the ground state of Hp. In embodiments of the present invention the device for reading out the state of the qubit encloses the qubit. For example a DC-SQUID magnetometer like 517-7, 517-8, and 517-9 in FIG. 5E, may enclose a persistent current qubit, e.g. 101-7, 101-8, and 101-9, to increase the readout fidelity of the magnetometer.

Figure 5C:
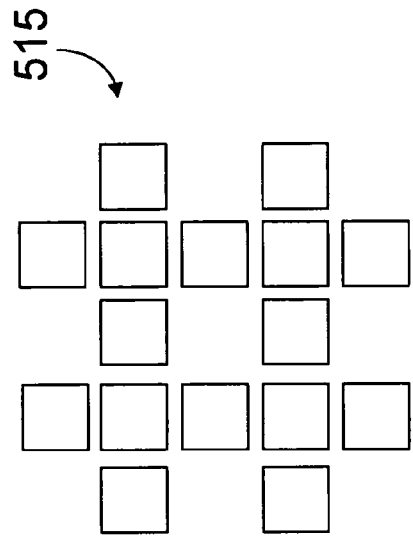
Figure 5D:
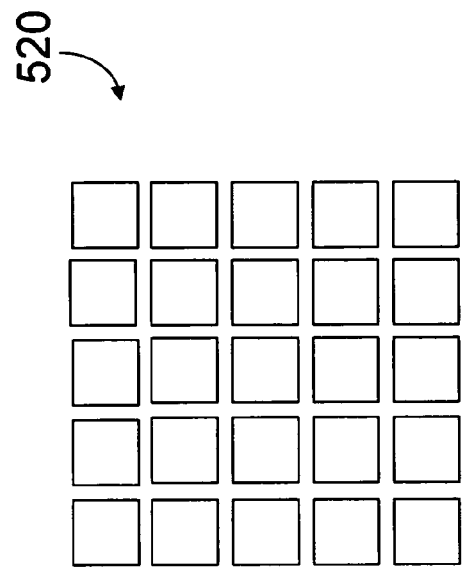
Figure 5B:
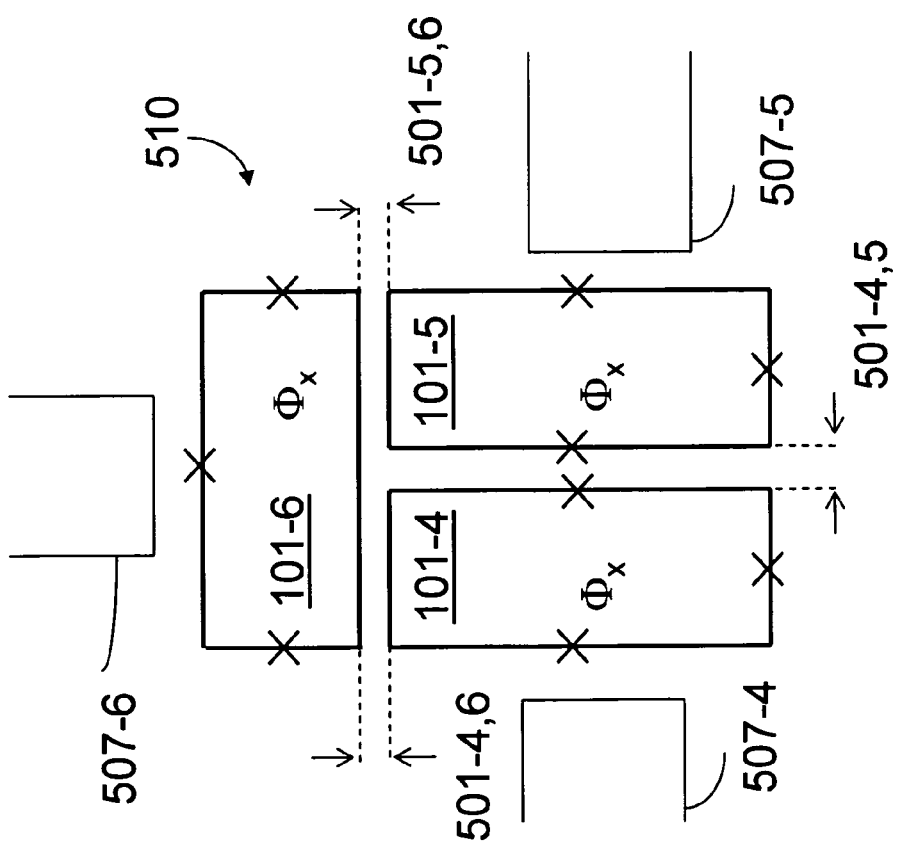
Figure 5E:
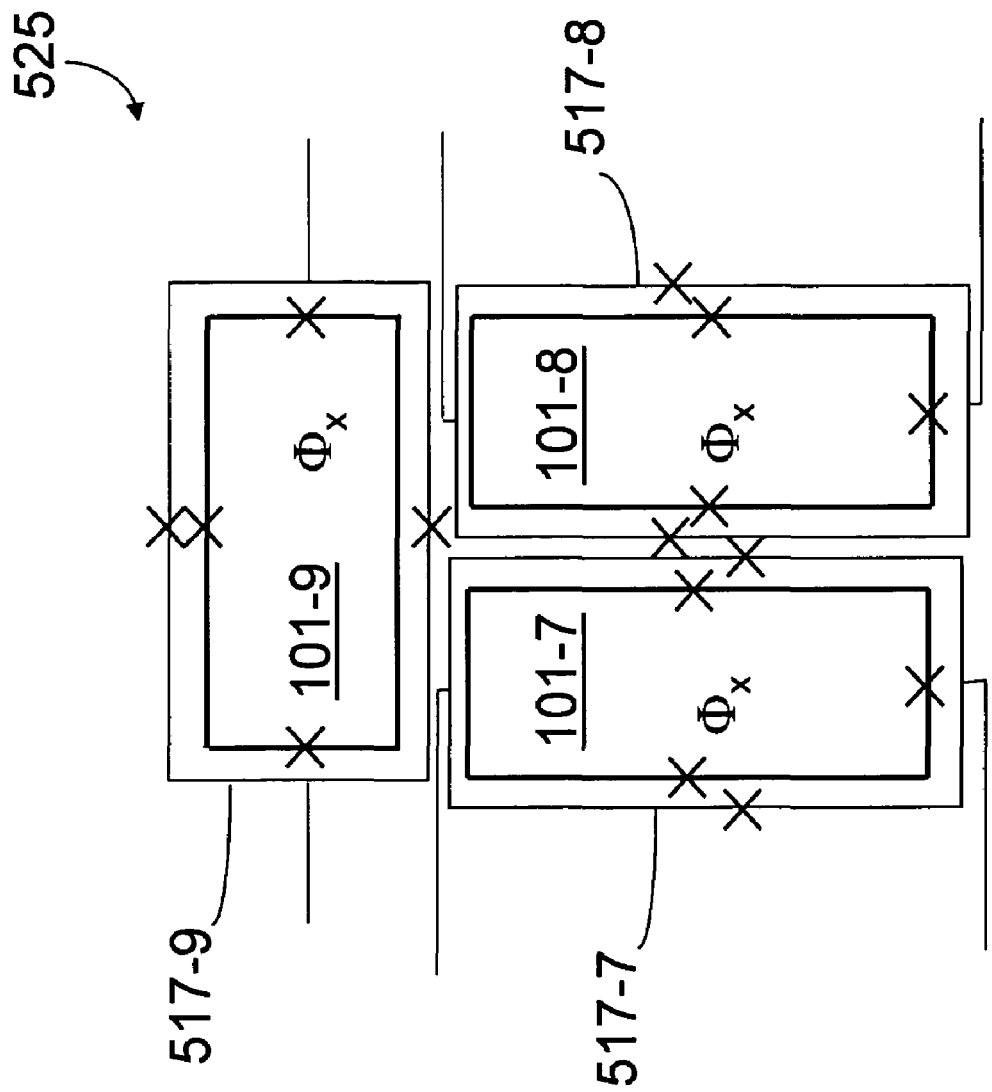

In an embodiment of the present invention, the result of the adiabatic quantum computation is determined using individual qubit magnetometers laid adjacent to respective qubits in the quantum system. Referring to FIG. 5F, devices 527-1, 527-2, and 527-3 are for detecting the state of a persistent current qubit and are respectively placed beside corresponding qubits 501-1, 501-2, and 501-3. The state of each qubit 501 can then be read out to determine the ground state of $H_P$. In an embodiment of the present invention, the device for detecting the state of a qubit 501 is a DC-SQUID magnetometer, dedicated to one qubit.

In an embodiment of the present invention, the qubits 501 used in the adiabatic quantum computation are coupled by Josephson junctions. Referring to FIG. 5F, qubits 501-1, 501-2, and 501-3 are coupled to each other by Josephson junctions 533. In particular, Josephson junction 533-1 couples qubit 501-1 to qubit 501-2, Josephson junction 533-2 couples qubit 501-2 to qubit 501-3, and Josephson junction 533-3 couples qubit 501-3 to qubit 501-1. The sign of the coupling is positive for anti-ferromagnetic coupling, the same as inductive coupling. The energy (strength) of the coupling between persistent current qubits 501 that are coupled by Josephson junctions can be about 1 kelvin. In contrast, the energy of the coupling between persistent current qubits 501 that are inductively coupled is about 10 milikelvin. In an embodiment of the present invention, the term "about" in relation to coupling energies, such as Josephson junction mediated and inducted coupling between persistent current qubits, is defined as a maximum variance of ±10%, ±50%, ±100%, or ±500% of the energy stated. The coupling energy between two qubits is proportional $2I^2/E$ where I is the current circulating the qubits, and E is the Josephson energy of the coupling Josephson junction. See, Grajcar et al., 2005, arXiv.org: cond-mat/0501085, which is hereby incorporated by reference in its entirety.

In an embodiment of the present invention, qubits 501 used in the adiabatic quantum computation have tunable tunneling energies. Referring to FIG. 5F, in such an embodiment, qubits 501-1, 501-2, and 501-3 include split Josephson junctions 528. Other qubits, described herein can make use of a split junction. Split Josephson junction 528-1 is included in qubit 501-1 in the embodiments illustrated in FIG. 5F. Further, the split Josephson junction 528-2 is included in qubit 501-2, the split Josephson junction 528-3 is included in qubit 501-3. Each split junction 528 illustrated in FIG. 5F includes two Josephson junctions and a superconducting loop in a DC-SQUID geometry. The energy of the Josephson junction $E_J$, of the qubit 501, which is correlated with the tunnelling energy of the qubit, is controlled by an external magnetic field supplied by the loop in the corresponding split Josephson junction 528. The Josephson energy of split Josephson junction 528 can be tuned from about twice the Josephson energy of the constituent Josephson junctions to about zero. In mathematical terms, $$E_J = 2E_J^0 \left| \cos\left( \frac{\pi \Phi_X}{\Phi_0} \right) \right|$$

where $\Phi_X$ is the external flux applied to the split Josephson junction, and $E_J^0$ is the Josephson energy of one of the Josephson junctions in the split junction. When the magnetic flux through split Josephson junction 528 is one half a flux quantum the tunneling energy for the corresponding qubit 501 is zero. The magnetic flux in the split Josephson junctions 528 may be applied by a global magnetic field.

In an embodiment of the present invention the tunneling of qubits 501 is suppressed by applying a flux of one half a flux quantum to the split Josephson junction 528 of one or more qubits 501. In an embodiment of the present invention the split junction loop is orientated perpendicular to the plane of the corresponding (adjacent) qubit 501 such that flux applied to it is transverse in the field of the qubits.

Figure 5G:
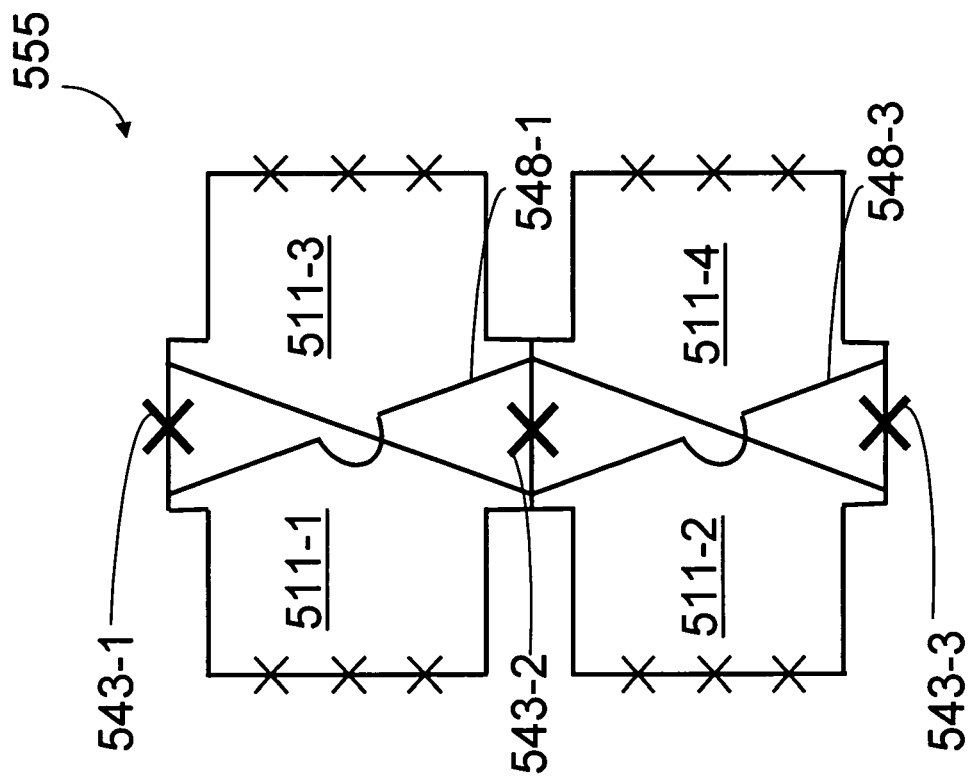
Figure 5F:
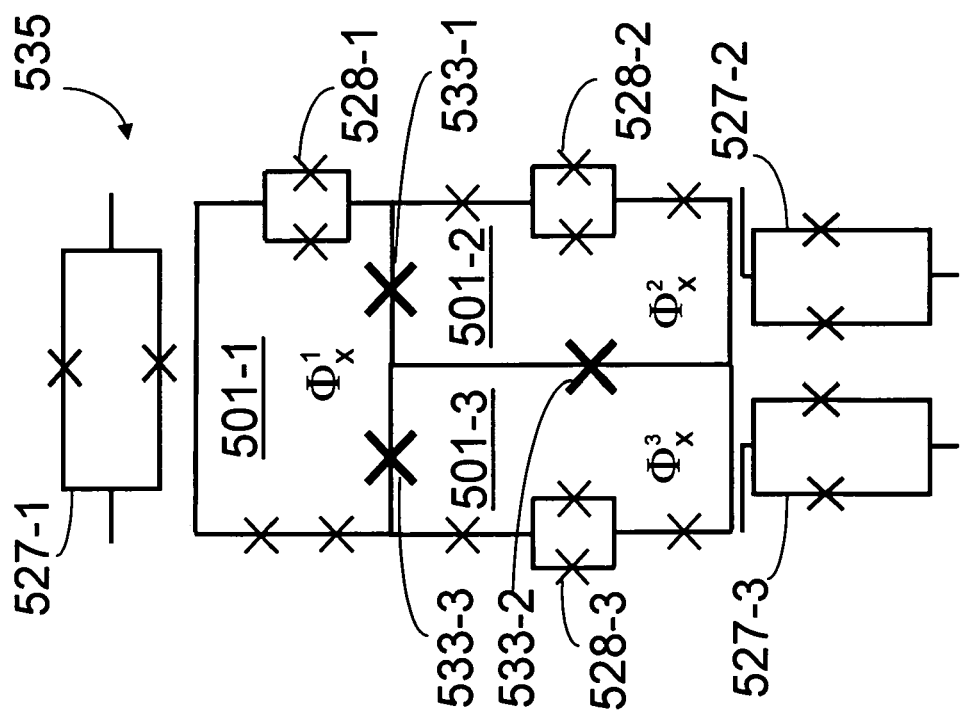

Referring to FIG. 5G, in an embodiment of the present invention, the qubits used in the adiabatic quantum computation have both ferromagnetic and antiferromagnetic couplings. The plurality of qubits 555 in FIG. 5G are coupled both by ferromagnetic and antiferromagnetic couplings. Specifically, the coupling between qubits 511-1 and 511-3, as well as between qubits 511-2 and 511-4, are ferromagnetic while all other couplings are antiferromagnetic (e.g., between qubits 511-1 and 511-2). The ferromagnetic coupling is induced by crossovers 548-1 and 548-3.

Referring to FIG. 5A, in some embodiments of the present invention, the state of each qubit 101 of system 500 is not individually read out. Rather, such embodiments make use of the profile of the energy level diagram of system 500, as a whole, over a range of probing biasing currents. In such embodiments, when system 500 reaches $H_P$ the system is probed with a range of biasing currents using, for example, a tank circuit that includes coil 502. The overall energy level of system 500 over the range of biasing currents applied during the measurement step 407 define an energy level profile for the system 500 that is characteristic of the state of system 500. Furthermore, as discussed in more detail below, system 500 is designed in some embodiments such that each of the possible eight states that the system could adopt has a unique calculated energy profile (e.g., unique number of inflection points, unique curvature). Therefore, in such embodiments, measurement of $H_P$ can be accomplished by computing the energy profile of system 500 with respect to a range of biasing currents. In such embodiments, the state of system 500 (e.g., 001, 010, 100, etc.) is determined by correlating the calculated characteristics (e.g., slope, number of inflection points, etc.) of the measured energy profile to the characteristics of the energy profile calculated for each of the possible solutions (e.g., the characteristics of a calculated energy profile for 001, the characteristics of a calculated energy profile for 010, and so forth). When designed in accordance with the present invention, there will only be one calculated energy profile that matches the measured energy profile and this will be the solution to the problem of finding the ground state of a frustrated ring.

In other embodiments of the present invention, the state of each qubit 101 of system 500 is not individually read out. Rather, such embodiments make use of the profile of the energy level diagram of system 500 as a whole over a range of probing biasing currents. In such embodiments, when system 500 reaches $H_P$ the system is probed with a range of biasing currents using, for example, a tank circuit that includes coil 502 (FIG. 5A). The overall energy level of system 500 over the range of biasing currents applied during the measurement step 407 define an energy level profile for the system 500 that is characteristic of the state that the system is in. Furthermore, as discussed in more detail below, system 500 can be designed such that each of the possible eight states that the system could have is characterized by a unique calculated energy profile (e.g., unique number of inflection points, unique curvature). Therefore, in such embodiments, measurement of $H_P$ could involve computing the energy profile of system 500 with respect to a range of biasing currents and then determining the state of system 500 (e.g., 001, 010, 100, etc.) by correlating the calculated characteristics (e.g., slope, number of inflection points, etc.) of the measured energy profile to the characteristics of the energy profile calculated for each of the possible solutions (e.g., the characteristics of a calculated energy profile for 001, the characteristics of a calculated energy profile for 010, and so forth). When designed in accordance with this embodiment of the present invention, there will only be one calculated energy profile that matches the measured energy profile and this will be the solution to the problem of finding the ground state of the modeled frustrated ring.

Figure 7A:
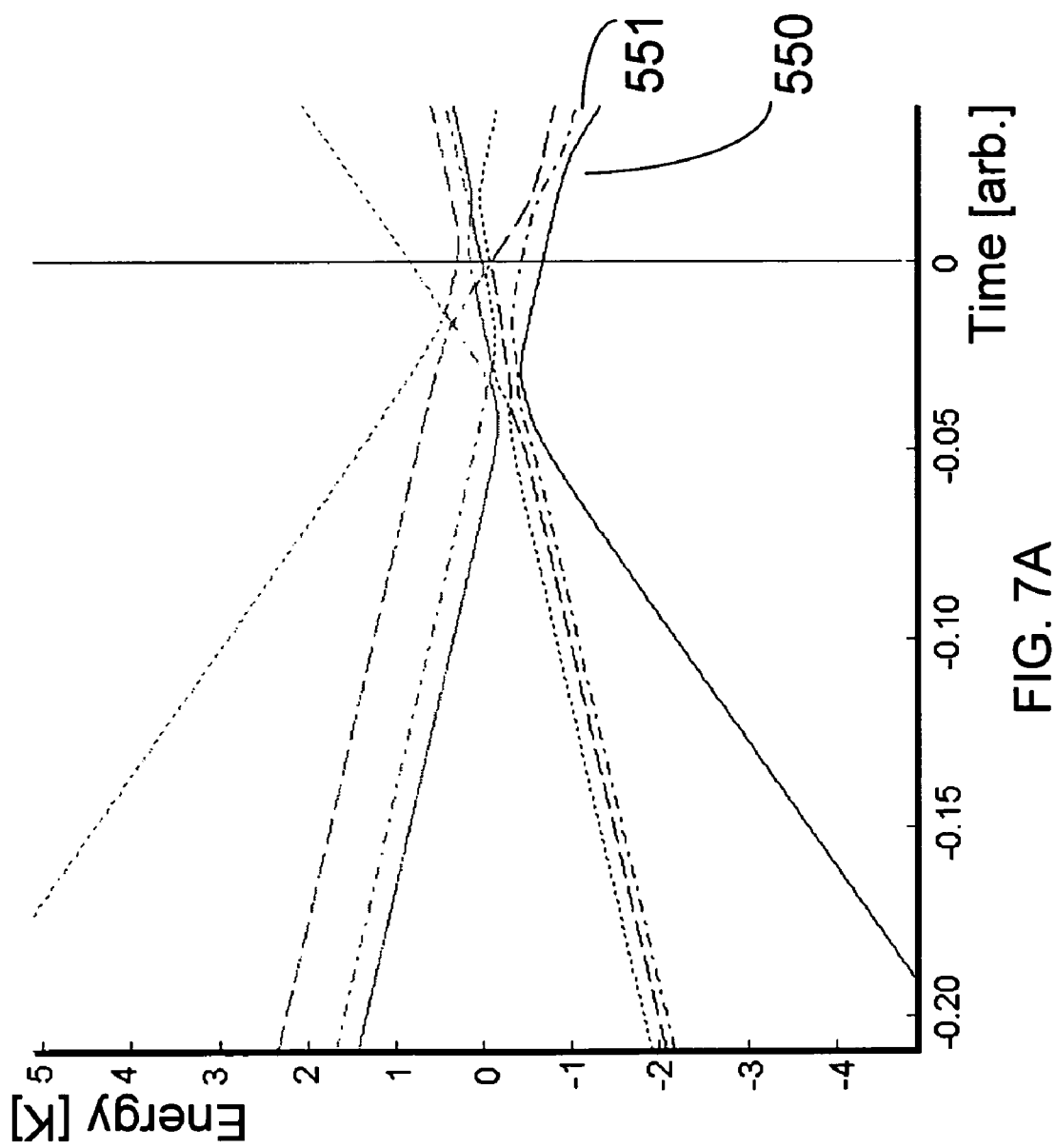
FIG. 7A illustrates an energy level diagram for a system comprising a plurality of superconducting qubits during an instantaneous adiabatic change of the system.
Figure 7B:
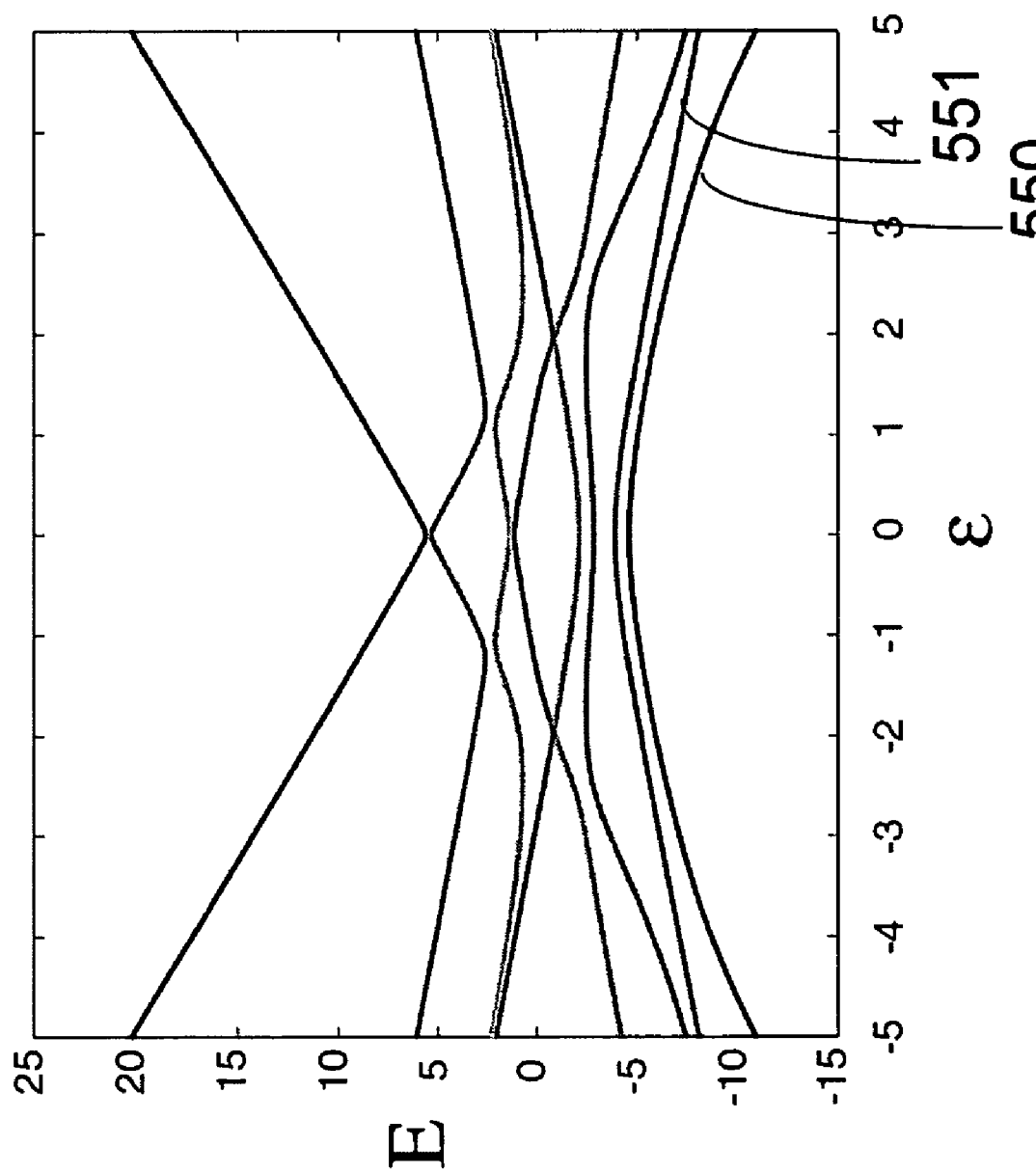
FIG. 7B illustrates an energy level diagram for a system comprising a plurality of superconducting qubits when the plurality of qubits are described by the ground state of a problem Hamiltonian $H_P$.

As described above, for many embodiments of the present invention, the energy levels of the system for adiabatic quantum computing $H_P$ across a range of probing biasing values are differentiable from each other. FIG. 7B illustrates an example of this. Consider a system 500 in which two of the three inter-qubit coupling constants are equal to $\delta$ ($J_{13}=J_{23}=\delta$) and the third is equal to three times that amount $J_{12}=3\cdot\delta$. Further, the tunneling rates of the qubits are about equal and, in fact are about equal to the small coupling value $\delta$ (e.g., $\Delta_1=1.1\cdot\delta$; $\Delta_2=\delta$; $\Delta_3=0.9\cdot\delta$) where $\cdot\delta$ is in normalized units. In an embodiment of the present invention, $\delta$ can be a value in the range of about 100 megahertz to about 20 gigahertz. When system 500 is configured with these tunneling and coupling values then the curvature of the two lowest energy levels will be different from each other and therefore can be distinguished by the impedance techniques described above. In these impedance techniques, the final bias current applied by the tank circuit in system 500 is not fixed. Rather, it is adjusted to produce the energy levels of FIG. 7B. Indeed, FIG. 7B is plotted as a function of energy E versus bias E, for an example where the areas encompassed by each of the qubits 101 are equal (e.g., system 500 of FIG. 5A). The bias E is in units of energy and the scale of the horizontal axis of FIG. 7B is in units equal to Δ. The bias is the same for each qubit, because the area is same for each qubit. By contrast, FIG. 7A shows the energy levels for various instantaneous times during the adiabatic change from a state $H_0$ to a state $H_P$.

Considering FIG. 7B, embodiments of the present invention use existing techniques for differentiating energy levels by shape, where the shape or curvature of a first energy level as a function of bias $\epsilon$ can be differentiated from other energy levels. See, for example, United States Patent Publication 2003/0224944 A1, entitled "Characterization and measurement of superconducting structures," which is hereby incorporated by reference in its entirety. The impedance readout technique can be used to readout the system 500 to determine the states of the qubits in the frustrated arrangement. The unique curvature for each possible energy level (solution) does not significantly change if $J_{13}$ is not exactly equal to $J_{23}$.

In an embodiment of the present invention, the system is read out by differentiating various energy levels (solutions) to identify the ground state. In an example of the persistent current qubit, the dephasing rate is currently recorded as being 2.5 microseconds or less. Once the system is in a state of $H_P$ the state, e.g. 551 or 550 can be determined by locally probing the energy level structure by low frequency applications of a biasing magnetic field.

The states of energy level diagram like that of FIG. 7B can be differentiated through the curvatures, and number of inflection points of the respective energy levels. Two energy levels may have a different sign on the curvature that allows them to be distinguished. Two energy levels may have the same signs but have different magnitudes of the curvature. Two energy levels may have a different number of inflection points. All of these generate different response voltages in the tank circuit. For instance, an energy level with two inflection points will have a voltage response for each inflection. The sign of the voltage response is correlated with the sign of the curvature.

Knowledge of the initial energy level and the corresponding voltage response can allow the ground state to be determined provided that a sampling of some of the lowest energy levels voltage response has been made. Accordingly, in an embodiment of the present invention, the system is not initialized in the ground state of the initial Hamiltonian. Rather the system is initialized in an excited state of the system such as 551. Then the interpolation between initial and final Hamiltonians occurs at a rate that is adiabatic but is faster than the relaxation rate out of state 551. In one example of a persistent current qubit, the relaxation rate is about 1 to about 10 microseconds. The ground state will have a greater curvature and the lowest number inflection points of the energy levels of the system.

5.3.2 Observation and Readout with a Superconducting Tank Circuit

Figure 8:
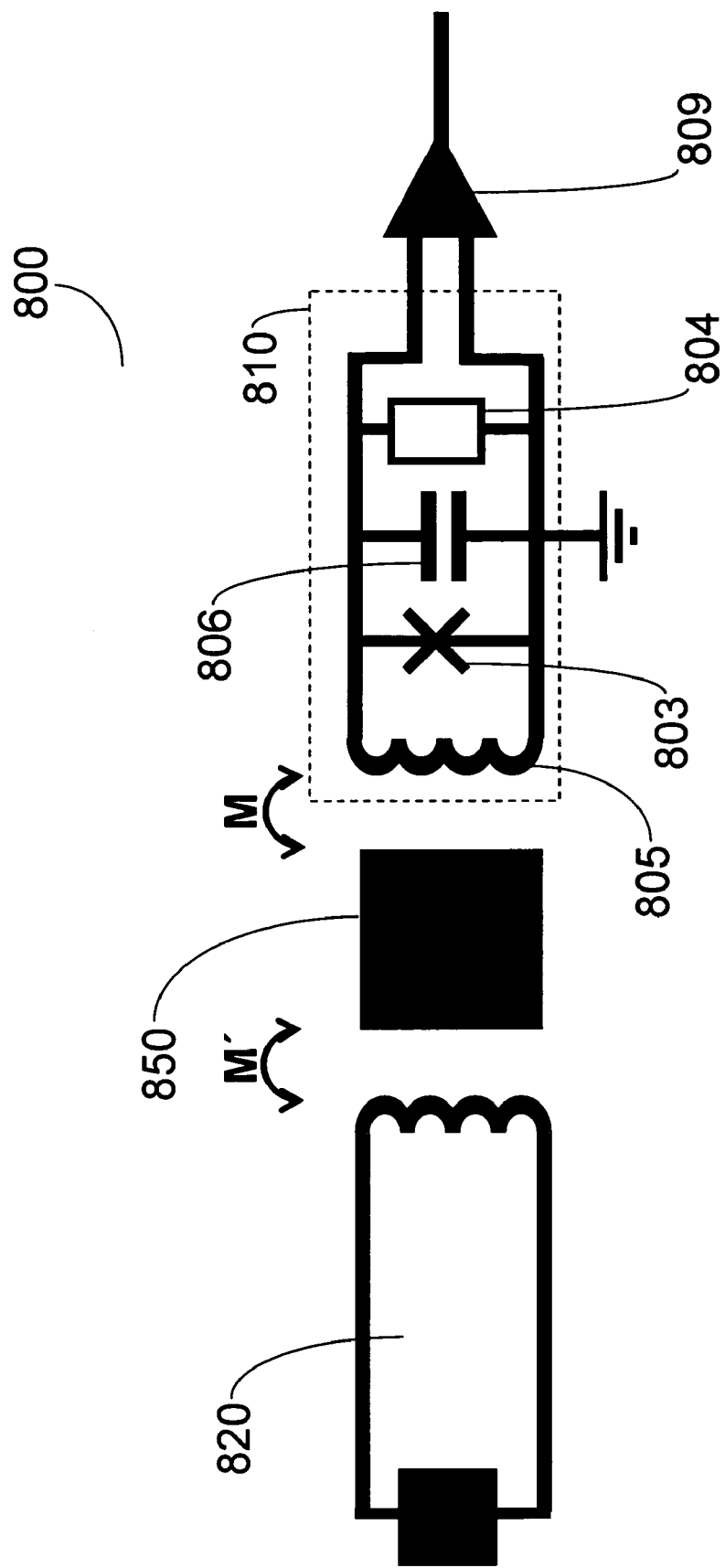
FIG. 8 illustrates a device for controlling and reading out the state of a superconducting qubit for adiabatic quantum computing in accordance with some embodiments of the present invention.

FIG. 8 illustrates a generic embodiment of a tank circuit and associated devices used to control superconducting qubits in accordance with some embodiments of the present invention. FIG. 8 includes a superconducting qubit or qubits 850 (quantum system), a tank circuit 810, and an excitation device 820. System 800 is arranged geometrically such that quantum system 850 has a mutual inductance M' with excitation device 820, and a mutual inductance M with tank circuit 810. In an embodiment of the present invention, tank circuit 810 includes an inductance $L_T$ (805), capacitance $C_T$ (806), and a frequency dependent impedance $Z_T(f)$(804), where f is the response frequency of the tank. Tank circuit 810 can further include one or more Josephson junctions 803, which can be biased to provide a tunable inductance. Tank circuit 810 has a resonant frequency $f_o$ that depends on the specific values of its characteristics, such as the $L_T$, $C_T$, and Z(f) components. An embodiment of the present invention can make use of multiple inductors, capacitors, Josephson junctions, or impedance sources but, without loss of generality, the generalized circuit depiction illustrated in FIG. 8 can be used to describe tank circuit 810. In other words, inductance 805 represents one or more inductors in series or parallel, Josephson junction 803 is one Josephson junction or more than one Josephson junction in series or parallel, capacitor 806 represents a single capacitor or more than one capacitor in series or parallel, and impedance 804 represents one or more impedance sources in series or parallel. Furthermore, although inductance 805, Josephson junctions 803, capacitance 806 and impedance 804 are shown in series, tank circuits 810 are not limited to such a configuration. These electrical components can be arranged in any configuration, including series and parallel, provided that circuit 810 maintains tank circuit functionality as is known in the art.

In operation, when an external signal, such as a magnetic flux in an inductively coupled device, is applied through tank circuit 810, a resonance is induced. This resonance affects the magnitude of impedance 804. In particular, impedance 804 is affected by the direction of the magnetic flux in devices inductively coupled to it, such as a superconducting qubit (e.g., quantum system 850). Because of the state dependency of impedance 804, the tank voltage or current response is likewise state dependent. Therefore, the tank voltage or current response of tank circuit 810 can be used to measure the direction of the magnetic flux in devices inductively coupled to the tank circuit. In an embodiment of the present invention, tank circuit 810 is inductively coupled to a superconducting qubit (an example of quantum system 850) having quantum states such that the resonant frequency of the tank circuit is correlated with the state of the superconducting qubit. In operation, characteristics of the superconducting qubit can be probed by tank circuit 810 by applying signals through tank circuit 810 and measuring the response of the tank circuit. The characteristics of tank circuit 810 can be observed by amplifier 809, for example. See, for example, United States Patent Publication 2003/0224944 A1, entitled "Characterization and measurement of superconducting structures," which is hereby incorporated by reference in its entirety.

Some embodiments of the present invention make use of the high electron mobility field-effect transistors (HEMT) and their improved pseudomorphic variants (PHEMT) to measure the signal from tank circuit 810. Such embodiments can make use of multistage amplifiers 809, such as two, three, or four transistors. Some embodiments of the present invention use the commercially available transistor ATF-35143 from Agilent Technologies, Inc. (Palo Alto, Calif.) as amplifier 809. In some embodiments, amplifier 809 comprises a three transistor amplifier having a noise temperature of about 100 millikelvin. The power consumption of the transistors is decreased by reducing both the transistors' drain voltage and the drain current to about two percent of the average ratings for the drain source voltage, and about 0.3% of the current rating. This reduces the power dissipation of the first transistor to about 20 milliwatts. In some embodiments, all active resistances in the amplifier's signal channel are replaced by inductors and third stage is used to match the amplifier output with cable impedance. In some embodiments, amplifier 809 is assembled on a printed board. In a specific example, amplifier 809 is a cold amplifier, built as described above, and is thermally connected to a helium-3 pot of a dilution refrigerator that houses quantum system 850.

In one embodiment of the present invention, the response voltage of the tank circuit is amplified by a cold amplifier thermally coupled to the helium-3 pot of the dilution refrigerator. The response signal is once more amplified by a room temperature amplifier and detected by an rf lock-in voltmeter. The rf lock-in voltmeter can be used to average the response of the tank circuit over many cycles of the response of the tank. For more information on such an amplifier arrangement, see Oukhanski et al., 2003, *Rev. Sci. Instr.* 72, 1145, which is hereby incorporated by reference in its entirety.

Some embodiments of the present invention make use of tank circuit 810 to read out the state of quantum system 850. By making use of a radio-frequency technique, called the impedance measurement technique (IMT), the main parameters of the circuit described by quantum system 850 can be reconstructed. With the IMT, a qubit in quantum system 850 to be read out is coupled through a mutual inductance M to a tank circuit 810 (FIG. 8) with known inductance $L_T$, capacitance $C_T$, and quality factor Q. In a specific embodiment of the present invention, tank circuit 810 has M that is about 180 picohenries, $L_T$ that is about 118 nanohenries, $C_T$ that is about 470 picohenries, and a quality factor Q that is about 2400. In another specific embodiment of the present invention, tank circuit 810 has an M that is about 55 picohenries, an $L_T$ that is about 85 nanohenries, $C_T$ that is about 470 picohenries, and a quality factor Q that is about 436. In still another embodiment of the present invention, tank circuit 810 has a quality factor Q that is about 1500. In still another embodiment of the present invention, tank circuit 810 has a quality factor Q that is between 1400 and 1600.

Tank circuit 810 is driven by a direct bias current $I_{DC}$ and an alternating current $I_{RF}$ of a frequency ω close to the resonance frequency of the tank circuit $ω_0$. The total externally applied magnetic flux to the qubit, $Φ_E$, is therefore determined by the tank circuit where $Φ_E=Φ_{DC}+Φ_{RF}$. Here, $Φ_{DC}=Φ_A+f(t)Φ_0$.

In one embodiment of the present invention, the direct bias current $I_{DC}$ and an alternating current $I_{RF}$ in the tank circuit are supplied along filtered lines by commercially available current sources. An example of a DC-current source for supplying the direct bias current $I_{DC}$ is the Agilent 33220A. An example of an AC-current source for supplying the alternating current $I_{RF}$ is the Agilent E8247C microwave generator. Both devices are available from Agilent Technologies, Inc. (Palo Alto, Calif.).

The terms $Φ_A$ and $f(t)Φ_0$ are constant or are slowly varying and are generated by the direct bias current $I_{DC}$. The magnitude of $Φ_A$ is discussed below, f(t) has a value between 0 and 1 inclusive, and $Φ_0$ is one flux quantum ($2.07×10^{-15}$ webers (or volt seconds)). Further, $Φ_{RF}$ is a small amplitude oscillating rf flux generated with AC current $I_{RF}$, having a magnitude of about $10^{-5}Φ_0$ to about $10^{-1}Φ_0$. In an embodiment of the present invention, the $Φ_{RF}$ amplitude is about $10^{-3}Φ_0$. In an embodiment of the present invention, the term "about" in relation to small magnetic fluxes, such as $Φ_{RF}$, means a variance of ±10%, ±50%, ±100%, and ±500% of the magnetic flux.

If the amplitude of $Φ_{RF}$ is small, meaning that it has a negligible value relative to $Φ_0$ ($Φ_{RF}<<Φ_0$), then the approximate equality $\Phi_E \cong \Phi_{DC}$ is valid. In an embodiment of the present invention f(t), $\Phi_A$, and $\Phi_{RF}$ are varied on progressively shorter time scales because f(t) and $\Phi_A$ are the qubit bias, and $\Phi_{RF}$ is a small amplitude fast function that is used to determine the state of quantum system 850 (e.g., the state of a qubit in quantum system 850). By monitoring the effective impedance of tank circuit 810 (FIG. 8) as a function of the externally applied magnetic flux $\Phi_E$, the property of a superconducting qubit in the quantum system 850 sharing a mutual inductance M with tank circuit 810, as depicted in FIG. 8, can be determined. This is equivalent to monitoring the magnetic susceptibility of the superconducting qubit. Although FIG. 8 depicts quantum system 850 as being outside tank circuit 810, those of skill in the art will appreciate that in some embodiments, quantum system 850 is contained within tank circuit 810.

The imaginary part of the total impedance of tank circuit 810, expressed through the phase angle $\chi$ between driving current $I_{RF}$ and tank voltage, can be expressed as $$\tan \chi(\Phi_{DC}) = \frac{k^2 Q \beta F'[\Phi(\Phi_{DC})]}{1 + \beta F'[\Phi(\Phi_{DC})]}$$

at $\omega=\omega_0$. Here, $F'(\Phi(\Phi_{DC}))=I'(\Phi(\Phi_{DC}))/I_c$ is the derivative of the ormalized supercurrent in the qubit with respect to the total magnetic flux, $\Phi=\Phi_E-\beta \times F(\Phi(\Phi_{DC}))$ in the superconducting qubit. The parameter $\beta=2\pi L I_c/\Phi_0$ is the normalized inductance of the superconducting qubit, having inductance L, and critical current $I_C$.

5.3.2.1 Observation and Readout by Traversing Crossings and Anticrossings

This section describes techniques for reading out the state of a quantum system 850. In some embodiments, this is accomplished by reading out the state of each qubit within quantum system 850 on an individual basis. Individualized readout of qubits in a quantum system 850 can be accomplished, for example, by making use of individual bias wires or individual excitation devices 820 for each qubit within quantum system 850 as described in this section and as illustrated in FIG. 5B, in the case of individual bias wires. In some embodiments, the entire process described in FIG. 4 is repeated and, during each repetition a different qubit in the quantum system 850 is measured. In some embodiments, described in Section 5.3.2.6, it is not necessary to repeat the process described in FIG. 4 for each qubit in quantum system 850.

Figure 9B:
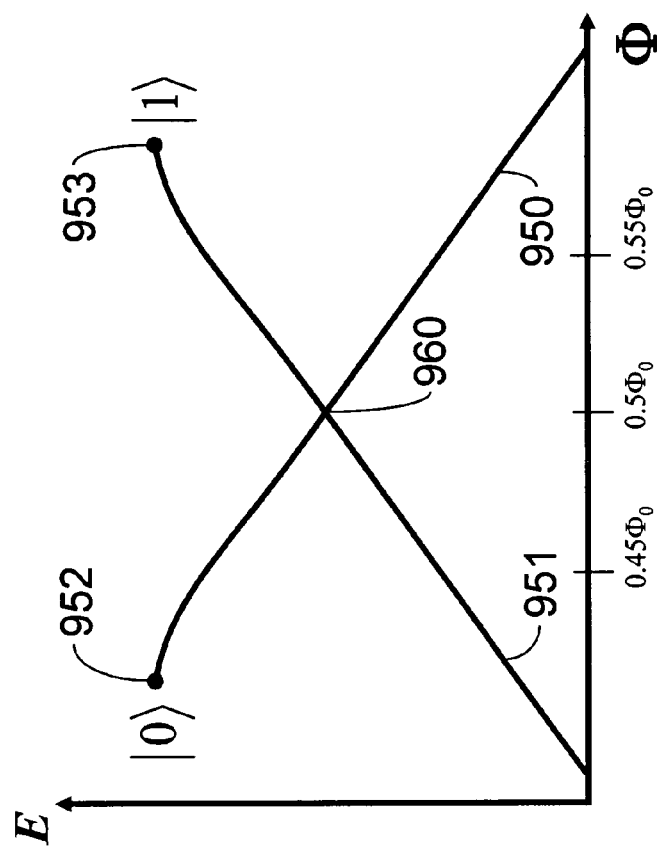
FIG. 9B illustrates an energy level diagram for a physical system having an energy level crossing in accordance with an embodiment of the present invention.
Figure 9A:
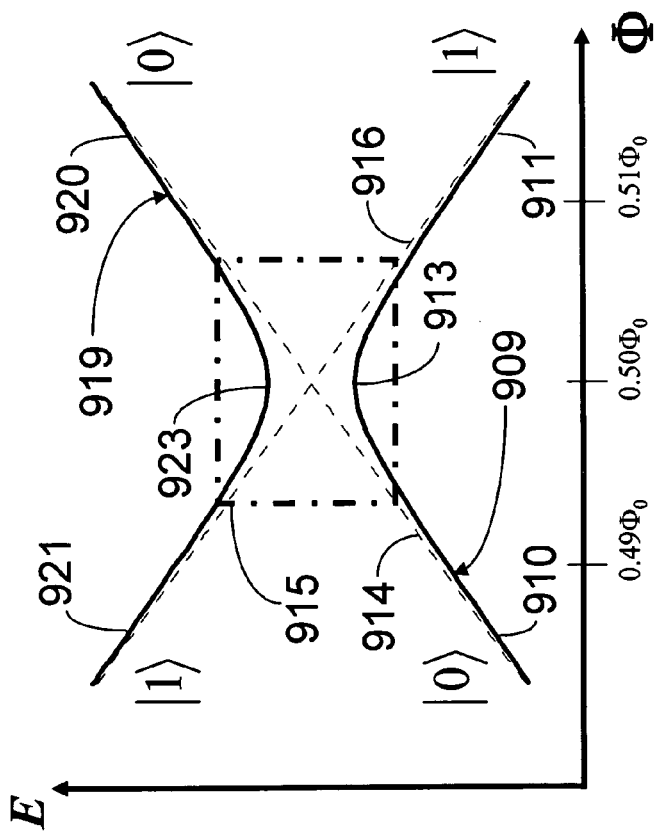
FIG. 9A illustrates an energy level diagram for a physical system in which the energy level diagram exhibits an anticrossing between energy levels of the physical system in accordance with an embodiment of the present invention.

FIG. 9 illustrates sections of energy level diagrams with energy level crossing and anticrossing. FIGS. 9A and 9B are useful for describing how the readout of superconducting qubits in quantum system 850 works, and how one performs such a readout. FIGS. 9A and 9B show energy levels for a qubit as a function of external flux $\Phi$ applied on the qubit. In some embodiments, aspects of system 800 from FIG. 8 can be represented by FIGS. 9A and 9B. For example, superconducting qubit 850 of FIG. 8 can have an energy level crossing or anticrossing depicted in FIG. 9 that can be probed by tank circuit 810.

FIG. 9A illustrates an energy level diagram with an anticrossing. An anticrossing arises between energy levels of a qubit when there is a tunneling term or, more generally, a transition term between the levels. Energy levels 909 (ground state) and 919 (excited state) have a hyperbolic shape as a function of applied magnetic flux, with an anticrossing within box 915, and approach asymptotes 914 and 916. The value of $\Delta_m$ for the energy level diagram is the difference in the slopes of the pair of asymptotes 914 and 916 near the anticrossing. Lines 914 and 916 of FIG. 9A are an example of a set of asymptotes near an anticrossing. The superconducting qubit, part of a quantum system 850, and described by the energy diagram of FIG. 9A, has computational basis states |0> and |1>. For a description of such basis states, see Section 2.1, above. In an embodiment of the present invention, where the superconducting qubit is a three-Josephson junction qubit, the |0> and |1> computational basis states correspond to right and left circulating supercurrents (102-0 and 102-1 of FIG. 1A). The |0> and |1> computational basis states are illustrated in FIG. 9A. In the ground state 909 of the qubit represented by FIG. 9A, the |0> basis state corresponds to region 910 to the left of degeneracy point 913 and the |1> basis state corresponds to region 911 on the right of the degeneracy point. In the excited state 919 of the qubit represented by FIG. 9A, the |0> basis state is on the right of degeneracy point 923 in region 920 while the |1> basis state corresponds to region 921 on the left of degeneracy point 923.

In accordance with an embodiment of the present invention, a method for reading out the state of a superconducting qubit within quantum system 850 involves using tank circuit 810 to apply a range of fluxes to the superconducting qubit over a period of time and detecting a change in the properties of the tank circuit coupled to the superconducting circuit during the sweep. In the case where the qubit is a superconducting flux qubit, a superconducting loop with low inductance L interrupted by three Josephson junctions, the flux applied during the sweep can range from, for example, $0.49\Phi_0$ to $0.51\Phi_0$. In other embodiments, the flux applied during the sweep can range between $0.3\Phi_0$ and $0.7\Phi_0$. In still other embodiments, the flux applied during the sweep can range across several multiples of $\Phi_0$ (e.g., between $0.3\Phi_0$ and $5\Phi_0$ or more). In preferred embodiments of the present invention, the flux sweep is performed adiabatically to ensure that the qubit remains in its ground state during the transition. Under this adiabatic sweep, tank circuit 810 (FIG. 8) detects when the quantum state of the qubit crosses the anticrossing and hence determines the quantum state of the qubit at the end of step 405 of FIG. 4. For example, referring to FIG. 9A, if the qubit is in ground state |0> at the end of step 405 on the left of the energy level anticrossing 915 and the flux is adiabatically increased during step 407, then the tank circuit will detect anticrossing 915. On the other hand, if the qubit is in ground state 11) at the end of step 405 on the right of anticrossing 915, then when the flux is increased the qubit will not cross anticrossing 915 and therefore no such anticrossing will be detected. In this way, provided that the qubit is maintained in the ground state, the applied sweep of fluxes can be used to determine whether the qubit was in the |0> or the |1> basis state prior to readout.

The readout of a superconducting qubit involves sweeping the flux applied to the superconducting qubit by an amount and in a direction designed to detect the anticrossing 915. This method makes use of the fact that a tank circuit can detect the anticrossing 915 by the change in the curvature of the ground state energy level 909 at anticrossing 915. In other words, the inventive method measures the magnetic susceptibility of the qubit. See, for example, United States Patent Publication 2003/0224944 A1, entitled "Characterization and measurement of superconducting structures," which is hereby incorporated by reference in its entirety. In some embodiments, the measurable quantity is a dip in the voltage across tank circuit 810, or a change in the phase of tank circuit 810, or both. If a dip in the voltage results from the readout operation then the state of the qubit within quantum system 850 transitioned through the anticrossing. If no dip is observed, the qubit did not transition through the anticrossing during measurement sweep 407. These state-dependent observables are used to perform the readout operation.

In some embodiments, when the superconducting qubit is in the |0> ground state, e.g. in region 910, and the flux applied to the superconducting qubit is increased, then the state of the qubit will transition through anticrossing 915, and a dip in the voltage across the tank circuit is observed. Similarly, when the superconducting qubit is in the |1> ground state, e.g. in region 911, and the flux applied to the superconducting qubit is decreased, then the state of the qubit will transition through anticrossing 915, and a dip in the tank circuit voltage 810 is observed. Alternatively, when the superconducting qubit is in the |0> ground state, e.g. in region 910, and the flux applied to the superconducting qubit is decreased, the quantum state of the qubit will not transition through anticrossing 915, and no dip in the tank circuit voltage 810 is observed. Likewise, if the superconducting qubit is in the |1> ground state, e.g. in region 911, and the flux applied to the superconducting qubit is increased, the state of the qubit will not transition through the anticrossing 915, and no dip in the tank circuit voltage is observed.

FIG. 9B illustrates an energy level diagram for a qubit in a quantum system 850 having an energy level crossing. An energy level crossing arises between energy levels of the qubit when there is no tunneling term, a minimal tunneling term, or, more generally, no transition term between energy levels of the qubit being read out. This is in contrast to FIG. 9A, where there is an anticrossing between energy levels of a qubit due to a tunneling term or, more generally, a transition term between such energy levels. Energy levels 950 and 951 of FIG. 9B lie in part where asymptotes 914 and 916 of FIG. 9A cross. The computational basis states of the qubit represented by the energy level diagram FIG. 9B are labeled. The |0> state corresponds to the entire energy level 950 between crossing 960 and terminus 952. The |1> state corresponds to the entire energy level 951 between crossing 960 and terminus 953.

At termini 952 and 953, the states corresponding to energy levels disappear and the state of the qubit falls to the first available energy level. As illustrated in FIG. 9B, in the case of the |0> state, beginning at crossing 960, as the flux Φ in the qubit is decreased and the energy of the |0> state rises, the qubit remains in the |0> state until terminus 952 is reached at which point the |0> state vanishes. In contrast, if the qubit was in the |1> state, then beginning at crossing 960, as the flux Φ in the qubit is decreased, the energy of the |1> state gradually decreases. Thus, the behavior of a qubit that has no coupling term exhibits hysteretic behavior meaning that the state of the qubit at crossing 960 depends on what the state the qubit was in prior to the flux being brought to the value correlated with crossing 960.

The readout 407 (FIG. 4), in accordance with some embodiments of the present invention, of a superconducting qubit having either no coupling term or a coupling term that is small enough to be disregarded, involves sweeping the flux applied to the superconducting qubit by an amount and in a direction designed to detect crossing 960 and termini 952 and 953. This method makes use of the fact that a tank circuit can detect the crossing by the hysteretic behavior of the qubit. The measurable quantities are two voltage dips of tank circuit 810 having asymmetrical shape with respect to bias flux. In other words, the tank circuit 810 will experience a voltage dip to the left and to the right of crossing 960, regardless of which energy state the superconducting qubit is in. Each of the voltage dips is correlated with a state of quantum system 850.

Referring to FIG. 9B, if the superconducting qubit is in the |0> state, e.g. at energy level 950, and the flux applied to the superconducting qubit is increased, then the state of the qubit will remain as |0> and no voltage dip is observed. Likewise, if the superconducting qubit is in the |1> state, e.g. on energy level 951, and the flux applied to the superconducting qubit is decreased, then the state of the qubit will remain as |1> and no voltage dip is observed.

Now consider the case in which the superconducting qubit is in the |0> state, e.g. at energy level 950, and the flux applied to the superconducting qubit is decreased. In this case, the qubit will remain in the |0> state until the flux is decreased to just before the point corresponding to terminus 952, at which point a wide dip will occur in the voltage of tank circuit 810 due to slight curvature of level 950 in the vicinity of terminus 952. After the flux is decreased past terminus 952, the state transitions from |0> to |1> because state |0> no longer exists. Consequently, there is an abrupt rise in voltage across tank circuit 810.

Further consider the case in which a qubit within quantum system 850 of FIG. 8 is in the |1> state, e.g. at energy level 951 of FIG. 9B, and the flux applied to the superconducting qubit is increased. In this case, the state of the qubit will remain in the |1> basis state until the flux is increased to just before terminus 953, where a wide dip will occur in the voltage of tank circuit 810 due to slight curvature in energy level 951 in the vicinity of terminus 953. After the flux is increased past terminus 953, the state transitions to the |0> state and there is an abrupt rise in the voltage of tank circuit 810.

In some embodiments, there is an additional magnetic field $B_A$ applied to the qubit within quantum system 850 of FIG. 8. The sign and magnitude of this additional magnetic field $B_A$ is manipulated so as to read out the quantum state of qubit 850 by making use of various possible cases of qubit state in relation to location of crossing or anticrossing as detailed herein. The additional magnetic field $B_A$ is applied by the bias lines on the qubit, see, for example, lines 507 of FIG. 5B, or by excitation device 820 of FIG. 8. The additional magnetic field $B_A$ generates the additional flux $\Phi_A$ according to the formula $\Phi_A = B_A \times L_Q$, where $L_Q$ is the inductance of the qubit.

Figure 1B:
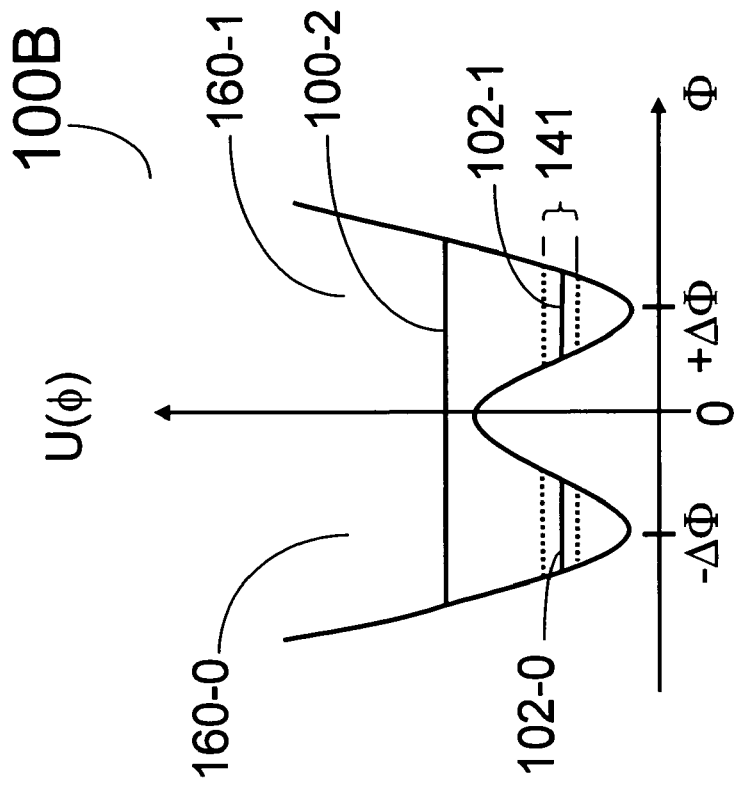
FIG. 1B illustrates a known energy potential for a superconducting qubit.
Figure 1A:
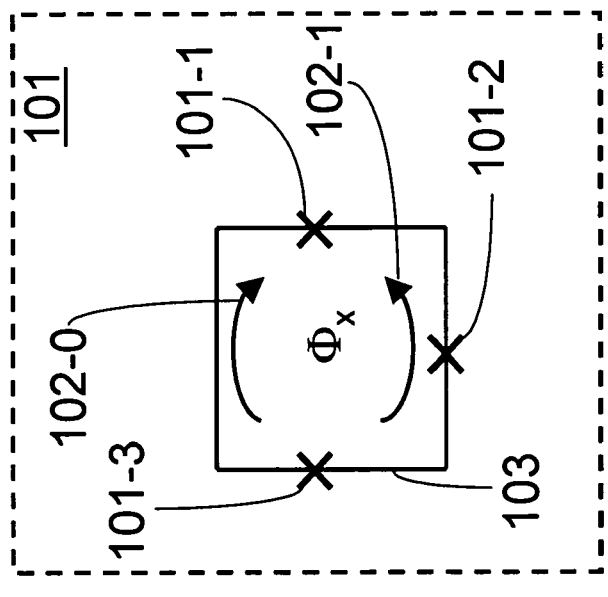
FIG. 1A illustrates a known superconducting qubit.

The objective of the qubit measurements described in the preceding paragraphs is not to establish the state (ground or excited) that a qubit in quantum system 850 is in, but rather what is the direction of the qubit's circulating current (e.g. clockwise 102-0 or counterclockwise 101-2 as defined in FIG. 1A). The Hamiltonian of an isolated superconducting qubit in its ground state is:

$$H_Q = \tfrac{1}{2}\Delta\sigma_X - \tfrac{1}{2}\epsilon\sigma_Z$$

where $\Delta$ and $\epsilon$ are respectively the tunneling and bias energies. The states |0> and |1> are assigned to the direction of current circulation in the qubit, for example in the manner illustrated in FIG. 1A or in a manner that is opposite that depicted in FIG. 1A, and are the eigenvectors of the $\sigma_Z$ Pauli matrix. The magnitude of bias energy $\epsilon$ depends on the magnitude of the external magnetic field that is applied on the qubit. Many adiabatic algorithms have final states where all qubits are strongly biased, so that the tunneling energy term $\Delta$ can be neglected. In other words, in many adiabatic algorithms the final states of the qubits involved in the algorithms have $\Delta \ll \epsilon$, meaning that the term $\Delta$ is negligible when compared to the magnitude of $\epsilon$. When this is the case, a sweep through appropriate an appropriate range of applied magnetic field strengths will yield voltages by tank circuit 810 that are determined by FIG. 9B rather than FIG. 9A.

The addition of an external magnetic field that is applied against the superconducting qubit induces a third additional flux $\Phi_A$ in the qubit. The total flux applied to the qubit or bias is described as:

$$\Phi_E = \Phi_{DC} + \Phi_{RF},$$

where $\Phi_{DC} = \Phi_A + f(t)\Phi_0$.

In some embodiments of the present invention, the total flux in the qubit is varied in a triangular pattern, with the magnitude and sign of the flux chosen such that the states of the qubit can be differentiated and the distance to anticrossings or crossings can be found. Details on how such waveforms can accomplish this task are described in Section 5.3.2.2, below. In an embodiment of the present invention, the flux is applied to a superconducting qubit through individual bias wires. In such an embodiment each qubit, or all qubits except for one qubit, in quantum system 850 has a bias wire.

5.3.2.2 Waveforms of the Additional Flux

FIG. 10 depicts examples of the waveforms that additional flux $\Phi_A$ present in a superconducting qubit, or plurality of superconducting qubits, can adopt. This additional flux $\Phi_A$ can be present in the qubit, for example, due to the application of an external magnetic field as described in Section 5.3.2.1. The use of waveforms for additional flux $\Phi_A$ permit the user to locate crossings and anticrossings, as well as to average the readout signal. The location of crossings and anticrossings is proportional to the amplitude of the additional flux. The oscillatory nature of the waveform permits signal average across a given region of additional flux.

There are independent parameters that can be altered for each waveform. These parameters include, for example, waveform shape, direction, period, amplitude, amplitude growth function, and equilibrium point. The waveforms can oscillate in both directions about an equilibrium point with a mean of zero (bidirectional), or oscillate away from the equilibrium point in one direction with a non-zero mean (unidirectional). The amplitude for the additional flux $\Phi_A$ can be constant, or grow with time. The growth can be continuous or punctuated. The equilibrium point can be a fixed value of flux or vary with time. The shape of the waveform is an oscillatory function that can be selected from a variety of shapes including, for example, sinusoidal, triangular, and trapezoidal, and the low harmonic Fourier approximations thereof. Exemplary waveforms that can be used in accordance with the present invention are illustrated in FIGS. 10A-D. The waveforms, in FIGS. 10A-D are plotted as the additional flux $\Phi_A$ against time, in arbitrary units.

In an embodiment of the present invention, the maximum amplitude of the additional flux $\Phi_A$ in a superconducting qubit is between about 0.01 $\Phi_0$ and about 1 $\Phi_0$. In another embodiment of the present invention, the maximum amplitude of the additional flux in a superconducting qubit is between about 0.1 $\Phi_0$ and about 0.5 $\Phi_0$. In another embodiment of the present invention, the maximum amplitude of the additional flux in a superconducting qubit varies but has a mean of about 0.25 $\Phi_0$ and can deviate from this value by as much as 0.125 $\Phi_0$. For a superconducting qubit such as qubit 101 of FIG. 1A, having a loop that has a width of about 7 µm and a length of about 15 µm, or an inductance of about 30 picohenries, this corresponds to a magnetic field of 0.05 Gauss, but can deviate from this value by as much as 0.025 Gauss. In some embodiments of the present invention, the term "about" in relation to flux values denotes a tolerance that allows for up to a ±50% deviation from the quoted value. In other embodiments, the term "about" in relation to flux values denotes a tolerance that allows for up to ±15%, up to ±5%, up to ±2%, or up to ±1% deviation from the quoted value.

The frequency of oscillation, $f_A$, is such that the change in flux $\Phi_{DC}$ in quantum system 850 remains adiabatic. In embodiments of the present invention, the period ranges from one cycle per second to about 100 kilocycles per second. Failure of the process to remain adiabatic results in a Landau-Zener transition. For more information on Landau-Zener transitions see, for example, Garanin et al., 2002, *Phys. Rev. B* 66, 174438, which is hereby incorporated by reference in its entirety.

In some embodiments, rather than sweeping through a range of applied fluxes in accordance with a single waveform (oscillation, cycle), the waveform is repeated a plurality of time (plurality of oscillations, plurality of cycles) and voltage response across each of these oscillations (cycles) is averaged. The number of oscillations needed to perform readout, in such embodiments, depends on the architecture of quantum system 850. In one embodiment of the present invention, between 1 cycle and 100 cycles are used to readout the state of a qubit. In one embodiment of the present invention, a single cycle that transitions through the Landau-Zener anticrossing (FIG. 9A) or sweeps through a hysteresis loop (FIG. 9B) at a crossing, can perform a readout (step 407 of FIG. 4). In other embodiments of the present invention, ten or more cycles (e.g. 20 sweeps through the Landau-Zener anticrossing, FIG. 9A, or 20 sweeps through a hysteresis loop, FIG. 9B) are used to readout the state of a qubit. In some embodiments of the present invention, up to 100 cycles (sweeps) are used to readout the state of a qubit. More cycles improve the signal to noise ratio of the readout. The number of cycles needed depends on the total RC characteristic time of the electronics attached to tank circuit 810 (FIG. 8). When using a lockin amplifier, a preamplifier, an amplifier, a lockin voltmeter, an oscilloscope or any combination thereof, as a tank circuit 810, a combined RC value is achieved that permits readout in a few cycles, or even a single cycle (e.g., a single sweep through the Landau-Zener anticrossing, FIG. 9A, or a single sweep through a hysteresis loop, FIG. 9B).

Figure 10A:
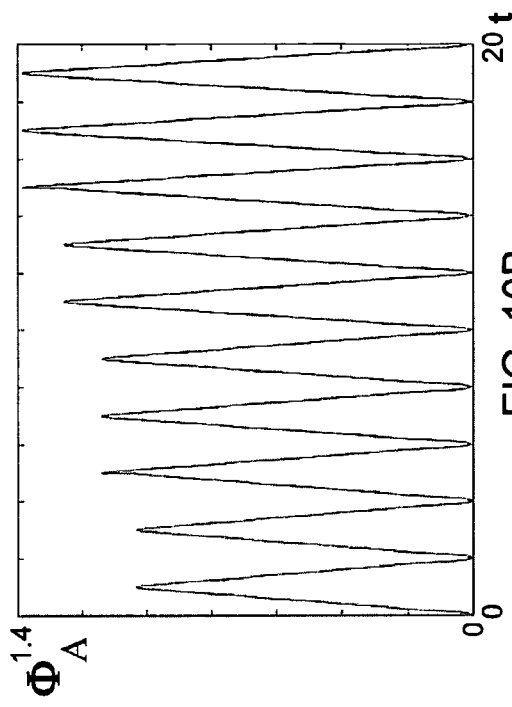
FIGS. 10A-10D illustrate the waveforms for additional flux $\Phi_A$ in a qubit undergoing adiabatic quantum change, in arbitrary units, in accordance with various embodiments of the present invention.

FIG. 10A depicts an example of the additional flux $\Phi_A$ that is applied to a superconducting qubit, or plurality of superconducting qubits, in accordance with an embodiment of the present invention. FIG. 10A depicts a unidirectional triangular waveform that grows continuously with time. The value of the flux oscillates with a period that is fixed, but with an amplitude that grows with time. The amplitude can grow linearly, polynomially, logarithmically, exponentially, etc. provided that it does not cause the additional flux to grow at such a rate that the change of flux is diabatic. The amplitude is directed to grow when no dip in the voltage of tank circuit 810 has been observed in a previous cycle so that more parameter space, e.g. a greater region of addition flux values, can be probed. The amplitude is directed to grow until a crossing (FIG. 9B) or anticrossing (FIG. 9A) is found or the operator determines neither is proximate to the parameter space being searched. In FIG. 10A, the additional flux is returned to the equilibrium point of zero additional flux with every period (every cycle). As shown in FIG. 10A, the equilibrium point can be fixed.

Figure 10B:
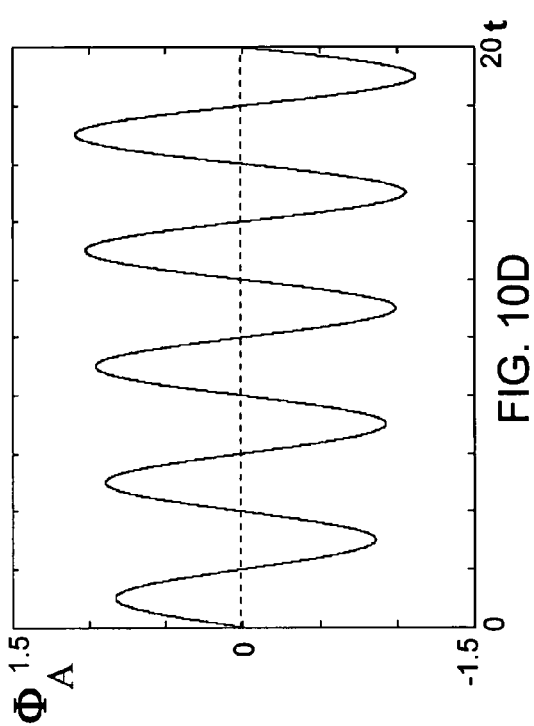

FIG. 10B depicts another example of a waveform for additional flux $\Phi_A$ that is applied to a superconducting qubit, or plurality of superconducting qubits, in accordance with an embodiment of the present invention. FIG. 10B depicts a unidirectional triangular waveform the amplitude of which grows in steps. The amplitude can grow by a fixed increment after a set number of cycles (e.g., 2 or 3). In an embodiment of the present invention, the amplitude of the additional flux grows by up to 1, up to 2, up to 5, up to 10, up to 20, or up to 50 percent with each step. The amplitude of the additional flux in FIG. 10B grows by up to about 10 percent with every step. The change in amplitude is selected such that the additional flux does not grow at such a rate that the change of flux is diabatic. The period between steps can be about 2.5 cycles (as shown) or every 5, 10, 20, 50, 100, 200, cycles. The triangular pattern of FIG. 10B, has peaks that are less sharp than those in FIG. 10B. In an embodiment of the present invention, the wave form represented in FIG. 10B is a low harmonic Fourier approximation of a triangular waveform. As shown in FIG. 10B, the equilibrium point is fixed in some embodiments of the present invention.

Figure 10C:
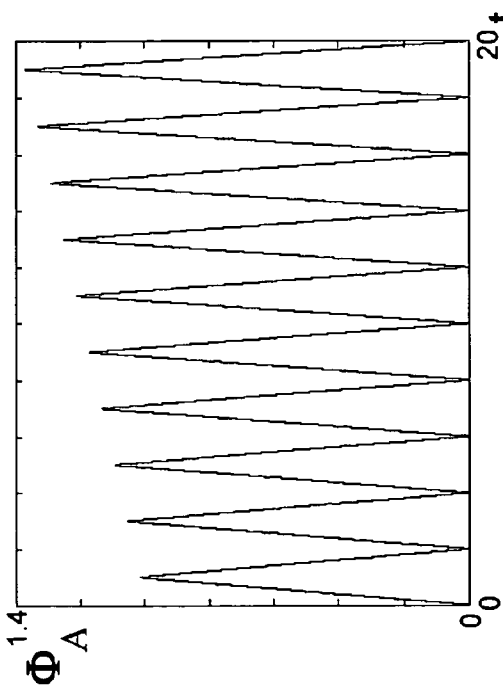

FIG. 10C depicts another example of a waveform of additional flux $\Phi_A$ that is applied to a superconducting qubit, or plurality of superconducting qubits in a quantum system 850, in accordance with another embodiment of the present invention. FIG. 10C depicts a unidirectional low harmonic approximation of a trapezoidal waveform with an amplitude that grows continuously. In an embodiment of the present invention, the number of harmonics, per basis function, in an approximating waveform is as low as about 1, and as high as about 100.

As shown in FIG. 10C, the equilibrium point can vary with time. Because the objective for application of additional flux $\Phi_A$ is to seek an interval of flux that locates the anticrossings (FIG. 9B) or hysteresis loop (FIG. 9B), there is no need to re-probe previously probed intervals. Therefore, the equilibrium point of the unidirectional waveform can move with time. The amplitude of the additional flux for any given period should be such that the anticrossing (FIG. 9A), or hysteresis loop (FIG. 9B, e.g., the transition from |0> to |1> when curve 952 is traversed from right to left until state |0> vanishes), can be resolved. Therefore, the amplitude of the applied flux waveform should exceed the width of the anticrossing, or hysteresis loop as plotted as a function of flux. Moving the equilibrium point of the unidirectional waveform saves time, while allowing the search to remain adiabatic.

Figure 10D:
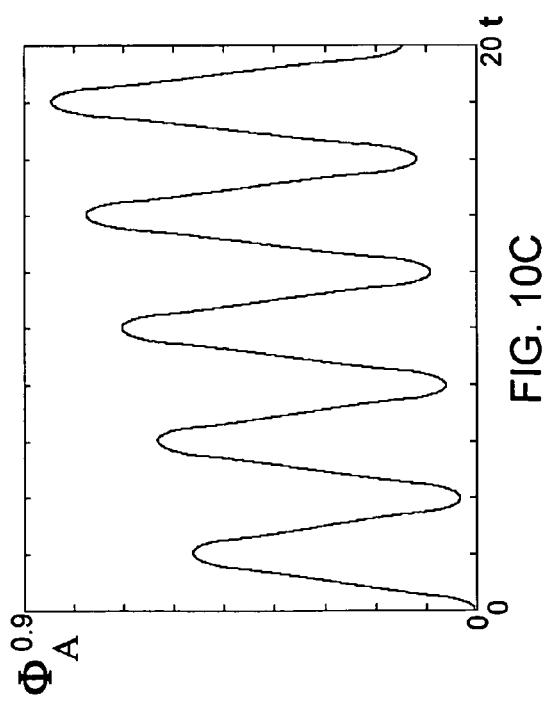

FIG. 10D depicts another example of a waveform of additional flux $\Phi_A$ that is applied to a superconducting qubit, or plurality of superconducting qubits, in accordance with another embodiment of the present invention. FIG. 10D depicts a bidirectional sinusoidal waveform with amplitude that grows continuously. In FIG. 10D, the equilibrium point does not move. Bidirectional waveforms in accordance with FIG. 10D search for an anticrossing (FIG. 9A) or hysteresis loop (FIG. 9B) in two directions lessening the required accuracy needed to find the locations of such events.

5.3.2.3 Form of Readout Signal

Figure 11A:
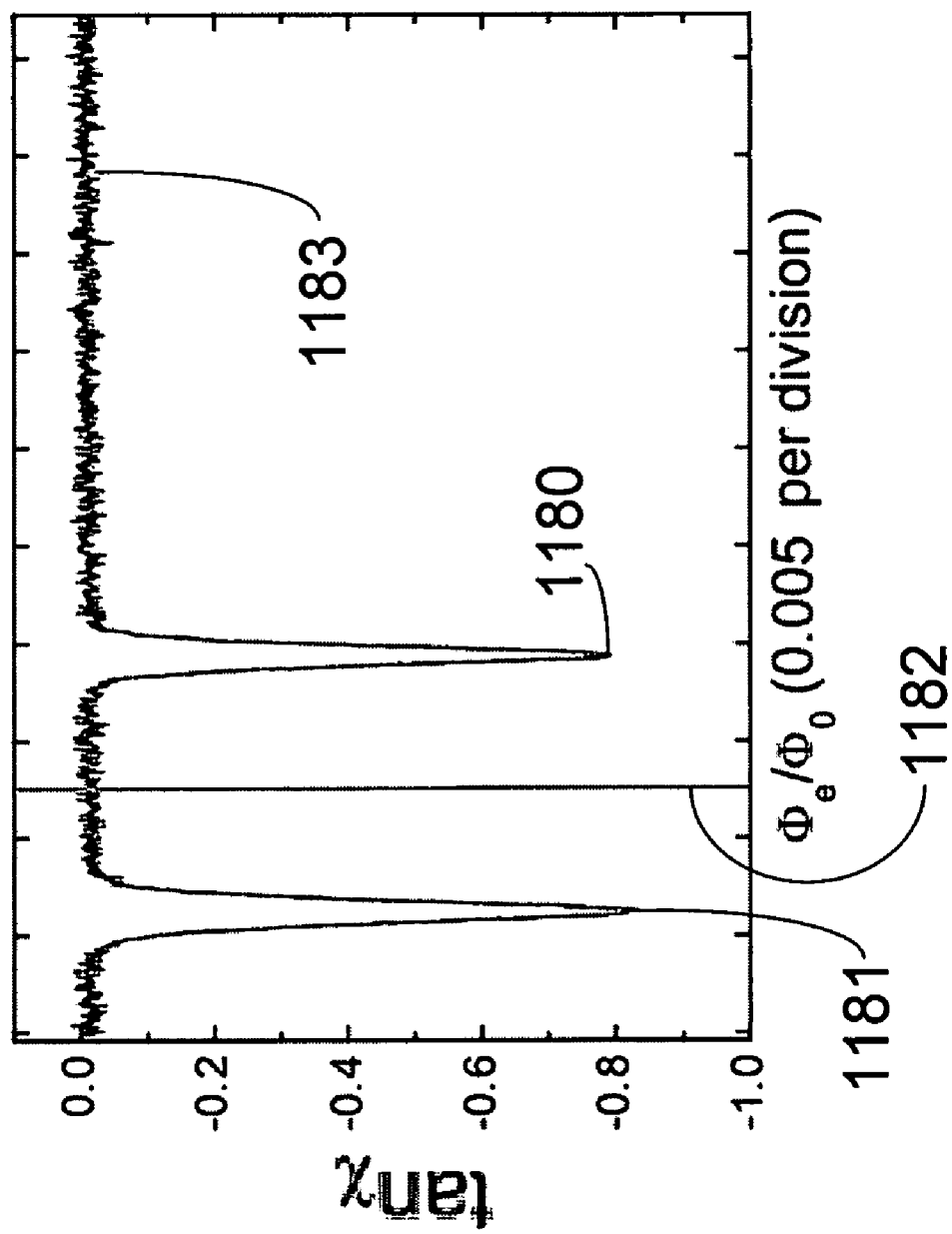
FIG. 11A illustrates the form of a readout signal for a superconducting qubit having an anticrossing between two energy levels.
Figure 11B:
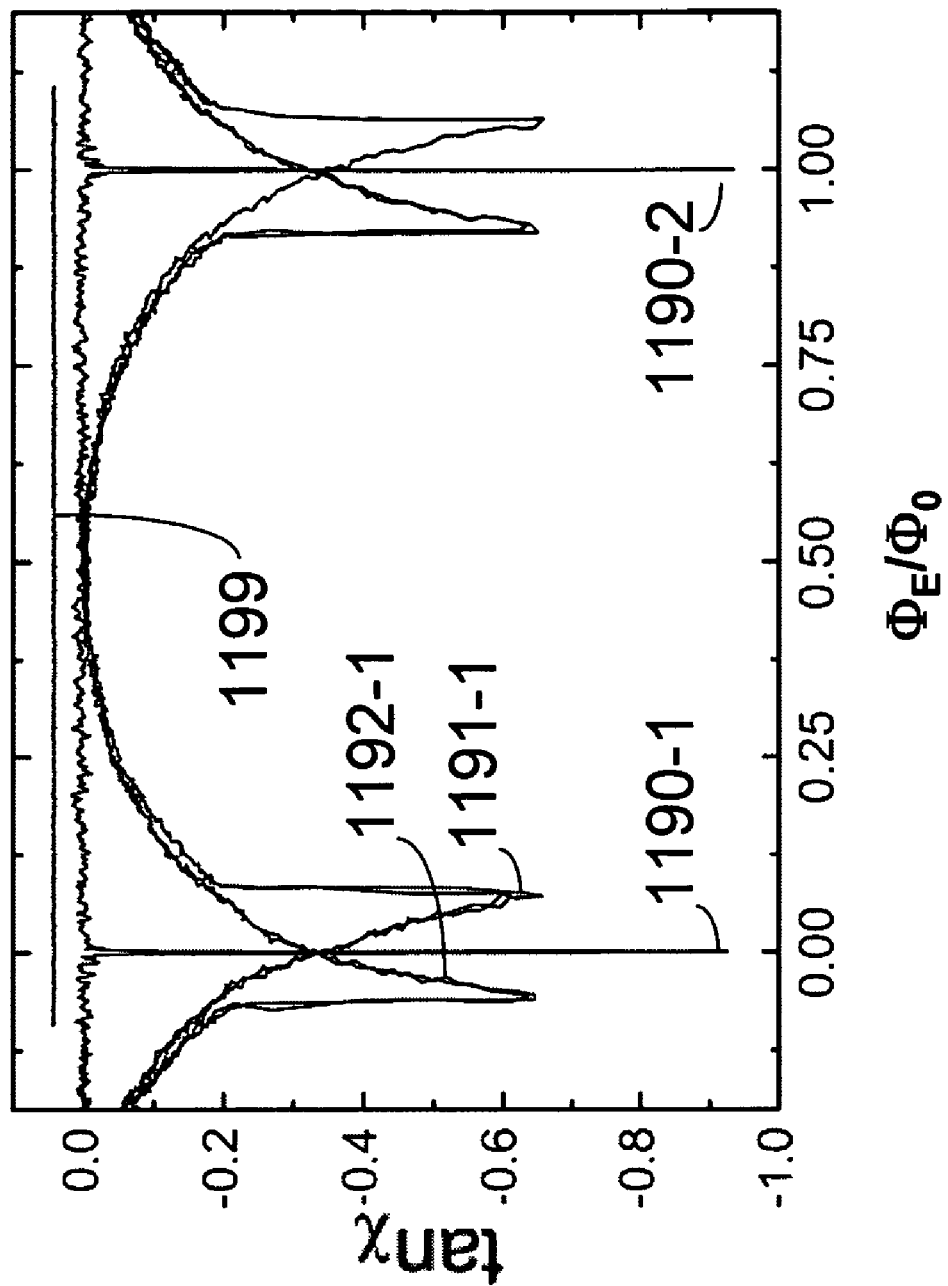
FIG. 11B illustrates the form of a readout signal for a superconducting qubit having that does not have anticrossing between two energy levels.

In accordance with some embodiments of the present invention, FIG. 11 depicts examples of the form of readout signals, e.g. tank circuit 810 voltage dips, obtained by measurement of a superconducting qubit or plurality of superconducting qubits in a quantum system 850. FIG. 11A illustrates the form of a readout signal for a superconducting qubit that includes an anticrossing (FIG. 9A) between two energy levels. FIG. 11B illustrates the form of a readout signal for a superconducting qubit that includes a crossing (FIG. 9B) between two energy levels. FIGS. 11A and 11B plot the voltage response of a tank circuit against the additional flux $\Phi_A$ in the qubit.

FIG. 11A is the output from an oscilloscope. The background noise for the signal, once averaged over about twenty cycles of a waveform of additional flux $\Phi_A$, is shown as signal 1183. The equilibrium point of the additional flux $\Phi_A$ is denoted line 1182. In the case of a bidirectional search, line 1182 shows the average value of the additional flux applied to the qubit. For a unidirectional search, line 1182 shows the minimum amount of additional flux for a period of a waveform from FIG. 10. In many instances, such as the waveform depicted in FIG. 10C, line 1182 and the equilibrium point it represents can move over time. In an embodiment of the present invention, the input to the oscilloscope is a lock-in voltmeter.

Voltage dips 1180 and 1181 in FIG. 11A are correlated with an anticrossing located to the right and left of equilibrium 1182. In accordance with the conventions of FIG. 9A, voltage dips 1180 and 1181 corresponds to the measured qubit being in the |0> and |1> state, respectively. Using the conventions of FIG. 9A, the graph illustrated in FIG. 11A depicts two measurement results. If the dip 1180 is observed this is an indication that the qubit was in the |0> state. If the dip 1181 is observed this is an indication that the qubit was in the |1> state. Both dips are drawn for illustrative purposes, but ordinarily only one would be observed. A person having ordinary skill in the art will appreciate that assignment of the labels "0" and "1" to states |0> and |1> is arbitrary and that direction of circulation of the current in the superconducting qubit is the actual physical quantity being measured. Further a person having ordinary skill in the art can make such a labeling for the physical state of any described embodiment of the present invention.

FIG. 11B is also the output from an oscilloscope. Graph 11B spans a wider range of additional fluxes $\Phi_A$ than graph 11A. The periodic behavior of the measured qubit is shown by the repetition of features every flux quantum along the horizontal axis. A voltage dip in this view is denoted by 1190-1 and corresponds to an unspecified state that is an equilibrium point. Also found in FIG. 11B are voltage dips that represent an energy level crossing for the measured qubit. The plot shows dips 1191-1 and 1192-1, with the tell tale signs of hysteretic behavior—a voltage dip that is wide on one side and has a sharp rise on the other. As the flux is applied to the qubit, the characteristics of the sides reverse location. Hysteric behavior is a term used to describe a system whose response depends not only on its present state, but also upon its past history. Hysteric behavior is shown by the dips in the voltage of tank circuit 810 illustrated in FIG. 11B. The behavior at particular points in the sweep illustrated in FIG. 11B depends on whether the flux is being increased or decreased. A person having ordinary skill in the art will appreciate that this behavior evidences hysteretic behavior and therefore the presence of an energy level crossing (e.g., crossing 960 of FIG. 9B). See, for example, United States Patent Publication, U.S. 2003/0224944 A1, entitled "Characterization and measurement of superconducting structures," which is hereby incorporated by reference in its entirety. Referring to FIG. 11B, the state the qubit was in prior to readout (prior to applying the flux in accordance with a waveform such as any of those depicted in FIG. 10) is determined by the location of voltage dips 1191-1 and 1192-1 relative to an equilibrium point. As per the conventions of FIG. 9B, if voltage dips 1191-1 and 1192-1 are to the left of the equilibrium point, than the qubit is in the |1> basis state prior to readout, whereas the qubit is in the |0> basis state if the dips are to the right of the equilibrium point. A person having ordinary skill in the art will appreciate that assignment of the labels "0" and "1" for states |0> and |1> is arbitrary and that the direction of circulation of the current in the superconducting qubit is the actual physical quantity being measured.

In an embodiment of the present invention, the voltage dips are in fact peaks because the polarity of the leads to tank circuit 810 wires have been reversed. In an embodiment of the present invention, a qubit in quantum system 850 does not have a crossing or an anticrossing in the region that is probed. The signal from the readout of such a qubit is illustrated as element 1199 in FIG. 11B. In an embodiment of the present invention, the state of a qubit can be determined by the relative position of the qubit's readout signal to the equilibrium point.

The fidelity of the readout (step 407 of FIG. 4) is limited by the occurrence of Landau-Zener transitions. A Landau-Zener is a transition between energy states across the anticrossing illustrated in FIG. 9A. A person having ordinary skill in the art will appreciate that the mere occurrence of Landau-Zener transitions does not necessarily convey information about the state of a qubit prior to readout, particularly in adiabatic readout processes. Rather, the exact form and phase of such transitions conveys such state information. A Landau-Zener transition will appear as a wide, short dip on the oscilloscope screen using the apparatus depicted in FIG. 8. However, the occurrence of a Landau-Zener transition is only useful if the readout process (the sweep through an applied flux range) occurring is diabatic. The processes that can be diabatic are certain embodiments of the readout process for a small number of qubits.

In general, and especially during adiabatic evolution for adiabatic quantum computation (transition 404 of FIG. 4), a Landau-Zener transition should not be permitted to occur in preferred embodiments of the present invention. In other words, the occurrence of a Landau-Zener transition is useful for some configurations of quantum system 850 (FIG. 8) in some read out embodiments (step 407) if such read out processes are diabatic. However, in principle, Landau-Zener transitions should not occur during steps 401, 403, 404, and 405 of FIG. 4 and, in fact, the probability that such a transition will occur in step 404 serves to limit the time in which quantum system 850 can be adiabatically evolved from $H_0$ to $H_P$.

One embodiment of the present invention makes use of a negative feedback loop technique to ensure that Landau-Zener transitions do not occur during adiabatic evolution 404 (FIG. 4). In this feedback technique, the user of an adiabatic quantum computer observes the readout from one or more superconducting qubits undergoing adiabatic evolution. If an anticrossing is approached too fast, tank circuit 810 coupled to quantum system 850 (FIG. 8) will exhibit a voltage dip. In response, the user, or an automated system, can repeat the entire process depicted in FIG. 4 but evolve at a slower rate during step 404 so that evolution 404 remains adiabatic. This procedure permits the adiabatic evolution to occur at a variable rate, while having a shorter duration, and remain an adiabatic process.

In some embodiments of the present invention, the change in magnitude of the response of tank circuit, $\chi$, ranges from 0.01 radians to about 6 radians for the phase signal. In some embodiments of the present invention, the change in magnitude of the response of the tank circuit, $\tan(\chi)$, ranges from 0.02 microvolt ($\mu V$) to about 1 $\mu V$ for the amplitude signal.

5.3.2.4 Adiabatic Readout

Embodiments of the present invention can make use of an adiabatic process to readout the state of the superconducting qubit during measurement step 407. Additional flux $\Phi_A$ and rf flux $\Phi_{RF}$ are added to the superconducting qubit and are modulated in accordance with the adiabatic processes described above. In instances where an additional flux generates a dip in the voltage of tank circuit 810 and this additional flux exceeds the amount of flux needed to reach the equilibrium point of the qubit, the qubit is deemed to have been in the |0> quantum state at the beginning of measurement step 407, in accordance with the conventions of FIG. 9B. Conversely, in instances where such additional flux generates a dip in the voltage of tank circuit 810 and this additional flux is less than the amount of additional flux needed to reach the equilibrium point of the qubit, the qubit is deemed to have been in the |1> at the beginning of measurement step 407, in accordance with the conventions of FIG. 9B. The voltage dip is proportional to the second derivative of the energy level with respect to flux, or other parameters for other qubits. Therefore, the dip occurs at and around the anticrossing 960 where the curvature of the energy level is greatest. After reading out the state of the superconducting qubit, the qubit is returned to its original state. That is the state it was in at the beginning of measurement, e.g. the state under $H_P$. The result of the readout is recorded as a part of step 407. The superconducting qubit is returned to its original state, e.g. the state under $H_P$, by adiabatically removing the additional flux in the qubit. In preferred embodiments, the adiabatic nature of this type of readout does not alter the state of the superconducting qubit. In other words, the readout does not leave the qubit in a state that is different than the state the qubit was in prior to commencement of the readout process.

5.3.2.5 Diabatic Readout

In contrast to the example provided in Section 5.3.2.4, embodiments of the present invention in accordance with this section make use of a diabatic process to readout the state of a superconducting qubit after the adiabatic quantum computation has been completed. In typical embodiments, this is the only part of the process illustrated in FIG. 4 that can be diabatic. In such instances, as part of measurement step 407, additional flux $\Phi_A$ and rf flux $\Phi_{RF}$ is added to the superconducting qubit with a modulation that is faster than prescribed for an adiabatic processes using the techniques described above. In such instances, when an applied additional flux causes a voltage dip in tank circuit 810 to occur and such applied additional flux is more than the amount of applied additional flux necessary to achieve the equilibrium point of the qubit, the qubit is deemed to have been in the |0> state at the beginning of measurement step 407, in accordance with the conventions of FIG. 9A. Correspondingly, when an applied additional flux causes a voltage dip to occur in tank circuit 810 and this additional flux is less than the amount of additional flux that is necessary to achieve the equilibrium point for the qubit, the qubit is deemed to have been in the |1> state at the beginning of measurement step 407, in accordance with the conventions of FIG. 9A. The result of the readout is recorded as a part of step 407. Unlike the embodiments described in Section 5.3.2.4, the diabatic nature of this type of readout can cause the state of the superconducting qubit to alter during readout 407, thereby leaving the qubit in a different state at the end of step 407 than the qubit was in at the beginning of step 407.

5.3.2.6 Repeated Readout

Embodiments of the present invention can make use of repeated adiabatic processes to readout the states of a plurality of superconducting qubits in quantum system 850 (FIG. 8). Such embodiments work by reading the state of each superconducting qubit in succession. In other words, in embodiments where quantum system comprises a plurality of qubits, each qubit in the plurality of qubits is independently readout in a successive manner so then, when any give qubit in the plurality of qubits in the quantum system 850 is being readout all other qubits in the quantum system are not being readout. A qubit that is being readout while other qubits in the quantum system are not being readout is referred to in this section as a target qubit.

In preferred embodiments, each qubit in quantum system 850 (FIG. 8) is read out adiabatically such that the quantum state of each of the remaining qubits in the quantum system is not altered. In contrast to the single qubit embodiments described above, the state of all the qubits, target and other, are not altered during the readout process 407 of any give target qubit. The target qubit's state (the qubit that is being readout) is temporarily flipped but the qubit is returned to its original state, e.g. the state under $H_P$, by adiabatically removing the additional flux in the target qubit. This contributes a multiplicative factor, based on the number of qubits in quantum system 850, to the length of the adiabatic computation time. However, any single multiplicative factor keeps the overall adiabatic computation time polynomial with respect to the number of qubits. In some embodiments, quantum system 850 comprises two or more qubits, three or more qubits, five of more qubits, ten or more qubits, twenty or more qubits, or between two and one hundred qubits.

5.3.2.7 Biasing Qubits During Measurement

As part of measurement step 407, each qubit, when it is the target qubit, in the plurality of superconducting qubits in quantum system 850 (FIG. 8) is biased. The magnetic fields for the bias can be applied by the bias lines proximate on the qubit. The current used to bias the qubit is dependent on the mutual inductance between the qubit and the bias line. In some embodiments of the present invention, currents used in biasing the qubit have values of between about 0 milliamperes and 2 milliamperes, inclusive. Some embodiments of the present invention make use of bias values of up to ±20, up to ±50, up to ±90, up to ±120, up to ±150, up to ±180, up to ±210, up to ±240, up to ±300, up to ±550, up to ±800, up to ±1100, or up to ±1500 nanoamperes. Here, the term "about" means ±20% of the stated value. In such embodiments, a target qubit within quantum system 850 is selected. Additional flux $\Phi_A$ and rf flux $\Phi_{RF}$ are added to the target qubit, and are modulated in accordance with the adiabatic readout processes described above. In such instances, when the additional flux that produces a voltage dip in tank circuit 810 is more than the amount of flux associated with the equilibrium point of the qubit, the qubit is deemed to have been in the |0> state at the beginning of measurement step 407 in accordance with the conventions of FIG. 9. Similarly, when the additional flux that produces a voltage dip in tank circuit 810 is less than the amount of flux associated with the equilibrium point of the qubit, the qubit is deemed to have been in the |1> state in accordance with the conventions of FIG. 9. After reading out the state of the target qubit, the target qubit is returned to the state that the qubit was in prior to measurement. The result of the readout is recorded in vector $\vec{O}$ as a part of step 407. The process is repeated for a new target qubit in the plurality of qubits until all the qubits have been readout. In some embodiments, when a new target is selected, a randomly selected bias is applied to the old target qubit. Randomization of the order of target qubits and rerunning the computation helps avoid errors. The adiabatic nature of this type of readout typically does not flip the state of the target qubit nor any of the superconducting qubits in the plurality of superconducting qubits.

5.3.2.8 The Quantum Mechanical Nature of the Readout Signal

Readout using tank circuit 810, unlike readout using a DC-SQUID or a magnetic force microscope MFM, is a quantum non-demolition read out (QND). The readout is quantum non-demolition in nature because the qubit remains in its ground state for the entire duration of the readout. That is, the qubit remains in the ground state (lower energy level 909 of FIG. 9A). The qubit may be in some mixture of basis states, such as, $(2)^{-1/2}(|0>+|1>)$ but not $(2)^{-1/2}(|0>-|1>)$ which corresponds to a level in the exited state (upper energy level 919 of FIG. 9A). The output signal of tank circuit 810 contains information about the amplitude of the states of the superconducting qubit, but collects no information about the phase of the oscillating circulating current. In other words, tank circuit 810 destroys the phase coherence of the persistent current oscillations of the superconducting qubit during the readout process leaving the amplitude unperturbed. The reason is that the operator probed by tank circuit 810 is $\sigma_X$ and, in this sense, such a readout is the complement of the DC-SQUID and MFM readout, which measures the state of the $\sigma_Z$ operator ($\sigma_X$ and $\sigma_Z$ are Pauli matrices). A $\sigma_X$ readout is advantageous in adiabatic quantum computing processes. The qubit remains in its ground state also after the measurement, e.g., the measurement of one qubit does not perturb the result of the adiabatic evolution. This allows the readout process to be adiabatic.

5.3.3 Application Of Approximate Evaluation Techniques

The detailed exact calculation of energy spectra of an instantaneous Hamiltonian H(t) can be intractable due to exponential growth of the problem's size as a function of the number of qubits used in an adiabatic computation. Therefore, approximate evaluation techniques are useful as a best guess of the location of the crossings and anticrossings. Accordingly, some embodiments of the present invention make use of an approximate evaluation method to locate anticrossing of the energies, or energy spectra, of the qubits in quantum system 850. Doing so lessens the time needed to probe the anticrossing and crossings with additional flux.

In an embodiment of the present invention, techniques collectively known as random matrix theory (RMT) are applied to analyze the quantum adiabatic algorithm during readout. See Bougerol and Lacroix, 1985, *Random Products of Matrices with Applications to Schrödinger Operators*, Birkhäuser, Basel, Switzerland; and Brody et al., 1981, *Rev. Mod. Phys.* 53, p. 385, each of which is hereby incorporated by reference in its entirety.

In another embodiment of the present invention, spin density functional theory (SDFT) is used as an approximate evaluation method to locate anticrossing of the energies of the system. The probing of the energy spectra by the additional flux can then be used to locate the crossings and anticrossings and perform a readout of the state of superconducting qubits.

In another embodiment of the present invention, the approximate evaluation technique comprises a classical approximation algorithm in order to solve NP-Hard problems. When there is a specific instance of a problem to be solved, the problem is mapped to a description of the qubits being used to solve the NP-Hard problem. This process involves finding an approximation algorithm to the problem being solved by the quantum computer and running the approximation algorithm. The approximate solution is then mapped to the quantum computer's state using the mapping that was used to encode the instance of the NP-Hard problem. This provides a good estimate for the state of the superconducting qubits and lessens the requirements on probing the energy levels for crossings and anticrossings. Such a mapping typically involves setting the coupling energies between the qubits being used to solve the NP-Hard problem so that the qubits approximately represent the problem to be solved. For examples of approximation algorithms useful for the present invention see Goemans and Williamson, "0.878-approximation algorithms for MAX CUT and MAX 2SAT," In *Proceedings of the Twenty-Sixth Annual ACM Symposium on the Theory of Computing*, pages 422-431, Montréal, Québec, Canada, 23-25 May 1994; Hochbaum, 1996, *Approximation algorithms for NP-hard problems*, PWS Publishing Co., Boston; and Cormen et al., 1990, *Introduction to Algorithms*, MIT Press, Cambridge, each of which is hereby incorporated by reference it its entirety.

5.3.4 Solving the MAXCUT Problem Using a Persistent Current Qubit Quantum System FIG. 5B discloses another persistent current qubit topology in accordance with the present invention. In system 510, the areas encompassed by the respective superconducting loops of qubits 101 are approximately equal and the heights (y-axis) and widths (x-axis) are equal. In one embodiment in accordance with FIG. 5B, qubits 101 have an area of 105 micrometers squared (height of 15 micrometers and width of 7 micrometers) arranged with two qubits (101-4 and 101-5) paired lengthwise and a third (101-6) laid transverse and abutting an end of qubits 101-4 and 101-5. In one specific embodiment of the present invention, separations 501 each independently range from about 0.01 microns to about 1 micron. The mutual inductance between qubits 101-4 and 101-5 is about 10.5 picohenries. The mutual inductance between qubits 101-5 and 101-6 is about 5.2 picohenries and the mutual inductance between qubits 101-4 and 101-6 is about 2.5 picohenries.

In another specific embodiment of the present invention, separations 501 each independently range from about 0.01 microns to about 1 micron. The mutual inductance between qubits 101-4 and 101-5 is about 18.7 picohenries. The mutual inductance between qubits 101-5 and 101-6 is about 13.3 picohenries and the mutual inductance between qubits 101-4 and 101-6 is about 2.5 picohenries.

In an embodiment of the present invention, each qubit 101 in FIG. 5B has an individual bias line 507. As shown in FIG. 5B, bias lines 507-4, 507-5, and 507-6 are used to respectively apply a localized magnetic field to qubits 101-4, 101-5, and 101-6. The bias lines are useful to bring qubits to a degeneracy point where they naturally tunnel. To minimize the effect one bias line has on another qubit, the incoming and outgoing wires of a bias line 507 can be braided such that the in and out leads to bias lines 507 overlap in a repeating pattern in order to cancel the field generated by each lead. The bias lines in such an example would have a loop at the apex of the line 507 proximate to a qubit to be biased by the line. An alternative method of biasing each qubit is to use a sub-flux quantum generator. See, for example, U.S. patent application Ser. No. 10/445,096, which is hereby incorporated by reference in its entirety. In some embodiments, the current through each bias line 507 is tunable and independent of the current on other bias lines. However, if a plurality of superconducting qubits 101 each have the same surface area, one bias line (one circuit) can be used to bias a plurality of qubits 101 provided that the coupling between the bias line and each of the superconducting qubits is equal.

The adiabatic quantum computing method of the present invention progresses using the system described in FIG. 5B in the same manner as disclosed in Section 5.3.1. Referring to the adiabatic quantum computing process of the present invention as described in FIG. 4, in step 401, a computational problem is set up in system 510 by adjusting distances 501 and the height and widths of the respective superconducting loops of qubits 101. In step 403, the system is initialized to state $H_0$ by using biasing lines 507. In typical embodiments, a characteristic of initial state $H_0$ is that the basis states of qubits 101 cannot couple. Next, in step 405, system 510 is adjusted adiabatically through instantaneous intermediate states in which the basis states of qubits 101 can couple, to the ground state of $H_P$, which represents the solution to the computational problem. Then, in step 407, the solution to the problem is measured by reading out the state of $H_P$. As in system 500 of FIG. 5A, there are eight possible solutions $\{(0,0,0), (0,0,1), (0,1,0), (1,0,0), (0,1,1), (1,1,0), (1,0,1),$ and $(1,1,1)\}$. The solution adopted by the ground state of $H_P$ will represent the solution to the problem.

Figure 6B:
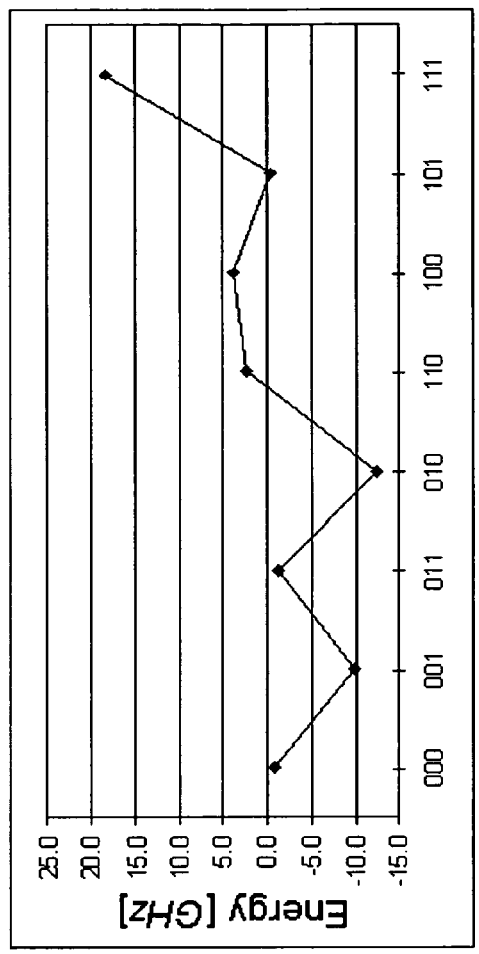
FIGS. 6A-6B illustrates an example of a computational problem that can be solved by adiabatic quantum computing.
Figure 6A:
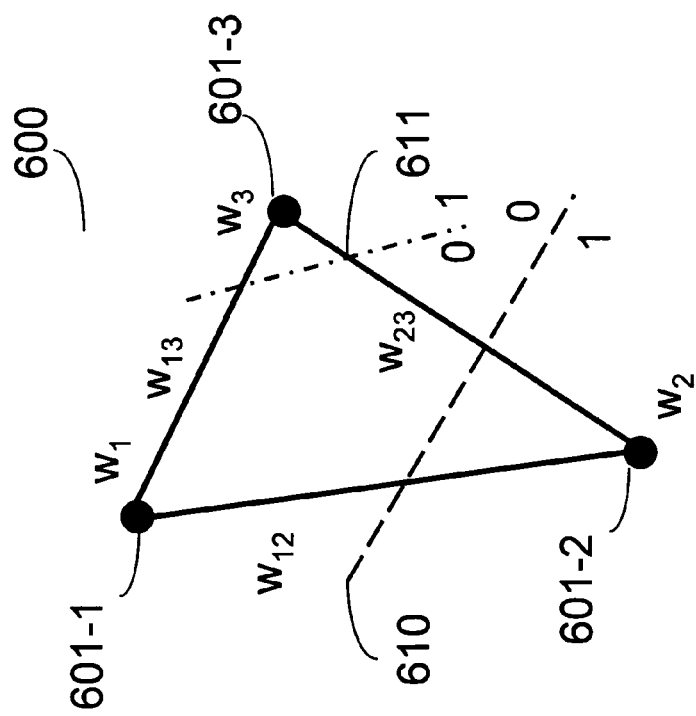

A specific adiabatic quantum computation that can be performed with system 510, an optimization based on an instance of MAXCUT, is shown in FIG. 6A.

Step 401 (preparation). Mathematically, to solve MAXCUT as an optimization, the maximum of the following edge pay off function is sought:

$$P_E(|s\rangle) = \sum_{i=1}^{|V|} \sum_{j>i}^{|V|} s_i(1 - s_j)w_{ij}$$

The vector $|s\rangle = \{s_1, \ldots, s_i, \ldots, s_{|V|}\}$, where $s_i$ is either 0, or 1, is a labeling of all the vertices denoting which side of the partition a given vertex is on. The quantity $w_{ij}$ is the weight of the edge. In an alternative case of the MAXCUT problem, the maximum of the edge pay off function plus the following vertex pay off function is sought:

$$P_V(|s\rangle) = \sum_{i=1}^{|V|} s_i w_i$$

In some embodiments of the present invention, the MAXCUT problem is encoded into the Hamiltonian H that represents a set of superconducting qubits (e.g., system 510 of FIG. 5B). The qubits represented the vertices and the couplings represent the edges in the MAXCUT for which a solution is sought.

FIG. 6B illustrates a plot of $P_E + P_V$ for system 600 of FIG. 6A. The plot represents vertices 601-1, 601-2, and 601-3 as respective points $X_1$, $X_2$, $X_3$ along the X-axis. For example, the point 000 in FIG. 6B represents the energy of system 600 when vertices 601-1, 601-2, and 601-3 are each in the "0" state, the point 001 represents the energy of system 600 when vertices 601-1 and 601-2 are in the "1" state whereas the vertex 601-3 is in the "1" state, and so forth. There are edges between all the vertices. The vertices have weights $w_1$, $w_2$, and $w_3$, while the edges have weights $w_{12}$, $w_{23}$, and $w_{13}$. Two cuts 611 and 610 in system 600 are illustrated in FIG. 6A. Cut 610 places vertex 601-2 in one group and vertices 601-1 and 601-3 in the other group. In the nomenclature used in FIG. 6B, this partition can be labeled "010" because vertex 601-2 is "in" while the other two vertices are "out". Cut 611 places 601-3 in one group and the other vertices in another group. This partition can be labeled "001" because vertex 601-3 is "in". Although FIG. 6 represents only two cuts, quantum systems having more qubits 601 can be employed in order to solve MAXCUT problems involving more cuts.

In an embodiment of the present invention, an instance of MAXCUT is mapped onto a quantum system 850 (e.g., system 510) by setting the bias on each respective qubit in the quantum system to a value that is proportional to the weight of the corresponding vertex in the graph to be solved. System 510 differs from system 500 in that each respective qubit 101 in system 510 can be biased to a different value using, for example, lines 507. Further, the qubits are arranged with respect to each other such that the coupling strength between each respective qubit pair is proportional to the edge weight of the corresponding edge in the graph to be solved. In a particular embodiment of the present invention, an instance of MAXCUT is mapped onto a quantum system 850 (e.g., system 510) as follows. The bias on each qubit is set to a value that is half the negative of the weight of each vertices. Further, the qubits are arranged such that the coupling strength between each qubit pair is half the edge weight of the edge represented by the qubit pair.

Step 403 (Initialization to $H_0$). The partition of a graph can be found using adiabatic quantum computing. Beginning in the state |000>, which is the ground state of:

$$H_0 = Q \sum_{i=1}^{N} \sigma_i^z,$$

the adiabatic quantum computation begins. $H_0$ corresponds to a large magnetic field being applied to all the qubits.

Step 405 (Transition to $H_P$). By slowly reducing the magnetic field while still applying bias to individual qubits proportional to the weights assigned to the qubits, the system is changed to one described by:

$$H_P = \sum_{i=1}^{N} \left[ -\frac{w_i}{2} \sigma_i^z + \Delta_i \sigma_i^x \right] + \sum_{i=1}^{N} \sum_{j>i}^{N} \frac{J_{ij}}{2} \sigma_i^z \otimes \sigma_j^z.$$

Step 407 (Measurement). In step 407, the state of system 510 is determined. To appreciate how measurement of the state of $H_P$ occurs using system 510, consider FIG. 6B which depicts the various possible energy partitions for system 510. In FIG. 6B, the energies of the various partitions are based on the following values of the qubit parameters $J_{12}$=0.246 Kelvin, $J_{23}$=0.122 Kelvin, $J_{13}$=0.059 Kelvin, $\epsilon_1$=0.085 Kelvin, $\epsilon_2$=0.085 Kelvin, $\epsilon_3$=0.29 Kelvin, and $\Delta_{1,2,3}$=0.064 Kelvin, where 1 Kelvin=20.836 gigahertz. The horizontal axis is the set of eight possible cuts through the graph. The cuts all differ by one negation of a digit, i.e., "011" follows "001" and not "010". Here, "010" is the global minimum with energy −12.5 gigahertz while "101" and "001" are local minima. The adiabatic theorem of quantum mechanics asserts that the system will not be trapped in the local minima. Therefore, when system 510 is in $H_P$, it will by in state "010". What follows is a description of a way to measure system 510 in order to determine that the system 510 adopts the solution "010" in $H_P$ as opposed to some other solution.

Measurement of the state of system 510 can occur by repeating the adiabatic quantum computing steps once (steps 401, 403, 405, and 407) for each respective target qubit 101 in system 510. At step 407, the target qubit (the one to be measured) is left in the state determined by $H_P$ but all other qubits 101 in the system are biased to a definite state, e.g. all up. The biasing of all but the target qubit occurs by use of the bias lines 507. The state of all the qubits can then be readout and the state of the target qubit can be inferred from the fact that its state either contributes to or against the field created by all the other qubits. The process is repeated and a new target qubit is selected.

In some embodiments, steps 401, 403, 405 and 407 do not have to be repeated for each qubit in system 510. If the number of tank circuits used is greater than one, (e.g., at least one biasing element 507 is on an independent circuit) the process can be parallelized with one target per tank circuit.

5.3.5 Additional Exemplary Persistent Current Qubit Quantum Systems

FIGS. 5C and 5D represent more extensive quantum systems in accordance with the present invention. As shown in FIGS. 5C and 5D, arrays of qubits can be formed. In FIGS. 5C and 5D, each box is a qubit. Arrays that have bias lines attached to each qubit may have a layout like system 515. In some embodiments, arrays of qubits do not utilize bias lines for each qubit, and take a form such as that of FIG. 5D. In such embodiments, bias can be controlled globally, or sub-flux quantum generators can be used.

5.4 Charge Qubit Embodiments

5.4.1 Adiabatic Quantum Computing with Charge Qubits

In accordance with an aspect of the present invention, superconducting charge qubits can be used in adiabatic quantum computation devices (e.g., in quantum systems 850). In an embodiment of the present invention, capacitively coupled superconducting charge qubits can be used for adiabatic quantum computing. In an embodiment of the present invention, the charge qubits have a fixed or tunable tunneling term. In an embodiment of the present invention, the couplings between charge qubits have a fixed or tunable sign and/or magnitude of coupling. Some embodiments of the present invention are operated in a dilution refrigerator, where the temperature is about 10 millikelvin. Some quantum systems 850 of the present invention are operated at a temperature below 50 millikelvin. The quantum systems 850 of other embodiments of the invention are operated below 200 millikelvin. Still others are operated below 4.2 Kelvin.

5.4.2 Superconducting Charge Qubits for AQC

Figure 12B:
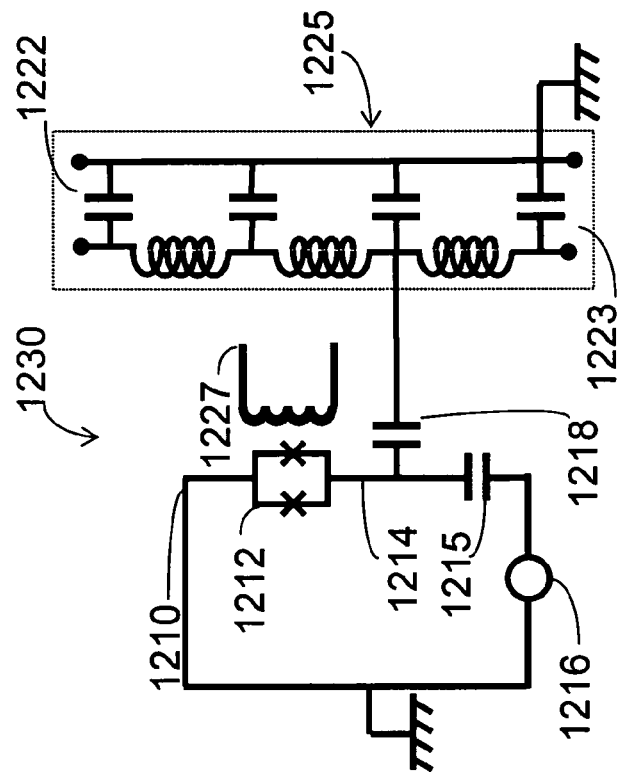
Figure 12A:
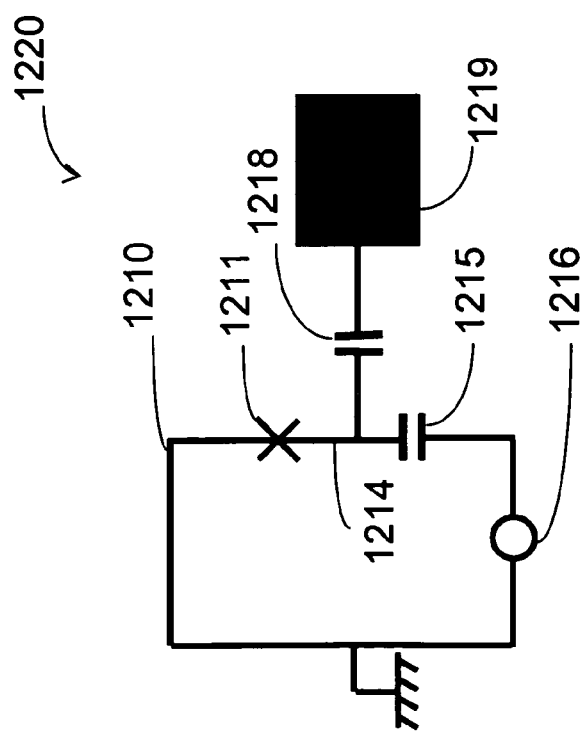

A superconducting charge qubit suitable for use in embodiments of the present invention is shown in FIG. 12A. The charge qubit 1220 includes an island of superconducting material 1214. In an embodiment of the present invention the island encompasses an area of about 32000 square nanometers (0.032 square micrometers). Island 1214 is connected to a reservoir 1210 through a Josephson junction 1211, with Josephson energy $E_J$. In an embodiment of the present invention, the thermal energy ($k_B T$) is less than the charge energy of the superconducting charge qubit ($E_C$). In an embodiment of the present invention, the Josephson energy ($E_J$) is greater than the superconducting material energy gap.

In some embodiments, qubit 1220 is made of a film of superconducting material deposited on top of an insulating layer over a ground plane. In an embodiment of the present invention, the film of superconducting material is a layer of aluminum, a thin (about 400 nanometer) layer of $Si_3N_3$ is useful insulating layer above a gold ground plane. In such an example, a suitable insulating material is aluminum oxide, used alone or in combination with other insulating materials. Reservoir 1210 can be made of similar materials but is larger than island 1214. In other embodiments of the present invention, the superconducting material is niobium and the insulating material is aluminum oxide.

In an embodiment of the present invention, island 1214 has an effective capacitance to ground of about 600 attofarads and is coupled to the reservoir 1210 through a Josephson junction 1211 with the Josephson energy of about 20 micro-electron-volts (0.232 kelvin). Reservoir 1210 is a big island with about 0.1 nanofarad or larger capacitance relative to the ground plane and is otherwise galvanically isolated from the external environment.

The qubit states are controlled by electrostatic control pulses. The control pulses can be direct current or alternating current created by generator 1216. The control pulses can be used to induce a gate charge on superconducting island 1214.

The energy states of the qubit are controlled by electrostatic control pulses. The control pulses can be direct current or alternating current. The control pulses can be used to induce a gate charge on superconducting island 1214. In some embodiments, the pulses are applied to the superconducting charge qubit islands, to the SET islands and to the trap islands in the various embodiments of the invention. The pulses are applied across the capacitances coupled to the islands. Some embodiments of the present invention require a pulse generator for qubit manipulation and readout. Suitable generators include an Agilent E8247C microwave generator (Agilent Technologies, Inc., Palo Alto, Calif.) or an Anritsu MP1763C (Anritsu Corporation, Kanagawa, Japan, or Anritsu Company, Morgan Hill, Calif.).

As shown in FIG. 12B, in an embodiment of the present invention, the charge qubit 1220 depicted in FIG. 12A is modified by replacing the Josephson junction 1211 of qubit 1220 with a flux modulated DC-SQUID 1212 in order to form qubit 1230. In particular, island 1214 of qubit 1230 is connected to reservoir 1210 through two Josephson junctions in parallel defining a low inductance loop. The Josephson junctions and loop comprise a DC-SQUID 1212. The Josephson energy $E_J$ of qubit 1230 is controlled by an external magnetic field supplied by a flux coil 1227. The Josephson energy $E_J$ of DC-SQUID 1212 can be tuned from about twice the Josephson energy of the Josephson junctions that make up the DC-SQUID to about zero. In mathematical terms, $$E_J = 2E_J^0 \left|\cos\left(\frac{\pi\Phi_X}{\Phi_0}\right)\right|$$

where $\Phi_X$ is the external flux applied from coil 1227 to DC-SQUID 1212, and $E_J^0$ is the Josephson energy of one of the Josephson junctions in 1212. The DC-SQUID 1212 can also be refereed to as a split Josephson junction, or a split junction. If one half a flux quantum is applied to the split junction the effective Josephson energy is zero, when the Josephson energies of the Josephson junctions are equal. If a flux quantum, or no flux, is applied to the split junction, the effective Josephson energy is $2E_J^0$, or $E_{J,MAX}$. The magnetic flux in the split Josephson junctions can be applied by a global magnetic field.

The Josephson energies of the two Josephson junctions in DC-SQUID 1212 are ideally equal but need not be perfectly equal. The coupling through the DC-SQUID is proportional to the difference between the Josephson energies of the Josephson junctions divided by their sum. With some fabrication practices it is possible to make this ratio one percent or less. Other fabrication processes can make this ratio one tenth of one percent or less. For adiabatic quantum computing there is no need for absolute suppression. Because the superconducting charge qubits are away from the degeneracy point in their final states, the error introduced by unequal Josephson junctions will be small enough to be ignored. This is unlike the circuit model of quantum computing where the mismatch of the two Josephson junctions that make up the DC-SQUID leads to errors in computation. The minimum effective Josephson energy of split Josephson junction is $E_{J,MIN}$.

5.4.3 Read Out Devices for Superconducting Charge Qubits

As illustrated in FIG. 12A, in an embodiment of the present invention, the superconducting charge qubit is coupled to a readout device 1219 (e.g., an electrometer). For many types of readout devices 1219, the readout device is coupled to superconducting charge qubit by a capacitance 1218. In an embodiment of the present invention, the capacitance 1218 makes up between 1 and 10 percent of the capacitance of the superconducting charge qubit island 1214. A good read out device 1219 for a superconducting charge qubit is an electrometer sensitive enough to detect variations of the charge on the island 1214. Electrometers are well known in the art and include single electron transistors (SETs), radio frequency SETs (RF-SETs), SET and trap combinations, and superconducting readout circuit analogues of measurements from quantum electrodynamics. In an embodiment of the present invention, single shot readout is used. Examples of such readout devices are described herein below, some examples of which are shown in FIGS. 12B-D.

5.4.4 QED Read Out

FIG. 12B illustrates a quantum electrodynamics (QED) readout circuit that can be used as a readout device. Such circuits are known in the prior art. See, for example, Blais, et al., 2004, Phys. Rev. A 69, 062320, which is hereby incorporated by reference in its entirety. In an embodiment of the present invention, these QED readout circuits are used to readout a superconducting qubit at the end of an adiabatic quantum computation. Island 1214 of the superconducting charge qubit is capacitively coupled to a high quality on-chip transmission line resonator 1225.

At readout, resonator 1225 is excited to its resonance frequency. The electric field produced by resonator 1225 has an antinode at the center of the resonator to which the qubit is strongly coupled by capacitance 1218. It has been demonstrated that the coupling between resonator 1225 and the qubit can be made so large that a single photon in the transmission line can resonantly drive Rabi oscillations in the superconducting charge qubit at frequencies in excess of 10 megahertz. See, for example, Wallraff et al, 2004, Nature 431, p. 162, which is hereby incorporated by reference in its entirety.

The rate of coherent exchange of a single excitation between the superconducting charge qubit and resonator 1225 is much larger than the rate at which the superconducting charge qubit decoheres or the rate photons in resonator 1125 are lost. The qubit transitions frequency, the difference between the ground and first energy level in the qubit, expressed in frequency units, can be detuned from the resonator frequency. With this detuning and with a strong coupling between resonator 1225 and the qubit, there is a qubit state-dependent frequency shift in the resonator transition frequency of resonator 1225. This frequency shift can be used to perform a quantum non-demolition (QND) measurement of the qubit state. In this QND measurement, the amplitude and phase of a probe microwave is measured. This probe microwave is at the resonance frequency transmitted through resonator 1225 from port 1222 to port 1223. In the detuned case, the resonator also enhances the qubit radiative lifetime by providing an impedance transformation that effectively filters out the noise of the electromagnetic environment at the qubit transition frequency. See, Devoret, 2004, arXiv.org: cond-mat/0411174, which is hereby incorporated by reference in its entirety.

5.4.5 Use of a Trap and SET

A single shot readout device is shown in FIG. 12C. In an embodiment of the present invention, these single shot readout devices are used to readout a superconducting qubit at the end of an adiabatic quantum computation. The device includes a trap, an electrometer that is a conventional low-frequency single-electron transistor (SET) 1299 with a capacitance of about 1 femtofarads (1 femtofarads=1000 attofarads) and a charge trap 1233, with a capacitance of about 1 femtofarads or more, placed between island 1214 and SET 1299. The coupling capacitance between island 1214 and SET 1299 is about 30 attofarads. Trap 1233 is connected to island 1214 through resistive tunnel junction 1217. In some embodiments, resistive tunnel junction 1217 has about 100 megaohms of direct current resistance. Trap 1233 is coupled to SET 1299 by a capacitance 1234. In typical embodiments, capacitance 1234 is about 100 attofarads. The effective coupling between SET island 1239 and qubit island 1214 is low. In some embodiments it is about 30 attofarads or lower.

The island of trap 1233 is coupled to a voltage source 1231 by capacitance 1232. SET island 1239 is coupled to voltage source 1237 by capacitance 1238. SET island 1239 is isolated from the surrounding circuitry by Josephson junctions 1241 and 1242. SET 1299 can be biased by optional current source 1244. The signal from the SET is amplified by amplifier 1246. In some embodiments, amplifier 1246 is the same as amplifier 809 of FIG. 8.

The use of trap 1233 enables the user of the system 1250 to separate in time the state manipulation of the qubit's state and readout processes. In addition, qubit island 1214 becomes electrostatically decoupled from SET 1299. The qubit relaxation rate induced by the SET voltage noise is suppressed by a factor of about $10^{-5}$ for the capacitance values given above. However, since the qubit's ground state is read out, the relaxation time of the system is not a limiting factor. In other words, a long time is available for readout and this can significantly improve the fidelity. Current SETs have a demonstrated charge sensitivity of as low as a few $10^{-5}$ e/$\sqrt{Hz}$, which means that the charge variation of $10^{-5}$ e can be detected in a measurement time of about 1 second. The measurement precision improves as the square root of the measurement time. Because the final states of adiabatic quantum computing are classical, the operator of an adiabatic quantum computer using superconducting charge qubits has a long time for read out. This aspect alone makes a charge qubit suitable for use in quantum systems that are used for adiabatic quantum computing in accordance with the systems and methods of the present invention.

During operation of the qubit, e.g., the steps of adiabatic quantum computing, the island of trap 1233 is kept unbiased, prohibiting charge relaxation that would arise were charges on qubit island 1214 to tunnel onto the trap. To measure the charge state of island 1214, trap 1233 is biased by a readout pulse applied to capacitance 1232 by source 1231, so that if the superconducting charge qubit is in the excited state, an extra Cooper-pair charge tunnels into the trap in a sequential two-quasiparticle process. These quasiparticles, or electrons, are the constituents of the Cooper-pair and create an excess charge on the island of trap 1233. This excess charge is then detected by SET 1299. System 1299 can be constructed so that the quasiparticle charge on the island of trap 1233 does tunnel back to island 1214 of the qubit with appreciable probability. The quasiparticle charge on the island of trap 1233 influences island 1239 of SET 1299 through capacitor 1234. See, for example, Devoret and Schoelkopf, 2000, Nature 406, pp. 1039-1046; Astafiev et al., Phys. Rev. Lett. 93, 267007 (2004); and Astafiev et al., 2004, Phys. Rev. B 69, 180507, each of which is hereby incorporated by reference in its entirety.

Embodiments of the present invention can be operated without trap 1233, capacitor 1234. In such embodiments, island 1239 of SET 1299 is coupled directly to the superconducting charge qubit island 1214. In such embodiments the single shot readout may not be possible but repeated measurements can establish the final state of the superconducting charge qubit. The rate at which measurements can be cycled in such an embodiment is limited by the RC constant of the read out system. For resistance values through SET island 1239 across junction 1241 and 1242 of about 100 kΩ (kiloohms) and signal cable capacitance 1 nanofarad, the corresponding RC constant limits the measurement cycle to a few kilohertz. However, this is not a significant limitation because the adiabatic evolution that created the final state for readout is a slower process.

5.4.6 Use of an RF-SET

A radio frequency single electron transistor coupled to a superconducting charge qubit is shown in FIG. 12D. In an embodiment of the present invention, a radio frequency single electron transistor (RF-SET) can be used to readout a superconducting qubit at the end of an adiabatic quantum computation. The readout device, an RF-SET 1297, includes a SET island 1259 coupled to gate and a resonant circuit 1298. In an embodiment SET island 1259 has a capacitance of about 300 attofarads. In other embodiments, SET island 1259 has a capacitance ranging from about 100 attofarads to about 500 attofarads. The capacitance of the SET island 1259 is the sum of gate capacitance 1258 plus the capacitances of the resistive tunnel junctions 1255 and 1256. In some embodiments, the resistance across tunnel junctions 1255 and 1256 ranges between about 2 megaohms and about 350 megaohms. In an embodiment of the present invention, capacitance 1218 contributes between about 1 and 10 percent of the capacitance of the superconducting charge qubit island 1214. The coupling capacitance between qubit island 1214 and SET island 1259 can be about 5 to 100 attofarads.

SET island 1259 is coupled to voltage source 1257 by capacitance 1258. In an embodiment of the present invention, the capacitance of capacitor 1258 is about 20 attofarads. In some embodiments of the present invention, the capacitance of capacitor ranges between about 1 attofarad and 100 attofarads. SET island 1259 is isolated from the surrounding circuit by resistive tunnel junctions 1255 and 1256. RF-SET 1297 can be voltage biased by a voltage applied on terminal 1264 relative to ground. SET island 1259 is coupled to inductance 1263 and capacitance 1262 of RF-SET 1297. The value of inductance 1263 and capacitance 1262 is chosen to create a resonance frequency of RF-SET 1297. For example, if inductance 1263 is 600 nanoheneries and capacitance 1262 is about a picofarad, the resonance frequency is about 330 megahertz. The measurement cycle time of system 1270 is proportional to the RC constant of RF-SET 1297. For numerical values given above, and an overall RF-SET resistance of 40 kiloohms, the RC time is about a tenth of a microsecond, or a cycle of seven megahertz. The value of the inductance 1263 can be easily and widely varied in fabrication.

In operation, for superconducting charge qubit read out at the end of the adiabatic quantum computation using system 1270 of FIG. 12D, the following occurs. The readout of the charge state of the superconducting charge qubit is accomplished by monitoring the damping of a resonant circuit to which SET island 1259 is connected rather than by measuring either the current or the voltage associated with the SET island 1259. A single frequency signal at the resonance frequency of the resonant circuit 1298 is directed toward SET island 1259. The reflected signal is amplified and rectified. The reflected signal varies as a function of the gate voltage applied to SET island 1259. The gate voltage can be induced by voltage source 1257 or the charges on the superconducting charge qubit island 1214. The latter influence makes the RF-SET an electrometer useful for qubit readout.

The readout scheme specified above for system 1270 has many advantages. It operates at a speed higher than a normal SET. By using a low-impedance and matched impedance high-frequency amplifier, the stray capacitance of the cabling between the SET island 1259 and the amplifier (not shown) becomes unimportant. The amplifier is physically and thermally separated from RF-SET 1298, and can be optimized without the constraint of very low power dissipation required for operation at millikelvin temperatures. Finally, because the readout is performed at a high frequency, there is no amplifier contribution to the 1/f noise. See, for example, Duty et al., 2004, Phys. Rev. B 69, 140503; Schoelkopf et al., 1998, Science 280, pp. 1238-1241; and Aassime et al., 2001, Appl. Phys. Lett 79, pp. 4031-4033, each of which is hereby incorporated by reference in its entirety.

5.4.7 Variation of Superconducting Charge Qubits Parameters

The values of capacitance, inductance, and Josephson energy given in relation to superconducting charge qubits above, is provided in order to describe operable embodiments, but these are not the only values that lead to operable embodiments. The values can be changed with and without the need to make corresponding changes to the cooperative components. There are freely available and commercially available software that can aid the designer of superconducting charge qubits. Such software includes, but is not limited to, FASTCAP a tool designed to calculate capacitances of a given layout of superconducting devices. FASTCAP is freely distributed by the Research Laboratory of Electronics of the Massachusetts Institute of Technology, Cambridge, Mass. See also Nabors et al., 1992, IEEE *Trans. On Microwave Theory and Techniques* 40, pp. 1496-1507; and Nabors, September 1993, "Fast Three-Dimensional Capacitance Calculation," Thesis MIT, each of which is hereby incorporated by reference in its entirety. Another useful tool for varying the capacitances, inductances, and Josephson energies in the examples above is JSPICE. JSPICE is a simulator for superconductor and semiconductor circuits with Josephson junction, and is based on the general-purpose circuit simulation program SPICE. SPICE originates from the EECS Department of the University of California at Berkeley and provides links to the download website for this free software. See also Whiteley, 1991, IEEE *Trans. On Magnetics* 27, pp. 2908-2905; and Gaj, et al., 1999, IEEE *Trans. Appl. Supercond.* 9, pp. 18-38, each of which is hereby incorporated by reference in its entirety. In an embodiment of the present invention, the thermal energy ($k_B T$) of the charge qubit is less than the charge energy of the superconducting charge qubit ($E_C$). In an embodiment of the present invention, the Josephson energy ($E_J$) of the charge qubit is greater than the superconducting material energy gap of the charge qubit. In an embodiment of the present invention, the charge energy of the charge qubit is about equal to the Josephson energy of the charge qubit.

5.4.8 Coupled Superconducting Charge Qubits

Figure 13B:
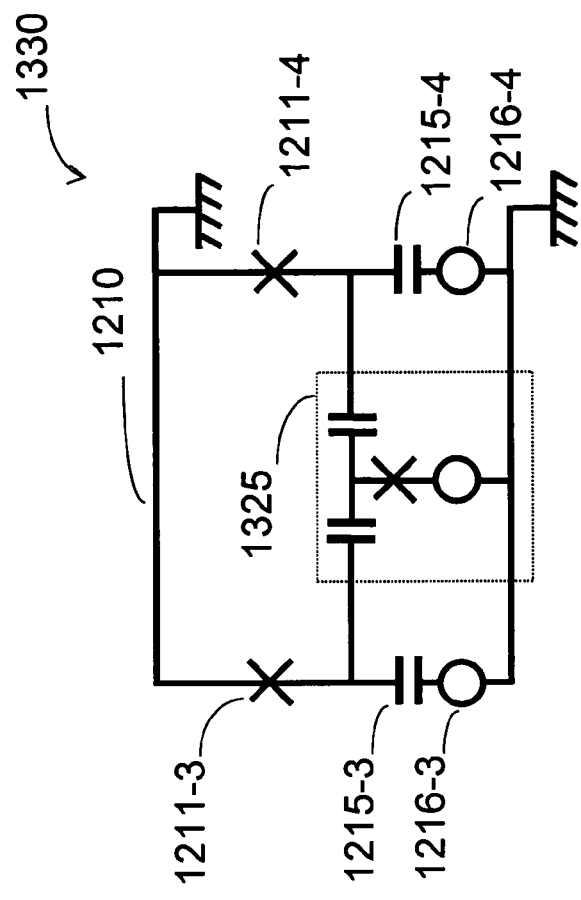
FIGS. 13A-13B illustrate coupled superconducting charge qubits in accordance with some embodiments of the present invention.
Figure 13A:
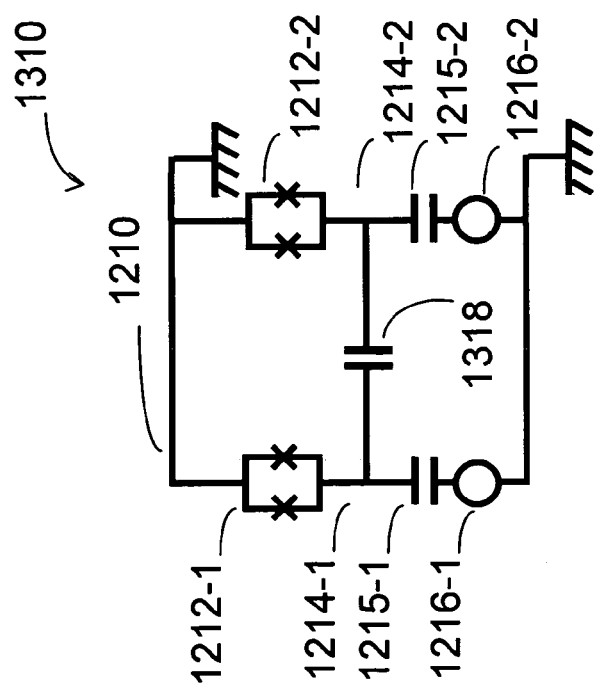

Some embodiments of the present invention comprise a lattice of interconnected superconducting charge qubits that are capacitively coupled to each other. This is a difference between these charge qubits and the systems of FIG. 5, which are being inductively coupled. Shown in FIG. 13A is an example of a fixed coupling between two superconducting charge qubits. Shown in FIG. 13B is an example of a tunable coupling between two superconducting charge qubits. The numbers of couplings and qubits in the lattice is scalable.

As shown in FIG. 13A, the couplings between charge qubits have a tunable sign and/or tunable magnitude of coupling. The superconducting charge qubits each have an island 1214-1 and 1214-2, coupled to a reservoir 1210, through split Josephson junctions 1212-1, and 1212-2. Disposed between the superconducting charge qubit islands, is a coupling capacitance 1318. The value of the capacitance 1318 is denoted $C_C$. In an embodiment of the present invention, coupling capacitance 1318 has a value of about 1 attofarad. In other embodiments of the present invention, the coupling capacitance is between about 1/100 attofarads and 50 attofarads. See, for example, Nakamura et al., 2003, *Nature* 421, pp. 823-826, which is hereby incorporated by reference in its entirety, which describes some charge qubits generally, including operating parameters of such qubits.

In the embodiment illustrated in FIG. 13B, the coupling 1325 between charge qubits have a tunable sign and/or tunable magnitude of coupling. The superconducting charge qubits each have an island coupled to a reservoir 1210 through Josephson junctions 1211-3, and 1211-4. Disposed between the superconducting charge qubit islands, is a variable electrostatic transformer (VET), 1325. The VET comprises an island, separated from a voltage source by a Josephson junction. The island is coupled to the superconducting charge qubit islands it couples with by two respective capacitors. The VET is described in Averin and Bruder, 2003, *Phys. Rev. Lett.* 91, 057003, which is hereby incorporated by reference in its entirety.

FIG. 14 illustrates graphs that correspond to the way superconducting charge qubits can be arranged in quantum systems in accordance with various embodiments of the present invention. The qubits used in the systems of the present invention can be arranged in a nearest neighbour triangular, rectangular, lattice, etc. with each qubit having 3, 4, etc., neighbors. Such lattices are graphs of degree three, four, etc. The number of neighbors depends on whether the qubit is in the interior, or exterior of the graph. Qubits on the exterior have fewer neighbors. The superconducting charge qubit can be arranged in graphs of higher degrees. A non-planar graph is a graph that cannot be drawn on a two dimensional plan without two edges crossing.

Figure 14A:
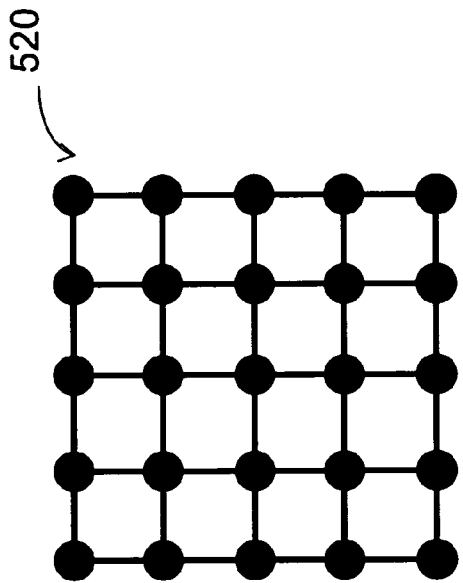
FIGS. 14A-14D illustrates how superconducting qubits can be arranged in accordance some embodiments of the present invention.
Figure 14B:
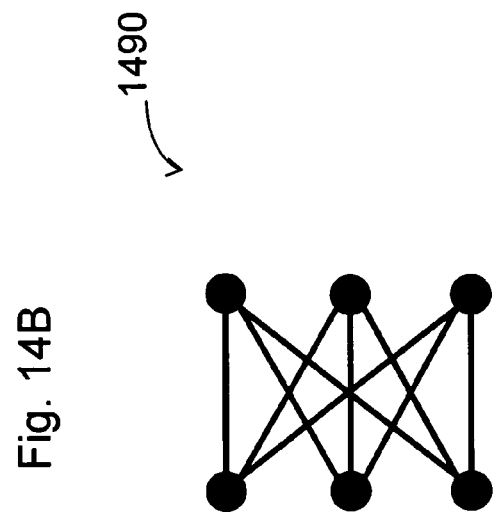

FIGS. 14A and 14B illustrate planar graphs that correspond to ways qubits can be arranged, in accordance with the present invention. Planar graphs are graphs in which edges do not cross. Graphs 515 and 520 are equivalent to layouts shown in FIG. 5. The graphs are planar, and rectangular. Planar rectangular graphs are well suited for inductively coupled qubits. Because the coupling is dictated by geometry and proximity, inductively coupled qubits do not lend well to being arranged as non-planar graphs.

Figure 14C:
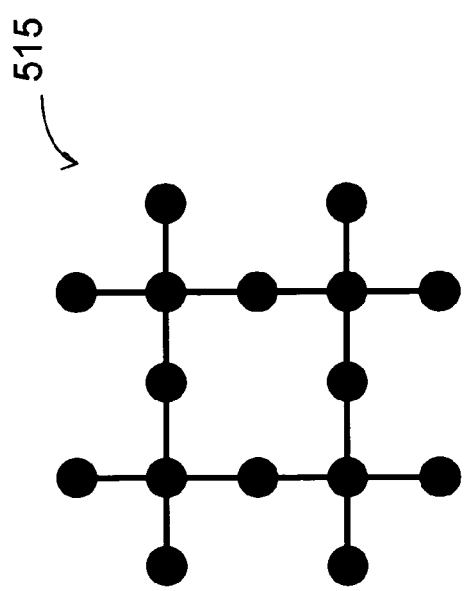
Figure 14D:
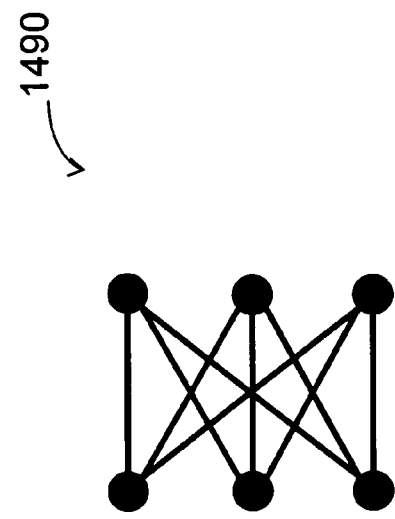

FIGS. 14C and 14D illustrate non-planar graphs that correspond to ways qubits can be arranged, in accordance with various embodiments of the present invention. Graph 1470 is an example of a graph upon which MAXCUT can be solved. Other NPC problems can be solved on graphs like graph 1470 and graph 1490. Capacitance coupling lends itself to creating arrangements that are equivalent to non-planar graphs. The couplings are mediated by capacitance, but the wires leading to the capacitor plates can cross.

5.4.9 Mathematical Description of Coupled Superconducting Charge Qubits

The Hamiltonian for lattices of superconducting charge qubits 1220, 1230, 1310, and 1330, etc. is:

$$H = -\frac{1}{2}\sum_{i=1}^{N}[E'_{Ci}\sigma_i^Z + E'_{Ji}\sigma_i^X] + \sum_{i=1}^{N}\sum_{j>i}^{N}J_{ij}\sigma_i^Z \otimes \sigma_j^Z$$

which is similar in form to Hamiltonians given above for coupled phase qubits. All terms in the Hamiltonian are potentially in the initial, final, or instant Hamiltonian of a computational device that is performing an adiabatic quantum computation in accordance with FIG. 4. Every term in this Hamiltonian can be fixed or tunable.

The biasing term proportional to the $\sigma^Z$ Pauli matrix is tunable. The bias is applied to the superconducting charge qubit a via capacitor coupled to the qubit. Mathematically the term is:

$$E'_C = 4E_C(1-2n_g)$$

where the dimensionless gate charge $n_g \approx C_g V_g/(2e)$ is determined in operation by the gate voltage $V_g$ and in fabrication by the gate capacitance $C_g$. The gate capacitance is capacitance 1215. Here it is assumed that $n_g \approx \frac{1}{2}$, but in parts of the computation the dimensional charge and hence the state of the qubit is biased to either 1 or 0.

The tunneling term proportional to the $\sigma^X$ Pauli matrix is always present except for embodiments where the Josephson energy term $E_J$ is tunable. In an embodiment of the present invention, the charge qubits with a tunable tunneling term have a Josephson junction connected to the island of the charge qubit replaced by a split Josephson junction. In these embodiments, tunneling is suppressed by tuning the flux in the split Josephson junction. The suppression of tunneling is absolute when the Josephson energies of junction are equal and the flux in the DC-SQUID loop is a half flux quantum. The tunneling is maximal (at zero bias) when the flux in the split Josephson junction is a whole number multiple of a flux quantum ($\Phi_0$), including zero. Traditionally, the tunneling of the qubit states is suppressed when the qubits are in the final state of an adiabatic quantum computation. Flux through split Josephson junctions can be tuned by a global magnetic field applied perpendicular to the plane of superconducting charge qubits. The global field can have local corrections applied through flux coils like 1227 of FIG. 12B.

In embodiments of the present invention, the coupling term proportional to the tensor product of $\sigma^Z$ Pauli matrix is tunable. In other embodiments, the coupling term is fixed. Coupling between two superconducting charge qubits can have many forms. If the Hamiltonian term for the coupling has a principal component proportional to $\sigma^Z \otimes \sigma^Z$, then the coupling is suitable for adiabatic quantum computing. An example of a coupling between superconducting charge qubits that has a principal component proportional to $\sigma^Z \otimes \sigma^Z$, is capacitive coupling. The sign of this coupling is positive making it an antiferromagnetic coupling. The coupling sign and coefficient ($J_{ij}$) are not tunable for a simple capacitance coupling unless a VET is used. The coupling in terms of physical parameters is $$J_{ij} = \frac{q_i q_j}{\tilde{C}_C},$$

where $q_i$ and $q_j$ is the excess charge on the $i^{th}$ and $j^{th}$ qubit, and $$\tilde{C}_C \equiv \frac{C_i^\Sigma C_j^\Sigma}{C_C}$$

where $C_k^\Sigma$ is the total capacitance for the $k^{th}$ qubit. The coupling sign and coefficient ($J_{ij}$) are tunable if a variable electrostatic transformer (VET) is used. The VET can be used to create ferromagnetic and antiferromagnetic interactions between superconducting qubits. The VET is described in Averin and Bruder, 2003, Phys. Rev. Lett. 91, 057003, which is hereby incorporated by reference in its entirety.

Operation

In accordance with the general procedure of adiabatic quantum computing as shown in FIG. 4, some embodiments of the present invention use superconducting charge qubits. In step 401 a quantum system that will be used to solve a computation is selected and/or constructed and includes a plurality of superconducting charge qubits. Once the plurality of superconducting charge qubits has been configured, an initial state and a final state of the system are defined. The initial state is characterized by the initial Hamiltonian $H_0$ and the final state is characterized by the final Hamiltonian $H_P$ that encodes the computational problem to be solved. The initial Hamiltonian $H_0$ and the final Hamiltonian $H_P$ are variants of the Hamiltonian of coupled superconducting charge qubits given above making use of the tunable Hamiltonian elements. More details on how the Hamiltonian elements are tuned is described hereinabove.

In step 403, the plurality of superconducting charge qubits is initialized to the ground state of the time-independent Hamiltonian, $H_0$, which initially describes the states of the qubits. It is assumed that the ground state of $H_0$ is a state to which the plurality of superconducting charge qubits can be reliably and reproducibly set. This assumption is reasonable for superconducting charge qubits including qubit bias terms.

In transition 404 between steps 403 and 405, the plurality of superconducting charge qubits are acted upon in an adiabatic manner in order to alter the states of the plurality superconducting charge qubits. The plurality of superconducting charge qubits change from being described by Hamiltonian $H_0$ to a description under $H_P$. This change is adiabatic, as defined above, and occurs in a time T. In other words, the operator of an adiabatic quantum computer causes the plurality of superconducting charge qubits, and Hamiltonian H describing the plurality of superconducting charge qubits, to change from $H_0$ to a final form $H_P$ in time T. The change is an interpolation between $H_0$ and $H_P$.

In accordance with the adiabatic theorem of quantum mechanics, the plurality of superconducting charge qubits will remain in the ground state of H at every instance the qubits are changed and after the change is complete, provided the change is adiabatic. In some embodiments of the present invention, the plurality of superconducting charge qubits start in an initial state $H_0$ that does not permit quantum tunneling, are perturbed in an adiabatic manner to an intermediate state that permits quantum tunneling, and then are perturbed in an adiabatic manner to the final state described above.

In step 405, the plurality of superconducting charge qubits has been altered to a state that is described by the final Hamiltonian. The final Hamiltonian $H_P$ can encode the constraints of a computational problem such that the state of the plurality superconducting charge qubits under $H_P$ corresponds to a solution to this problem. Hence, the final Hamiltonian is also called the problem Hamiltonian $H_P$. If the of plurality superconducting charge qubits is not in the ground state of $H_P$, the state is an approximate solution to the computational problem. Approximate solutions for many computational problems are useful and such embodiments are fully within the scope of the present invention.

An aspect of the problem Hamiltonian $H_P$ is the energy of the tunneling terms in the Hamiltonian, which are either weak or zero. The energy of the tunneling terms is suppressed by applying a half flux quantum through the split Josephson junctions that separate the superconducting charge qubit island from the reservoir.

In step 407, the plurality superconducting charge qubits described by the final Hamiltonian $H_P$ is read out. The read out can be in the $\sigma^z$ basis of the qubits. If the read out basis commutes with the terms of the problem Hamiltonian $H_p$, then performing a read out operation does not disturb the ground state of the system. The read out method can take many forms. The object of the read out step is to determine exactly or approximately the ground state of the system. The states of all qubits are represented by the vector $\vec{O}$, which gives a concise image of the ground state or approximate ground state of the system. The plurality of superconducting charge qubits can be readout using the devices and techniques described hereinabove.

Exemplary Embodiment of a Method of AQC with Superconducting Charge Qubits

This example describes an embodiment of the invention where the superconducting charge qubits have fixed couplings. To perform adiabatic quantum computation with superconducting charge qubits, in step 401, the operator chooses $E'_{Ci}$ and $J_{ij}$ in such a way as to simulate the problem Hamiltonian Hp. The charging energy $E'_{Ci}$ can be controlled by the gate voltages, and qubit-qubit coupling energy $J_{ij}$ is fixed in fabrication by the capacitance of the coupling capacitances unless a variable electrostatic transformer is used. In an embodiment of the present invention, these values are chosen to satisfy the constraint $E_{J,MIN} \ll E'_{Ci}$ and $E_{J,MIN} \ll J_{ij}$ while $E'_{Ci} \leq E_{J,MAX}$ and $J_{ij} \leq E_{J,MAX}$, for every qubit or pair of coupled qubits. At the beginning of the computation, step 403, $E_{Ji}$ are set to $E_{J,MAX}$. In that case, the tunneling terms dominate causing a decay of the system to the ground state. Then, in transition 404, the $E_{Ji}$ terms are adiabatically reduced to $E_{J,MIN}$. At the end of the adiabatic evolution, the tunneling terms are negligible and the effective Hamiltonian is $H_P$. Then, in step 405, the qubits can be read out. Suitable techniques for single shot readout include the use of a trap island, an RF-SET, QED read out circuits, etc.

Second Example of a Method of AQC with Superconducting Charge Qubits

This example describes an embodiment of the invention where the superconducting charge qubits have fixed couplings. In an embodiment of the present invention where $E'_{Ci}$ is greater than $E_{J,MAX}$, but not much greater, the operator can artificially reduce $E'_{Ci}$. To perform adiabatic quantum computation with superconducting charge qubits, in step 401, the operator chooses $J_{ij}$ in such a way as to simulate the problem Hamiltonian Hp. In an embodiment of the present invention, these values are chosen to satisfy $E_{J,MIN} \ll E'_{Ci}$ and $E_{J,MIN} \ll J_{ij}$ while $E'_{Ci} \geq E_{J,MAX}$ and $J_{ij} \leq E_{J,MAX}$, for every qubit or pair of coupled qubits. At the beginning of the computation, step 403, each $E_{Ji}$ is set to $E_{J,MAX}$. The gate voltages on the superconducting charge qubits are tuned to bring the qubits closer to degeneracy [dimensionless gate charge equal to one half ($n_g = \frac{1}{2}$)]. This reduces the energy in the bias term $E'_{Ci}$. Then, in transition 404, the $E_{Ji}$ terms are adiabatically reduced to $E_{J,MIN}$. Also, in the adiabatic evolution the bias on the superconducting charge qubit is adiabatically increased at the same time as each $E_{Ji}$ is decreased. The bias on the superconducting charge qubits is changed such that, at the end of the adiabatic evolution, the bias terms are appropriate for the problem Hamiltonian $H_P$. Then, in step 405, the qubits are read out.

5.4.10 Further Embodiments for AQC with Superconducting Charge Qubits

Further embodiments for adiabatic quantum computing with superconducting charge qubits can be constructed from the following protocols for the biasing, tunneling, and coupling of qubits.

For the tunneling terms of a plurality of superconducting charge qubits the following protocols can be used. In an embodiment where the tunneling term is fixed, the bias and coupling energies for the initial Hamiltonian are set to be less that the tunneling energies. In the same examples, the bias and coupling energies for the problem Hamiltonian are set to be greater that the tunneling energies. In such a case, the tunneling is weak compared with the final Hamiltonian. In embodiments where the tunneling term is tunable, the tunneling energies for the initial Hamiltonian are set to values approaching and including $E_{J,MAX}$ but away from zero. After the adiabatic evolution the tunneling energies are set to $E_{J,MIN}$, which can be zero. Alternatively, the tunneling energies for the initial Hamiltonian are set to $E_{J,MIN}$, which can be zero. During the adiabatic evolution the tunneling energies are to values approaching and including $E_{J,MAX}$ but away from zero. After the adiabatic evolution the tunneling energies are set to $E_{J,MIN}$, which can be zero.

For the coupling terms of a plurality of superconducting charge qubits the following protocols can be used. In an embodiment where the coupling terms are fixed at fabrication time, the couplings are set such that they describe the couplings for the problem Hamiltonian. In embodiments where the coupling terms are tunable, the coupling energies for the initial Hamiltonian are set to zero. During the adiabatic evolution the coupling energies are increased such that they describe the couplings for the problem Hamiltonian. If the tunneling energies are at zero during readout, the coupling energies can be set to any value without the final state of the superconducting charge qubits changing.

5.5 Representative System

Figure 15:
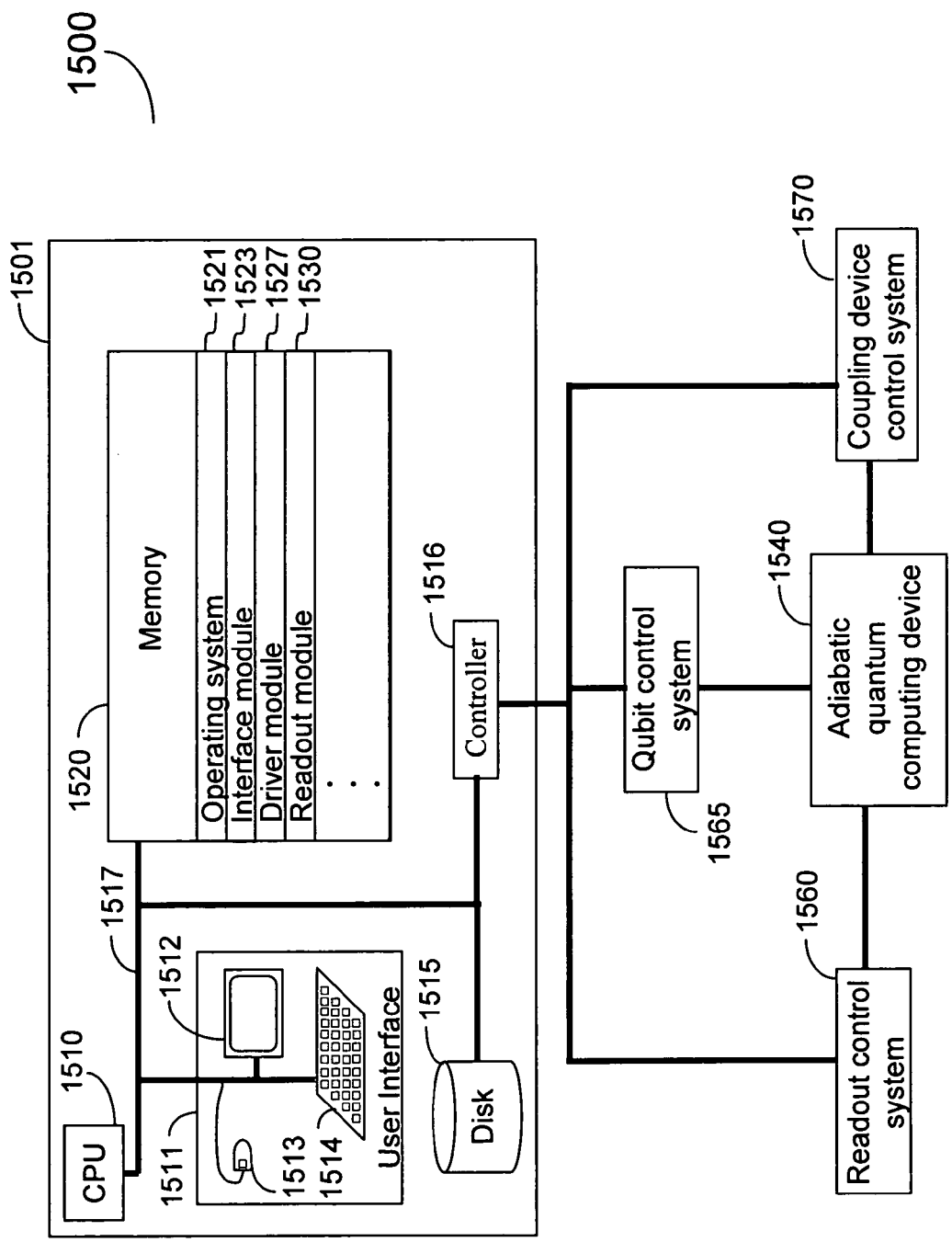
FIG. 15 illustrates a system that is operated in accordance with some embodiments of the present invention.

FIG. 15 illustrates a system 1500 that is operated in accordance with one embodiment of the present invention. System 1500 includes at least one digital (binary, conventional) interface computer 1501. Computer 1501 includes standard computer components including at least one central processing unit 1510, memory 1520, non-volatile memory, such as disk storage 1515. Both memory and storage are for storing program modules and data structures. Computer 1501 further includes input/output device 1511, controller 1516 and one or more busses 1517 that interconnect the aforementioned components. User input/output device 1511 includes one or more user input/output components such as a display 1512, mouse 1513, and/or keyboard 1514.

Figure 1A:
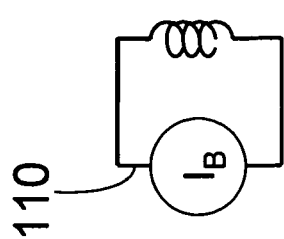
Figure 2:
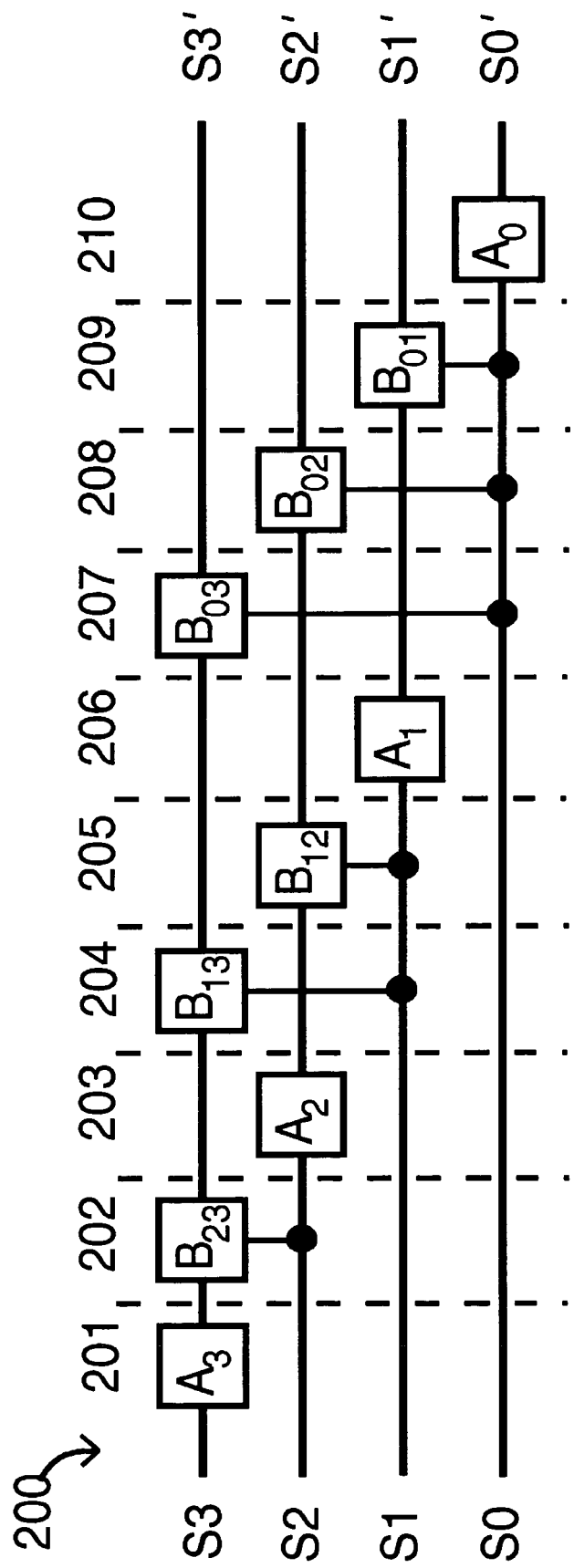
FIG. 2 illustrates an exemplary quantum computation circuit model in accordance with the prior art.

System 1500 further includes an adiabatic quantum computing device 1540 that includes those adiabatic quantum computing devices shown above. Exemplary examples of adiabatic quantum computing devices 1540 include, but are not limited to, devices 101 of FIG. 1; 500, 510, 515, 520, 525, 535, and 555 of FIG. 5; 800 of FIG. 8; 1220, 1230, 1250, and 1270 of FIG. 12; 1310 and 1330 of FIG. 13; and 515, 520, 1470, and 1490 of FIG. 14. This list of exemplary examples of adiabatic quantum computing devices is non-limiting. A person of ordinary skill in the art will recognize other devices suitable for adiabatic quantum computing device 1540.

System 1500 further includes a readout control system 1560. In some embodiments, readout control system 1560 comprises a plurality of magnetometers, or electrometers, where each magnetometer or electrometer is inductively coupled, or capacitively coupled, respectively, to a different qubit in quantum computing device 1540. In such embodiments, controller 1516 receives a signal, by way of readout control system 1560, from each magnetometer or electrometer in readout device 1560. System 1500 optionally comprises a qubit control system 1565 for the qubits in quantum computing device 1540. In some embodiments, qubit control system 1565 comprises a magnetic field source or electric field source that is inductively coupled or capacitively coupled, respectively, to a qubit in quantum computing device 1540. System 1500 optionally comprises a coupling device control system 1570 to control the couplings between qubits in adiabatic quantum computing device 1540. A coupling that is controllable includes, but is not limited to, coupling 1325 of FIG. 13.

In some embodiments, memory 1520 includes a number of modules and data structures. It will be appreciated that at any one time during operation of the system, all or a portion of the modules and/or data structures stored in memory 1520 are resident in random access memory (RAM) and all or a portion of the modules and/or data structures are stored in non-volatile storage 1515. Furthermore, although memory 1520, including non-volatile memory 1515, is shown as housed within computer 1501, the present invention is not so limited. Memory 1520 is any memory housed within computer 1501 or that is housed within one or more external digital computers (not shown) that are addressable by digital computer 1501 across a network (e.g., a wide area network such as the internet).

In some embodiments, memory 1520 includes an operating system 1521. Operating system 1521 includes procedures for handling various system services, such as file services, and for performing hardware dependent tasks. In some embodiments of the present invention, the programs and data stored in system memory 1520 further include an adiabatic quantum computing device interface module 1523 for defining and executing a problem to be solved on an adiabatic quantum computing device. In some embodiments, memory 1520 includes a driver module 1527. Driver module 1527 includes procedures for interfacing with and handling the various peripheral units to computer 1501, such as controller 1516 and control systems 1560, qubit control system 1565, coupling device control system 1570, and adiabatic quantum computing device 1540. In some embodiments of the present invention, the programs and data stored in system memory 1520 further include a readout module 1530 for interpreting the data from controller 1516 and readout control system 1560.

The functionality of controller 1516 can be divided into two classes of functionality: data acquisition and control. In some embodiments, two different types of chips are used to handle each of these discrete functional classes. Data acquisition can be used to measure physical properties of the qubits in adiabatic quantum computing device 1540 after adiabatic evolution has been completed. Such data can be measured using any number of customized or commercially available data acquisition microcontrollers including, but not limited to, data acquisition cards manufactured by Elan Digital Systems (Fareham, UK) including, but are not limited to, the AD132, AD136, MF232, MF236, AD142, AD218, and CF241. In some embodiments, data acquisition and control is handled by a single type of microprocessor, such as the Elan D403C or D480C. In some embodiments, there are multiple interface cards 1516 in order to provide sufficient control over the qubits in a computation on adiabatic quantum computing device 1540 and in order to measure the results of an adiabatic quantum computation on adiabatic quantum computing device 1540.

6. CONCLUSION AND REFERENCES CITED

When introducing elements of the present invention or the embodiment(s) thereof, the articles "a," "an," "the," and "said" are intended to mean that there are one or more of the elements. The terms "comprising," "including," and "having" are intended to be inclusive and to mean that there may be additional elements other than the listed elements. Moreover, the term "about" has been used to describe specific parameters. In many instances, specific ranges for the term "about" have been provided. However, when no specific range has been provided for a particular usage of the term "about" herein, than either of two definitions can be used. In the first definition, the term "about" is the typical range of values about the stated value that one of skill in the art would expect for the physical parameter represented by the stated value. For example, a typical range of values about a specified value can be defined as the typical error that would be expected in measuring or observing the physical parameter that the specified value represents. In the second definition of about, the term "about" means the stated value ±0.10 of the stated value. As used herein, the term "instance" means the execution of a step. For example, in a multistep method, a particular step may be repeated. Each repetition of this step is referred to herein as an "instance" of the step.

All references cited herein are incorporated herein by reference in their entirety and for all purposes to the same extent as if each individual publication or patent or patent application was specifically and individually indicated to be incorporated by reference in its entirety for all purposes.

7. ALTERNATIVE EMBODIMENTS

The present invention can be implemented as a computer program product that comprises a computer program mechanism embedded in a computer readable storage medium. For instance, the computer program product could contain program modules, such as those illustrated in FIG. 15, that implement the various methods described herein. These program modules can be stored on a CD-ROM, DVD, magnetic disk storage product, or any other computer readable data or program storage product. The software modules in the computer program product can also be distributed electronically, via the Internet or otherwise, by transmission of a computer data signal (in which the software modules are embedded) on a carrier wave.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed is:

1. A method for adiabatic quantum computing using a quantum system comprising a plurality of superconducting qubits, wherein the quantum system is capable of being in any one of at least two quantum configurations at any given time, the at least two quantum configurations comprising:

a first configuration described by an initialization Hamiltonian $H_O$; and a second configuration described by a problem Hamiltonian $H_P$ having a ground state, the method comprising:

A) initializing the quantum system to the first configuration;

B) adiabatically changing the quantum system until it is described by the ground state of the problem Hamiltonian Hp; and C) reading out a state of the quantum system.

2. The method of claim 1 wherein each respective first superconducting qubit in the plurality of superconducting qubits is arranged with respect to a respective second superconducting qubit in the plurality of superconducting qubits such that the first respective superconducting qubit and the corresponding second respective superconducting qubit define a predetermined coupling strength and wherein the predetermined coupling strength between each first respective superconducting qubit and corresponding second respective superconducting qubit in the plurality of superconducting qubits collectively define a computational problem to be solved.

3. The method of claim 2 wherein the problem Hamiltonian $H_P$ comprises a tunneling term for each of the respective superconducting qubits in the plurality of superconducting qubits, and wherein an energy of a tunneling term for each respective superconducting qubit in the plurality of superconducting qubits is less than an average of the predetermined coupling strengths between each first respective superconducting qubit and second respective superconducting qubit in the plurality of superconducting qubits.

4. The method of claim 1 wherein a superconducting qubit in the plurality of superconducting qubits is a persistent current qubit.

* * * * *